(12) United States Patent
Horiuchi et al.

(10) Patent No.: US 6,491,976 B2
(45) Date of Patent: Dec. 10, 2002

(54) METHOD FOR ADDING HYDROPHILIC GROUPS TO THE SURFACE OF PARTICLES

(75) Inventors: Takahiro Horiuchi, Nara; Kiyofumi Morimoto, Yamatokoriyama; Shiro Narikawa, Kashihara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/384,798

(22) Filed: Aug. 27, 1999

(65) Prior Publication Data

US 2001/0046556 A1 Nov. 29, 2001

(30) Foreign Application Priority Data

Aug. 28, 1998 (JP) .......................... 10-244006
Oct. 9, 1998 (JP) .......................... 10-287910

(51) Int. Cl.[7] .............................................. B05D 7/00
(52) U.S. Cl. ...................................... 427/212; 427/215
(58) Field of Search ................ 427/212, 213, 427/215, 216, 217, 220, 221

(56) References Cited

U.S. PATENT DOCUMENTS

| | | | |
|---|---|---|---|
| 4,015,031 A | 3/1977 | Reinhardt et al. | 427/213 |
| 4,105,426 A | 8/1978 | Iler et al. | 65/18 |
| 4,297,247 A | 10/1981 | Krabetz et al. | 427/215 |
| 4,344,857 A | 8/1982 | Shasha et al. | 252/316 |
| 4,720,419 A | 1/1988 | Cairns et al. | 427/96 |
| 5,039,559 A | 8/1991 | Sang et al. | 427/213.3 |
| 5,143,751 A | 9/1992 | Richards et al. | 427/215 |
| 5,185,169 A | 2/1993 | Yamamoto | 427/246 |
| 5,281,261 A | 1/1994 | Lin | 524/817 |
| 5,281,445 A | 1/1994 | Khare | 427/219 |
| 5,443,711 A | 8/1995 | Kojima et al. | 427/126.3 |
| 5,530,005 A | * 6/1996 | Wilhelm et al. | 514/290 |
| 5,571,311 A | * 11/1996 | Belmont et al. | 106/20 R |
| 5,846,307 A | * 12/1998 | Nagasawa et al. | 106/31.75 |
| 5,883,157 A | * 3/1999 | Yamashita et al. | 523/161 |
| 5,955,142 A | 9/1999 | Yoshino et al. | 427/205 |

FOREIGN PATENT DOCUMENTS

| | | |
|---|---|---|
| EP | 0 753 481 | 1/1997 |
| EP | 0 794 017 | 9/1997 |
| GB | 862018 | 3/1961 |
| GB | 1103577 | 2/1968 |
| JP | 7-51556 | 2/1995 |
| WO | 98-36888 | 8/1998 |

OTHER PUBLICATIONS

*Biryushi Handobukku* (Fine Particle Handbook) (M. Jinbo, et al., published by Asakura Shoten Ltd., first edition, first printing, Sep. 1, 1991, pp. 383–394. (See English translation of relevant passages).

*Fine Particle Engineering: Fundamentals and Applications of Distribution* (M. Naito, et al 1994, pp. 123–136. (See English translation of relevant passages).

* cited by examiner

Primary Examiner—Michael Barr
(74) Attorney, Agent, or Firm—David G. Conlin; John B. Alexander; Edwards & Angell, LLP

(57) ABSTRACT

A particle surface-modifying method has the steps of suspending particles in a liquid containing a modifier so as to prepare a suspension, and heating the suspension while it is being transported so that the surface of the particles is modified by the modifier. This method makes it possible to provide surface-modified particles having a comparatively small particle size at low costs for a short time by using simple operations, without causing the particles to be charged.

28 Claims, 43 Drawing Sheets

FIG. 2

(A)
↓
| COOL PNEUMATIC TRANSPORT | — S7

↓
| COLLECT ACIDIC LIQUID FROM PNEUMATIC TRANSPORT | — S8

↓
| DEHUMIDIFY PNEUMATIC TRANSPORT BY DESICCATING AGENT | — S9

↓
| CAPTURE HYDROPHILIC PARTICLES FROM PNEUMATIC TRANSPORT | — S10

↓
| COOL PNEUMATIC TRANSPORT TO CRYOGENIC TEMPERATURE | — S11

↓
| COLLECT ACIDIC LIQUID AND HYDROPHILIC PARTICLES FROM PNEUMATIC TRANSPORT | — S12

↓
| DEHUMIDIFY PNEUMATIC TRANSPORT BY DESICCATING AGENT AND DISCHARGE IT | — S13

↓
( END )

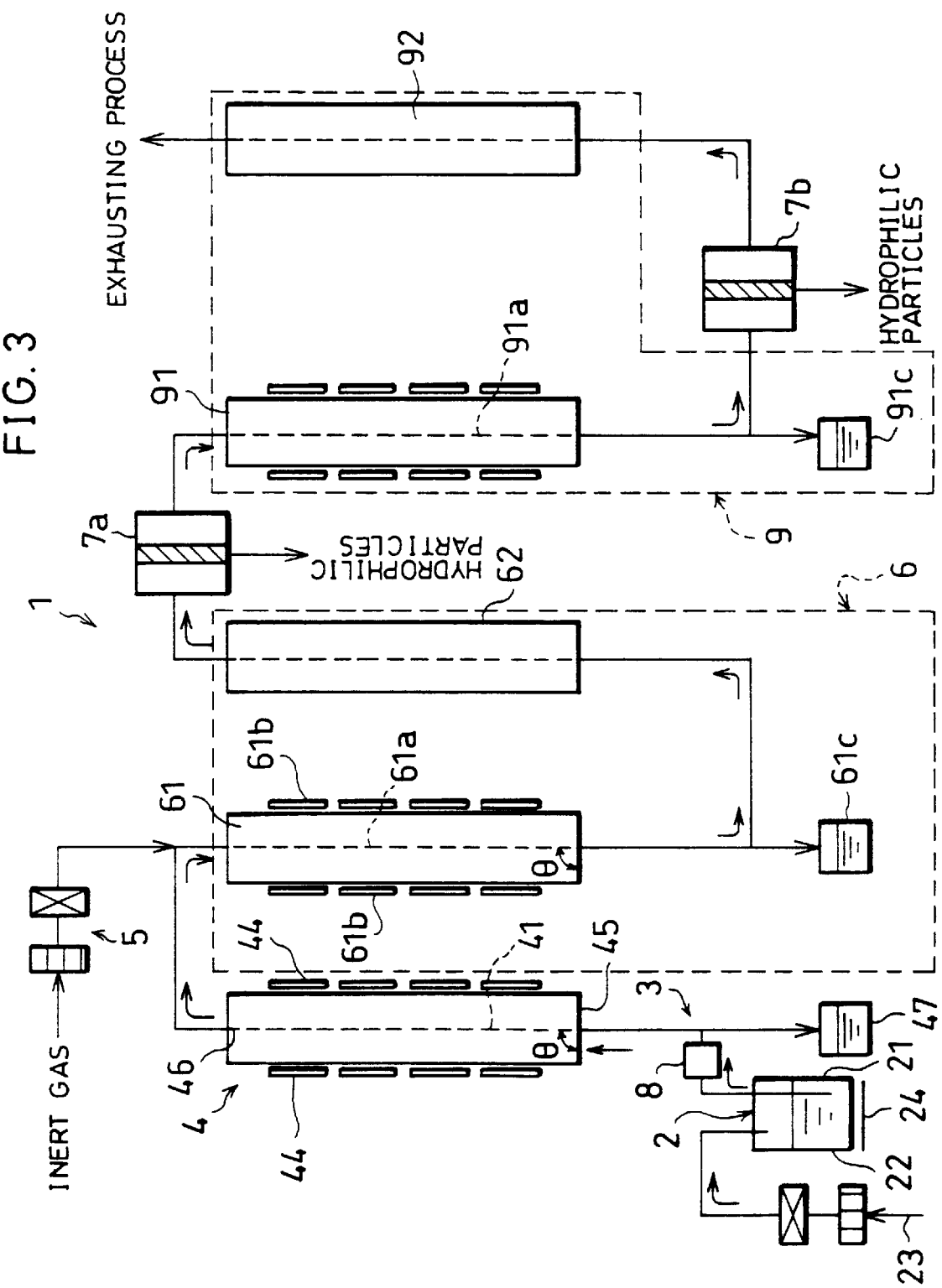

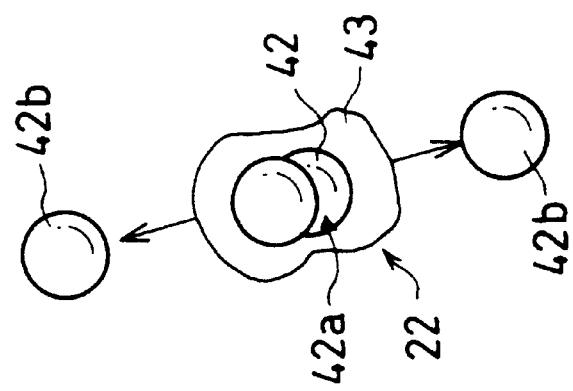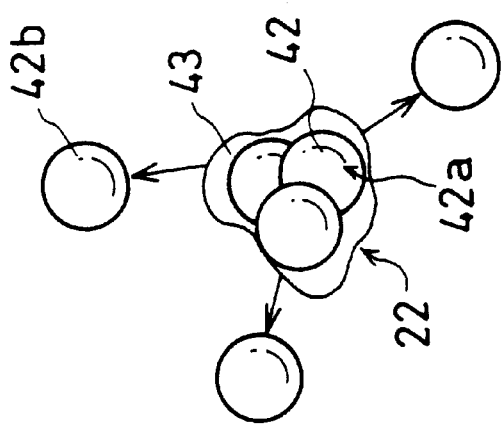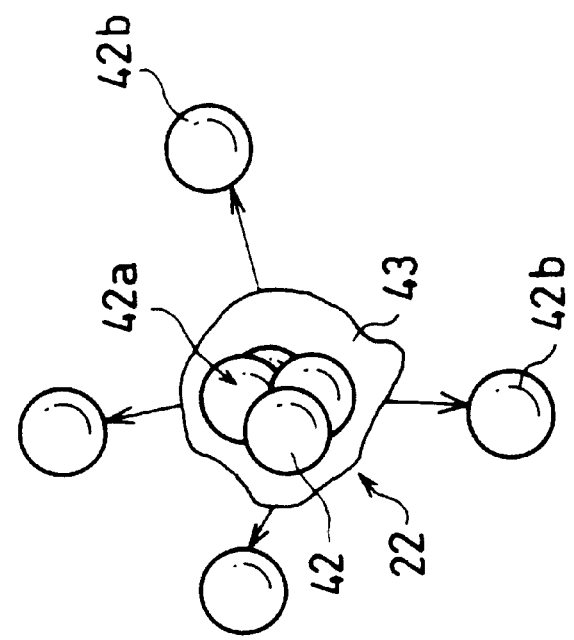

FIG. 9

```
         (B)
          |
COOL PNEUMATIC TRANSPORT TO 273 K  — S27
          |
COLLECT ACIDIC LIQUID FROM PNEUMATIC TRANSPORT  — S28
          |
DEHUMIDIFY PNEUMATIC TRANSPORT BY DESICCATING AGENT  — S29
          |
CAPTURE HYDROPHILIC CB PARTICLES FROM PNEUMATIC TRANSPORT  — S30
          |
COOL PNEUMATIC TRANSPORT TO CRYOGENIC TEMPERATURE OF 250 K  — S31
          |
COLLECT ACIDIC LIQUID AND HYDROPHILIC CB PARTICLES
FROM PNEUMATIC TRANSPORT  — S32
          |
DEHUMIDIFY PNEUMATIC TRANSPORT BY DESICCATING
AGENT AND DISCHARGE IT  — S33
          |
         END
```

FIG. 17

```
START
  ↓
SUSPEND CB PARTICLES IN ACIDIC LIQUID — S31
  ↓
APPLY ULTRASONIC WAVE VIBRATION TO SUSPENSION
SO AS TO DISPERSE CB PARTICLES UNIFORMLY — S32
  ↓
RAISE TEMPERATURE OF PARTICLE OXIDIZING SECTION TO 700 K — S33
  ↓
ATOMIZE SUSPENSION BY CLEAN NITROGEN GAS
OF 2 kgf/cm² SO AS TO FORM DROPLETS — S34
  ↓
INTRODUCE DROPLETS INTO PARTICLE OXIDIZING
SECTION BY PNEUMATIC TRANSPORTATION — S35
  ↓
HEAT DROPLETS DURING TRANSPORTATION IN PARTICLE OXIDIZING SECTION SO AS
TO CARRY OUT OXIDIZING PROCESS ON SURFACE OF CB PARTICLES IN DROPLETS — S36
  ↓
TO S25
``` n: PREDETERMINED NUMBER OF
   DETECTIONS OF DISPERSION (n ≧2)

n: PREDETERMINED NUMBER OF
DETECTIONS OF LIQUID PROPERTY (n ≥2)

n: PREDETERMINED NUMBER OF
DETECTIONS OF TEMPERATURE (n ≥ 2)

n: PREDETERMINED NUMBER OF
DETECTIONS OF REMAINING QUANTITY (n ≧2)

n: PREDETERMINED NUMBER OF
DETECTIONS OF NUMBER CONCENTRATION (n ≧2)

n: PREDETERMINED NUMBER OF
   DETECTIONS OF FLOW RATE (n ≧2)

PARTICLE SUPPLY SECTION n: PREDETERMINED NUMBER OF DETECTIONS OF TEMPERATURE ($n \geq 2$)

METHOD FOR ADDING HYDROPHILIC GROUPS TO THE SURFACE OF PARTICLES

FIELD OF THE INVENTION

The present invention relates to a particle surface-modifying method and a particle surface-modifying device which can provide modified particles that have, for example, a superior dispersion property and that are preferably used for ink-jet recording liquid, ball-point pens and marking pens, by modifying (adding hydrophilic groups) the surface of the particles using a modifier such as, for example, an oxidizing agent.

BACKGROUND OF THE INVENTION

With respect to methods for modifying the surface of various particles, besides those dry-type methods, a method for carrying out polymerization in a liquid phase has been conventionally known, and more specifically, various modifying methods have been put into practice, in which, for example, particles having a hydrophobic property (hydrophobic substance) are treated by a hydrophilic modifier so that a film of the modifier is formed on the surface of the particles so as to impart a hydrophilic property thereto, that is, modifying methods for coating the surface of the particles with a modifier having a hydrophilic property.

With respect to the above-mentioned modifying methods, for example, "Fine Particle Handbook" (edited by Motoji Jinbo; the first copies of the first edition of which were published by Asakura Shoten K. K. on Sep. 1, 1991), pages 383–394, discloses a surface-modifying method using a kneading and pulverizing method, a spray drying method, etc.

Moreover, for example, "Fine Particle Engineering—Basics and Application of Dispersion" (edited by the Japan Powder Industry Technological Association; the first copies of the first edition of which were published by Asakura Shoten K. K. on Jun. 25, 1994), pages 123–136, discloses a method in which: a dissimilar component in powder (surface modifier) is physically bound to the surface of powder particles by using a high-speed rotary impact pulverizer or a dry-type pulverizer, such as a grinding mill, a ball mill, a roll mill, a medium-stirring-type pulverizer, and a jet mill, so that coating-type composite particles the surface of which has been modified in its characteristic are manufactured.

However, in the above-mentioned conventional modifying methods, since, upon treating the particles by using a modifier, the particles are stirred using a stirring device such as stirring blades, the particles are charged through friction, etc. For this reason, the resulting modified particles (hydrophilic particles) tend to adhere to the inner walls of a housing member (hopper) due to its charged state, resulting in a maltransportation; this causes difficulties in handling the particles. Moreover, in the above-mentioned conventional modifying methods, since the modifier is physically bound to the surface of the particles, it takes a very long time to carry out the processes, complex operations are required for carrying out the above-mentioned processes, and expensive devices need to be provided.

In addition, in the above-mentioned conventional modifying methods, the particle size of the resulting modified particles tends to vary depending on the particle size prior to the process, and since particle aggregation, etc. tends to occur upon treating the particles by using a modifier, the resulting modified particles tend to have great particle sizes and become irregular.

Moreover, in the above-mentioned conventional methods, upon carrying out processes in the order of sub-micron, it is difficult to carry out the above-mentioned processes on each of the particles in a stable manner due to the defect that the fine particles are highly susceptible to aggregation.

Furthermore, in the above-mentioned conventional methods, since the surface of the particles is treated using a modifier by stirring the particles and the modifier by using a stirring device, far more amounts of various chemicals, such as a modifier, have to be used beyond what is theoretically required for the surface treatment of the particles, and post processes such as treatment for waste liquid, etc. to a great amount of various residual chemicals. Therefore, another problem of the above-mentioned conventional methods is that the manufacturing costs of the surface-modifying particles (including costs of post treatments) become high.

As described above, any of the above-mentioned conventional modifying methods, that is, the above-mentioned conventional manufacturing method of hydrophilic particles, fails to manufacture uniform hydrophilic particles having a comparatively small particle size at low costs for a short time by using a simple device with simple operations, without causing the particles to be charged.

SUMMARY OF THE INVENTION

The present invention has been devised to solve the above-mentioned conventional problems, and its objective is to provide a particle surface-modifying method and a particle surface-modifying method which can manufacture uniform hydrophilic particles having a comparatively small particle size at low costs for a short time by using a simple device with simple operations, without causing the particles to be charged.

In order to achieve the above-mentioned objective, the particle surface-modifying method of the present invention has an arrangement in which, after particles have been suspended in a liquid containing a modifier so as to prepare a suspension, the suspension is heated while being transported so that the surface of the particles is modified by the modifier.

Another particle surface-modifying method of the present invention has an arrangement in which, after particles have been suspended in a liquid containing a modifier so as to prepare a suspension, the liquid is evaporated while the suspension is being transported so that the surface of the particles is modified by the modifier.

In the above-mentioned method, by heating the suspension while being transported, the liquid in the suspension can be, for example, partially nuclear boiled during the transporting process with the particles serving as nuclei, or evaporated, successively in a stable manner, while the suspension is being transported. Thus, in this method, the surface of the particles is heated in the presence of the modifier at the portions being nuclear boiled or evaporated so that it becomes possible to efficiently modify the surface of the particles by using the modifier, and consequently to obtain surface-modified particles.

Moreover, in the above-mentioned method, the respective particles tend to aggregate with each other when they have a small particle size (in particular, in not more than the sub-micron order); however, while the respective aggregating particles are being dispersed by applying an external force exerted by an abrupt volume expansion due to nuclear boiling by application of heat, for example, by a volume expansion of 1000 times exerted by evaporated water, the surface of each of the particles is modified by the modifier. For this reason, the above-mentioned method makes it possible to eliminate the conventional stirring process for restricting the aggregation, and consequently, to avoid charging of the particles.

As a result, the above-mentioned method makes it possible to manufacture uniform surface modified particles having a comparatively small particle size at low costs for a short time by using simple operations, while preventing the particles from being charged.

In order to achieve the above-mentioned objective, the particle surface-modifying device of the present invention is provided with a particle suspension section for preparing a suspension in which particles are suspended in a liquid containing a modifier and a modifying section for preparing surface modified particles by modifying the surface of the particles by using the modifier, wherein the modifying section modifies the surface of the particles by using the modifier while allowing the suspension from the particle suspension section to boil, and transports the surface modified particles by using a pneumatic transport derived from evaporated gas from the liquid in the suspension.

With the above-mentioned arrangement, the surface modified particles are prepared by modifying the surface of the particles by using the modifier while the suspension, prepared by the particle suspension section, is being allowed to boil; therefore, in the same manner as the above-mentioned method of the present invention, it becomes possible to prepare uniform surface modifying particles having a comparatively small particle size in a more stable manner.

In addition, in the above-mentioned arrangement, the surface modified particles are transported by using the pneumatic transport derived from evaporated gas from the liquid in the suspension; therefore, the transportation of the surface modified particles is simplified, and the modifying section can be provided, for example, as a tube form extending in a perpendicular direction, with a result that the floor space of the modifying section can be reduced.

Consequently, in the above-mentioned arrangement, the application of the pneumatic transport derived from the evaporated gas makes it possible to simplify the device construction and also to miniaturize the device and reduce the occupied space.

For a fuller understanding of the nature and advantages of the invention, reference should be made to the ensuing detailed description taken in conjunction with the accompanying drawings.

BRIEF DESCRIPTION OF THE DRAWINGS

FIG. 2 is the latter half of the above-mentioned flow chart.

FIG. 3 is a schematic view that shows the construction of a particle surface-modifying device of embodiment 1 of the present invention.

FIGS. 6(a) through 6(c) are explanatory drawings that show how nuclear boiling takes place in the suspension; and FIG. 6(a) is an explanatory drawing that shows how aggregate particles, each consisting of four particles, are dispersed upon nuclear boiling; FIG. 6(b) is an explanatory drawing that shows how aggregate particles, each consisting of three particles, are dispersed upon nuclear boiling; and FIG. 6(c) is an explanatory drawing that shows how aggregate particles, each consisting of two particles, are dispersed upon nuclear boiling.

FIG. 9 is the latter half of the above-mentioned flow chart.

FIG. 17 is a flow chart that shows respective processes of a particle surface-modifying method of example 2 of the present invention.

FIGS. 19(a) and 19(b) relate to normal droplets, and FIGS. 19(c) and 19(d) relate to abnormal droplets.

FIG. 24(a) is a remaining amount detector using a laser light, and FIG. 24(b) is a remaining amount detector using electrodes

DESCRIPTION OF THE EMBODIMENTS

[Embodiment 1]

Figure 1:
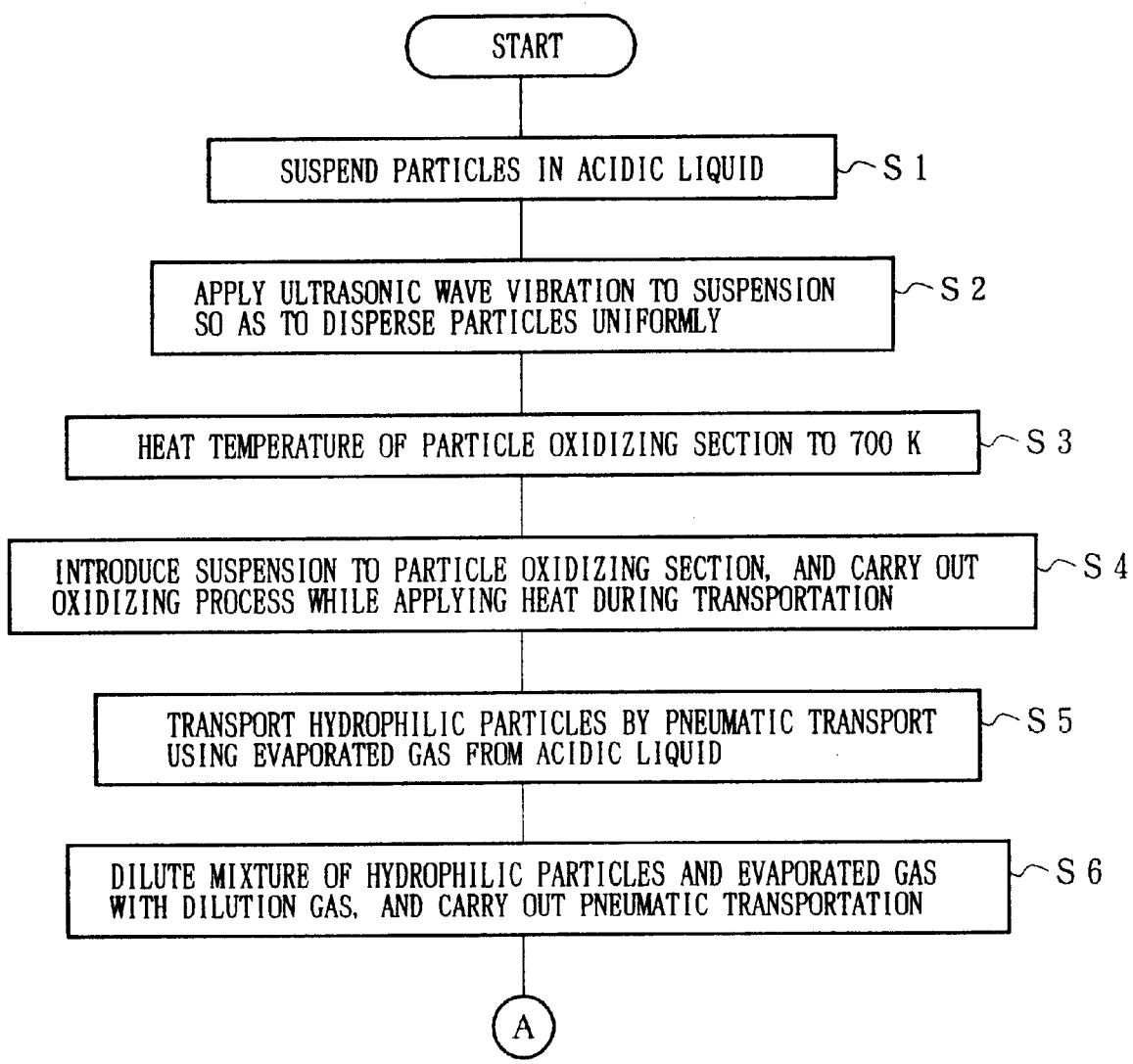
FIG. 1 is the former half of a flow chart that shows respective processes of a particle surface-modifying method of embodiment 1 of the present invention.

Referring to FIGS. 1 through 7, the following description will discuss one embodiment of the present invention.

Referring to FIG. 3, an explanation will be given of one example of a particle surface-modifying device in accordance with the present invention. As illustrated in FIG. 3, this particle surface-modifying device (hereinafter, referred to as a manufacturing device) 1 is constituted by a particle suspension section 2, a particle supply section 3, a particle oxidizing section 4, a dilution gas introduction section 5, a first liquid processing section G, two particle collecting sections 7a and 7b, an optical measurement section 8 and a second liquid processing section 9, and by heating hydrophobic particles in the presence of an oxidizing agent (modifier) while they are being carried (transported), this manufacturing device 1 makes it possible to continuously manufacture hydrophilic particles having surfaces to which a hydrophilic group is introduced by the oxidation, in a stable manner.

Figure 4:
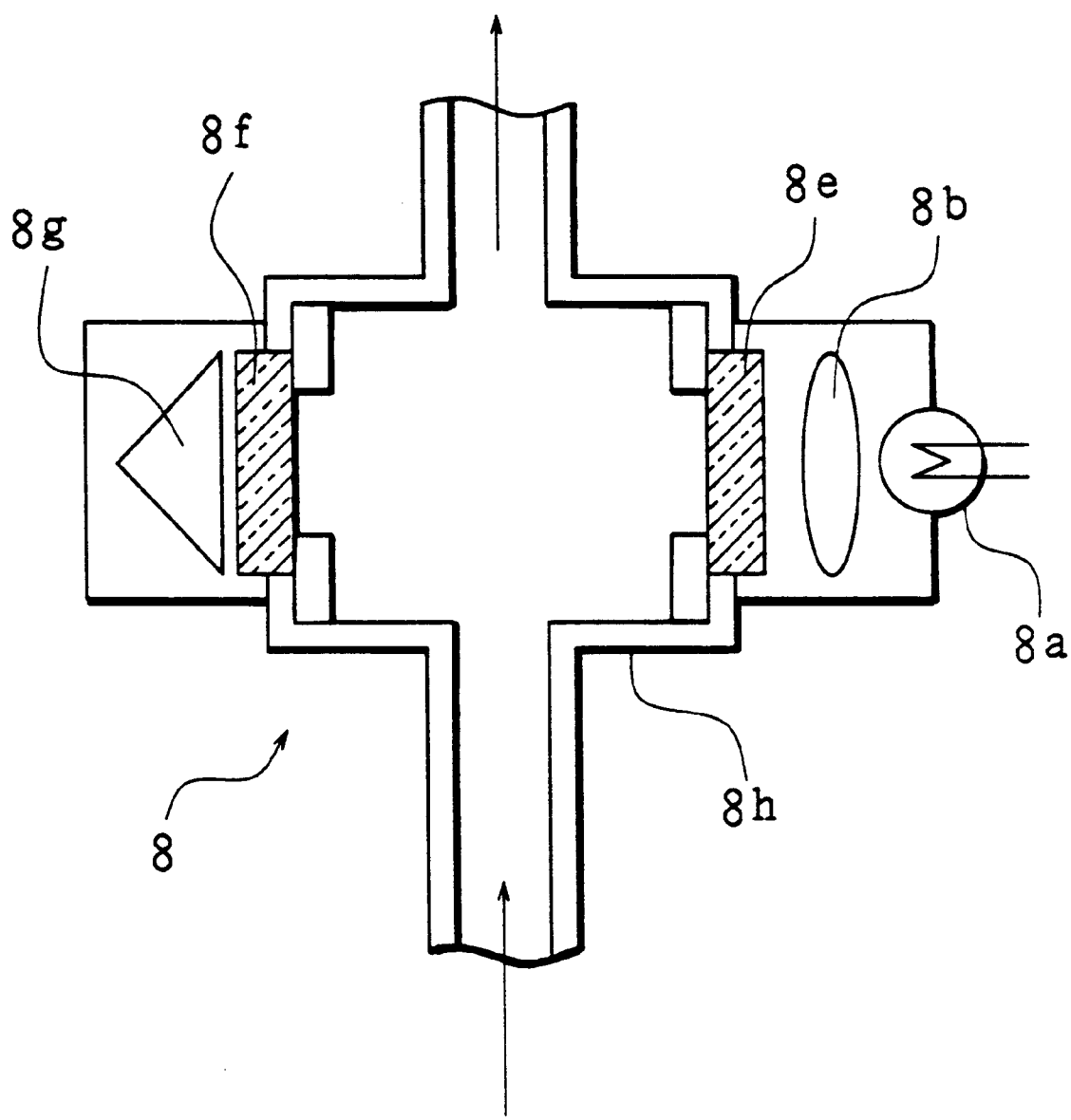
FIG. 4 is a schematic view that shows the construction of an optical measuring section in the particle surface-modifying device.

As illustrated in FIG. 4, the optical measurement section 8 is constituted by light source 8a, lens 8b, light-transmitting plates 8e and 8f, and a light detection section 8g, etc. that are installed inside a case 8h. Light, released from the light source 8a, is diffused and reduced by particles (including droplets) that have been introduced into the case 8h, with the result that its luminous energy is changed. Thus, the optical measurement section 8 measures the particle diameter, the number concentration of the above-mentioned particles and droplets based upon signals that have been outputted from a light detection section 8g in accordance with the luminous energy made incident thereon. In the above-mentioned particle surface-modifying device and the method thereof, it is possible to provide better control on the manufacturing process of hydrophilic particles by measuring the particle diameter and the number concentration of the particles by the use of the optical measurement section 8.

Here, the above-mentioned optical measurement section 8 is designed to measure the particle diameter and the number and density of the particles by adopting a light dialysis-diffusion method; however, the measuring method is not particularly limited by this, and for example, methods, such as an X-ray transmission technique, a precipitation method, a laser diffraction-diffusion method, and a photon correlation method in which dynamic diffusion is utilized, may be adopted. Moreover, in addition to the method for carrying out optical measurements, an image processing and analyzing method using an optical microscope or an electron microscope, etc. may be adopted. With respect to measurements on the number, for example, a light transmission method may be adopted.

As illustrated in FIG. 3, the particle suspension section 2 is provided with a container 21 that has a cylindrical or a square pillar shape. Inside the container 21 is stored suspension 22 formed by mixing and suspending particles in nitric acid (acidic compound) that is dissolved in water or mixed liquid between water and an azeotrope compound of water (hereinafter, referred to simply as water). The pressure and the flow rate of an inert gas 23 that is supplied into the sealed container 21 are adjusted so that the amount of liquid of the suspension 22 to be supplied from the particle suspension section 2 to the particle oxidizing section 4 through the particle supply section 3 can be controlled.

In the container 21 of the particle suspension section 2, for example, a stirring device such as a magnetic stirrer or a ultrasonic vibration device is installed as a particle dispersing device 24. The particle dispersing device 24 is used for preventing aggregate particles or for assisting to disperse aggregate particles in the suspension 22 inside the container 21 to a certain extent by using dispersion due to stirring and vibration. The particle suspension section 2 is connected so as to supply the suspension 22 to the particle oxidizing section 4 through the particle supply section 3.

Figure 5:
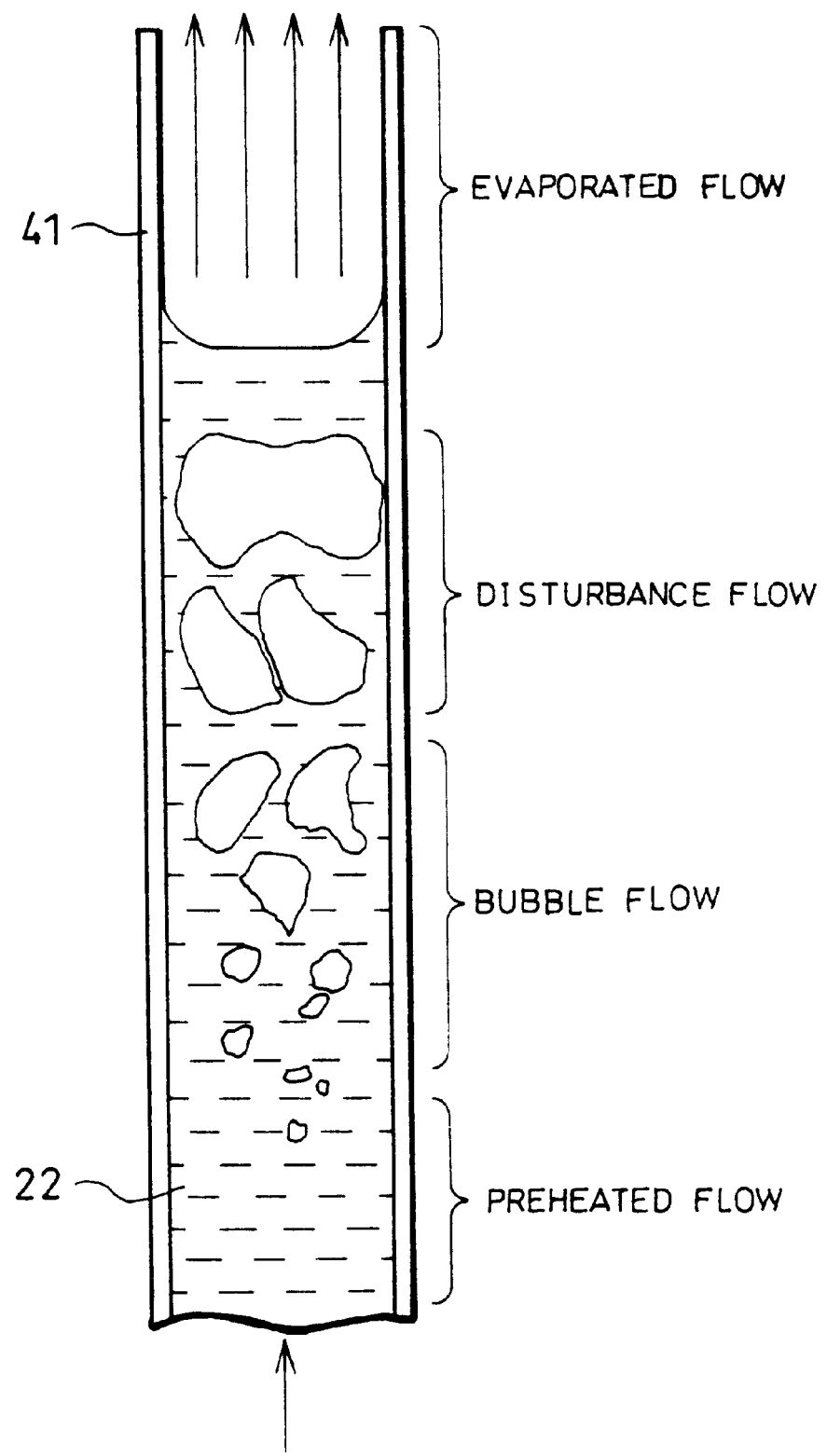
FIG. 5 is an explanatory drawing that shows how a suspension is subjected to phase changes while being transported in a particle oxidizing section in the particle surface-modifying device.

The particle oxidizing section 4 is provided with an electric heater 44 (heating section) that serves as a heating member for heating a tube 41 and the inside thereof through which the suspension 22 is introduced. In the particle oxidizing section 4, when the suspension 22, which flows through the tube 41 upwards, is rapidly heated by the tube 41 which has been preliminarily heated by the electric heater 44 while being carried upwards, it is abruptly changed successively into a preheated flow, a bubble flow, a disturbance flow and an evaporated flow, as illustrated in FIG. 5; thus, the particles in the suspension 22 can be heated while being carried upwards by the expansion of an evaporated gas derived from the acidic liquid consisting of nitric acid and water, from an inlet 45 to an outlet 46 shown in At this time, as illustrated in FIGS. 6(a) through 6(c), the suspension 22 inside the tube 41 is subjected to nuclear boiling with the particles 42 serving as nuclei in the acidic liquid 43 and evaporation of the acidic liquid 43, with the result that aggregate particles 42a in the particles 42 are dispersed into individual particles 42 due to pressure resulting from a rapid volume expansion at the time of the nuclear boiling and evaporation, and the acidic liquid 43 surrounding each particle 42 is nuclear boiled and evaporated so that each particle 42 is boiled by the acidic liquid 43 surrounding the particle 42; thus, the particle 42 is subjected to a rapid oxidation on its surface, and allowed to become a particle 42b having a hydrophilic property.

Figure 7:
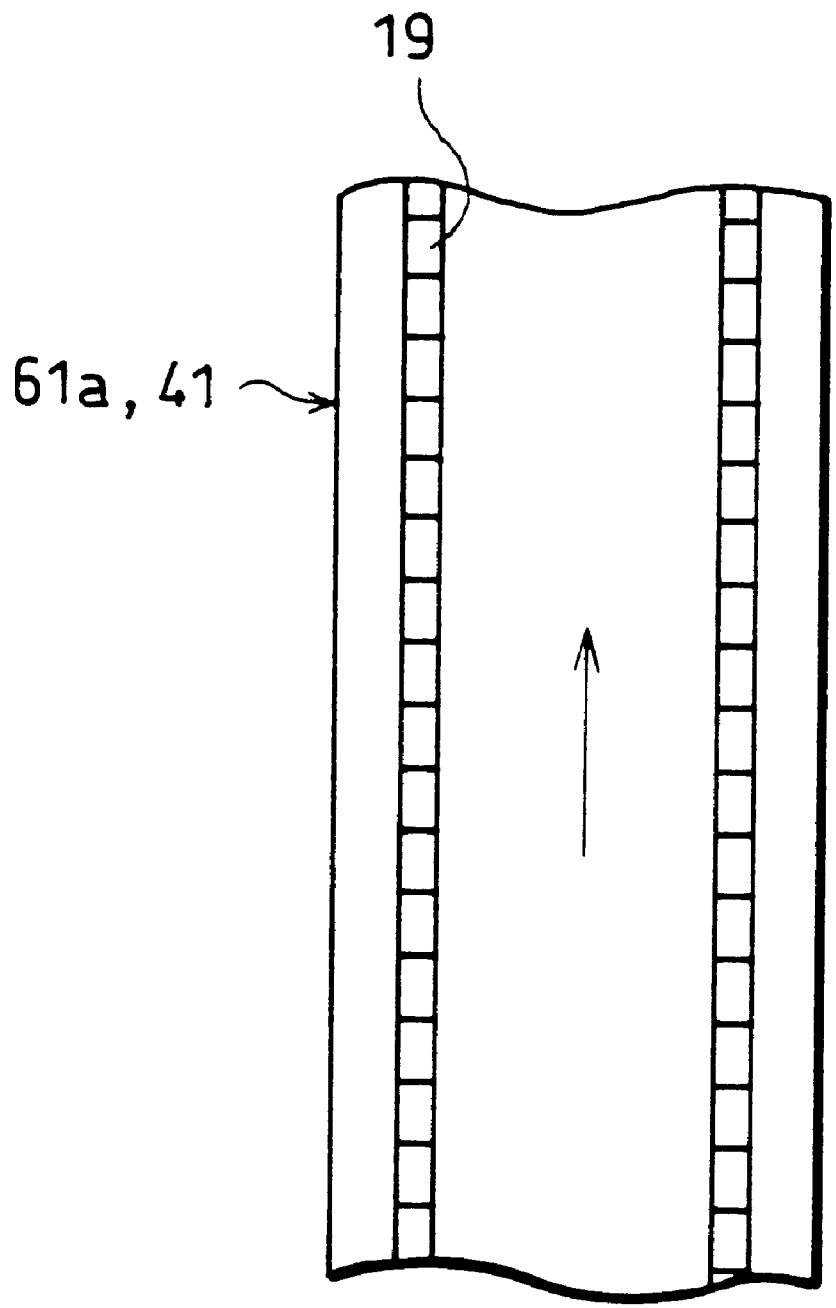
FIG. 7 is a schematic cross-sectional view that shows respective inner walls of a particle oxidizing section and a first cooling section in the particle surface-modifying device.

Here, as illustrated in FIG. 7, the inner wall of the tube 41 is provided with a water repellency section 19 made of a water repellency (liquid repellency) material. With respect to the water repellency material, for example, fluorocarbon polymers and flashing glass whose surface is roughened may be used.

Moreover, as illustrated in FIG. 3, the inner wall of the tube 41 is formed into a column tubular shape with the center axis of the tube 41 being inclined with an angle θ with respect to the horizontal direction. Consequently, since the particle oxidizing section 4 of this type allows the suspension 22 adhering to the inner wall to flow into a reservoir section 47 (liquid collection section), it becomes possible to prevent the inside of the tube 41 from being plugged by the suspension 22.

At the outlet 46 of the particle oxidizing section 4, a mixture of the hydrophilic particles formed in the particle oxidizing section 4 and evaporation gas of the acidic liquid 43 is diluted by a clean inert gas (for example, nitrogen gas), and the above-mentioned hydrophilic particles are subjected to a pneumatic transportation by the above-mentioned evaporation gas and the inert gas, and introduced into the first liquid processing section 6.

Here, in the above-mentioned oxidizing process for the surface of the particle, there are cases in which a sufficient amount of the hydrophilic group can not be obtained by only one oxidizing process. Therefore, as illustrated in FIG. 3, in the manufacturing device 1, the above-mentioned particle suspension section 2, the particle supply section 3, the particle oxidizing section 4 and the first liquid processing section 6 are newly connected to the following stage of the particle outlet of the particle collection section 7 interpolated between the first liquid processing section 6 and the second liquid processing section 9; thus, the surfaces of the hydrophilic particles obtained in the preceding stage may be again subjected to the repeated oxidizing process. In other words, a plurality of sets of the particle suspension section 2, particle supply section 3, particle oxidizing section 4 and the first liquid processing section 6, shown in FIG. 3, may be connected in series with each other.

In this case, with respect to the concentration of nitric acid of the acidic liquid 43 to be used in the next stage, a concentration different from that of the preceding process may be used. The application of different concentrations in nitric acid of the acidic liquid 43 makes it possible to desirably control the amount of hydrophilic groups adhering on the surface of each hydrophilic particle.

Moreover, chemicals different from the acidic liquid 43 used in the previous process, that is, liquids of other acidic compounds, such as, for example, sulfuric acid aqueous solution, hypochlorous acid solution, hydrogen peroxide, may be used to oxidizing the surface of each particle. In this case, a plurality of manufacturing sections, each consisting of the above-mentioned particle suspension section 2, the particle supply section 3, the particle oxidizing section 4 and the first liquid processing section 6, are connected in series with each other; and the acidic liquid 43 to be loaded into the particle suspension section 2 is preliminarily changed to a desired acidic compound liquid. Thus, it becomes possible to easily manufacture hydrophilic particles having surfaces on which hydrophilic groups having different ingredients or functional groups have been respectively given.

The mixture of the hydrophilic particles and the evaporated gas of the acidic liquid 43, which has been processed and produced in the particle oxidizing section 4, is further diluted by a clean dilution gas introduced by the dilution gas introducing section 5 so as to be turned into a pneumatic transport; and this is further transported to the first liquid processing section 6. With respect to the dilution gas, it is desirable to use an inert gas that is less reactive to the resulting hydrophilic particles and the evaporated gas derived from the acidic liquid 43, for example, nitrogen gas. The clean dilution gas is obtained by removing dusts, etc. from an inert gas using a capturing member such as a filter (for example, HEPA filter, ULPA filter, bug filter). By diluting the mixture by using the dilution gas, it becomes possible to prevent the respective hydrophilic particles that have been processed from aggregating with each other.

The first liquid processing section 6 is provided with a first cooling unit (cooling unit) 61 to which the pneumatic transport including the hydrophilic particles, the evaporated gas and the inert gas are successively introduced, and a first drying unit 62. The first cooling unit 61 is provided with a tube section 61a to which the above-mentioned pneumatic transport is introduced and a cooling member 61b for cooling the tube section 61a. The cooling member 61b has, for example, a Peltier element, and cools off the inside of the tube section 61a, that is, the above-mentioned pneumatic transport, by using the Peltier effect, thereby making it possible to virtually recover the evaporated gas in the first cooling unit 61.

Here, the cooling member 61b is only required to have an arrangement corresponding to a desired cooling temperature, and is not particularly limited. For example, it may have an arrangement in which the above-mentioned pneumatic transport thus introduced is cooled off by using, for example, an organic solvent (cooling medium) that has been cooled by liquid nitrogen, water, dry ice, etc. or helium that has a comparatively good conduction of heat.

In the first liquid processing section 6, the pneumatic transport, obtained by diluting the mixture from the particle oxidizing section 4, is cooled off so as to reduce the amount of saturated vapor of the evaporated gas, with the result that the vapor of the acidic liquid 43 is liquefied and recovered. Here, in order to accelerate drying of the pneumatic transport including the hydrophilic particles that have been processed, the diluted gas from the dilution gas introducing section 5 may be allowed to pass through a desiccating agent, and dehumidified.

As illustrated in FIG. 7, the inner wall of the tube section 61a is provided with a water repellency section 19 made of a water repellency in the same manner as the inner wall of the particle oxidizing section 4, and is also formed into a column tubular shape with an inclination with an angle θ with respect to the horizontal direction, as illustrated in FIG. 3. Consequently, since the acidic liquid 43 adhering to the inner wall of the tube section 61a through cohesion is allowed to flow into a reservoir section 61 (liquid collection section) and recovered therein, it becomes possible to prevent the inside of the tube section 61a from plugging and consequently to carry out a continuous operation. After the above-mentioned cooling process, the resulting matter may be introduced to the first drying section 62, if necessary, and the acidic liquid 43 may be further recovered. The first drying section 62 has an arrangement which allows its particle piping line to be exposed to a processing space filled with a desiccating agent so that the hydrophilic particles can be further dried and the acidic liquid 43 can be further removed.

The hydrophilic particles, transported from the first liquid processing section 6, is recovered (collected) by the first particle collecting section 7a. The collecting method includes a scrubbing method using water as a collecting medium and a filter dust collection method using a bug filter, etc. The hydrophilic particles, thus collected, are washed by using super pure water, etc. in a washing device not shown, if necessary. Thus, the hydrophilic particles, from which impurities have been removed, are obtained. The hydrophilic particles, after having been washed, are dried to an extent so as not to cause any aggregation thereof, if necessary.

The pneumatic transport from which the hydrophilic particles have been virtually removed is further introduced to the liquid processing section 9, and cooled to a cryogenic temperature (approximately 250 K) by the second cooling unit 91 of the second liquid processing section 9 so as to reduce the amount of saturated vapor, with the result that the residual acidic liquid 43 is liquefied and recovered (collected), and further allowed to pass through the second drying section 92 so that it is dehumidified and subjected to an exhaust process. With respect to the second cooling unit 91 and the second drying section 92, these have the same constructions as the aforementioned first cooling unit 61 and the first drying section 62. With respect to the first liquid processing section 6 and the second liquid processing section 9, either a cooling section or a drying section may be placed therein; and both of them may more preferably be placed.

Moreover, the second particle collecting section 7b is installed between the second cooling unit 91 and the second drying section 92. In the second particle collecting section 7b, the recovering (collecting) of the hydrophilic particles is carried out in the same collecting method as described earlier. The application of the second particle collecting section 7b makes it possible to improve the collecting efficiency of the hydrophilic particles which have their surfaces oxidized and possess hydrophilic groups, and also to collect the hydrophilic particles more positively.

With the above-mentioned constitution, it becomes possible to prevent the resulting hydrophilic particles from scattering over the surrounding space at the time of the exhaust process, and also to discharge the pneumatic transport after use in a safer processed state. Here, a plurality of pairs of the first particle collecting section 7a and the second particle collecting section 7b may be installed, if necessary.

With respect to the respective tubular processing sections in the particle oxidizing section 4, the first liquid processing section 6 and the second liquid processing section 9, it is preferable to make their center axis inclined with an angle $\theta$ ($0°<\theta\leq 90°$, more preferably, $70°\leq\theta\leq 90°$) with respect to the horizontal direction, and also to make them arranged in parallel with each other. Such an arrangement makes it possible to effectively utilize the expansion of the acidic liquid 43 due to its evaporation in the particle oxidizing section 4 for the manufacture and transport of the hydrophilic particles, to simplify the device structure, and also to miniaturize the device structure, that is, to reduce the space occupied by the device, because of a reduction in the necessary deck area.

Next, with respect to a particle surface-modifying method of the present invention, referring to flow charts in FIG. 1 and FIG. 2, an explanation will be given of one example in which a particle surface-modifying process (particle surface-oxidizing process) is carried out under predetermined conditions by using the above-mentioned manufacturing device 1.

First, as illustrated in FIG. 1, particles are suspended in an acidic liquid (Step 1; step is, hereinafter, referred to as S), and the particles in the resulting suspension are successively uniformly dispersed by using, for example, ultrasonic wave vibration (S2).

Next, the temperature of the particle oxidizing section 4 is raised to a specified value, for example, 700K (S3), and the above-mentioned suspension is introduced to the particle oxidizing section 4 that has a temperature rise as described above. In the particle oxidizing section 4, the acidic liquid of the suspension is rapidly boiled and evaporated while the suspension is being transported so that nuclear boiling occurs with the particles in the suspension serving as nuclei, with the result that aggregate particles are separated by a rapid expansion of volume due to a phase change at that time, and the surface of each particle is rapidly heated at the presence of the acidic liquid so that the particle is subjected to a rapid oxidation on its surface, and allowed to become a hydrophilic particle (S4).

In addition to the above-mentioned oxidizing process (S4), the hydrophilic particles are transported by an expansion of the evaporated gas of the acidic liquid (S5), and a mixture of the hydrophilic particles and the evaporated gas, transported from the particle oxidizing section 4, is diluted by a dilution gas that is an inert gas so that a pneumatic transport including the hydrophilic particles is pneumatic transported (S6).

Thereafter, as illustrated in FIG. 2, by cooling the pneumatic transport (S7), the acidic liquid is condensed and recovered from the pneumatic transport (S8). Successively, the pneumatic transport is dehumidified by using a desiccating agent (S9), and thereafter, the hydrophilic particles are collected from the pneumatic transport that has been dehumidified (S10).

Next, the pneumatic transport from which the hydrophilic particles have been collected is cooled to a cryogenic temperature (S11) so that the residual acidic liquid and the hydrophilic particles are respectively collected (S12), and further dehumidified and exhausted (S13).

As described above, the manufacturing method and manufacturing device for hydrophilic particles of the present invention are a method and a device, wherein, in order to impart a hydrophilic property to hydrophobic particles that have small particle sizes and easily aggregate with each other, with an average particle size being in the range of 10 nm and 20 µm, a suspension 22 in which the above-mentioned particles have been immersed and dispersed in an acidic liquid 43 is rapidly heated and boiled (evaporated), while being transported in one direction along a straight line or a curved line, so that the surface of each particle is oxidized by the acidic liquid 43 while the aggregate particles are being dispersed.

Therefore, different from a conventional method for oxidizing particles while dispersing them by using a stirring device such as stirring blades, the present invention makes it possible to avoid charging of particles 42 due to friction, etc. at the time of stirring. Moreover, in the present invention, since the hydrophilic particles 42b, obtained by utilizing an expansion of the evaporated gas of the acidic liquid 43, are carried (transported), it becomes possible to simplify the device and operation, to shorten the operation time, and consequently to cut costs. Moreover, in the above-mentioned arrangement and method, even in the case of aggregate particles 42, an external force due to the volume expansion is utilized to loosen the aggregation, thereby making it possible to provide hydrophilic particles 42b with a small particle size and a high dispersing property in a stable manner.

Thus, the present invention makes it possible to provide uniform hydrophilic particles 42b having a comparatively small particle size by using simple device and operation in a short time, at low costs, in a stable manner, without charging the resulting hydrophilic particles 42b.

EXAMPLE 1

Figure 8:
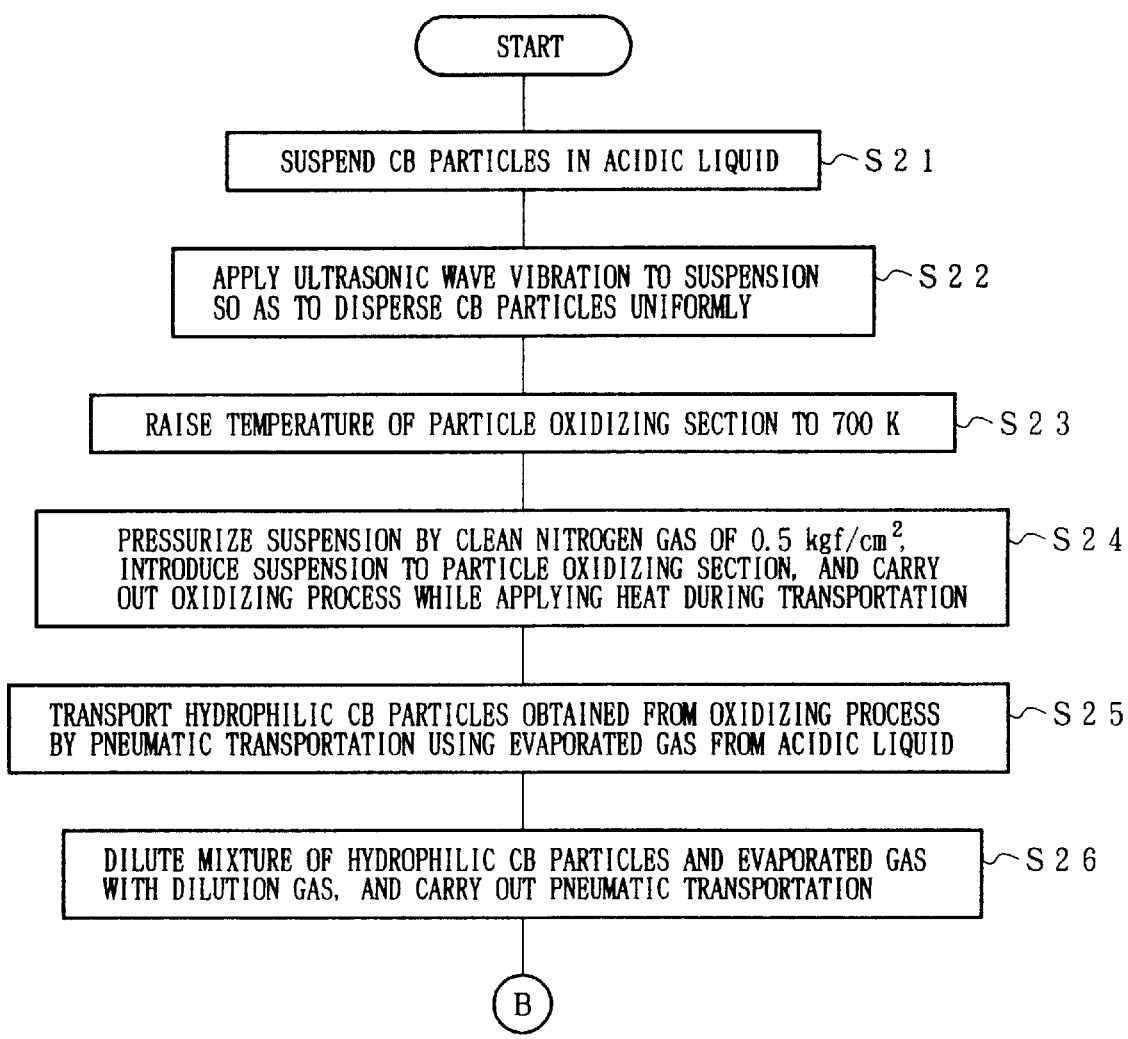
FIG. 8 is s the former half of a flow chart that shows respective processes of a particle surface-modifying method of example 1 of the present invention.

Referring to flow charts in FIG. 8 and FIG. 9, the following description will discuss example 1 that is a specific example of the above-mentioned embodiment 1. First, as illustrated in FIG. 8, carbon black particles (hereinafter, referred to as CB particles), which have a particle size of 0.5 $\mu$m, were mixed in a nitric acid aqueous solution (nitric acid concentration 1.1 N) serving as an acidic liquid 43 so as to have a particle number concentration of $10^{15}$ particles/m$^3$; thus, a suspension 22 was prepared (S21).

Thereafter, ultrasonic wave vibration was applied to the suspension 22 by a particle-dispersing device 24 for generating ultrasonic wave vibration so that the CB particles was dispersed so as to form a more uniform suspension 22 (S22). Moreover, the temperature of the particle oxidizing section 4 was raised to 700K by using an electric heater 44 (S23).

Next, the inside of a container 21 containing the suspension 22 was pressurized at a pressure of 0.5 kgf/cm$^2$ by using clean nitrogen gas from which dusts, etc. had been removed by an air filter, etc., with the result that the above-mentioned suspension 22 was subjected to an oxidizing process while being introduced into and carried through the particle oxidizing section 4 so that hydrophilic particles were obtained (S24).

At this time, the suspension 22, introduced into a tube 41 from the inlet 45 of the particle oxidizing section 4, was abruptly heated to approximately 700K so that the nitric acid aqueous solution in the suspension 22 was nuclear boiled and evaporated with the CB particles in the suspension 22 serving as nuclei.

Consequently, inside the particle oxidizing section 4, the suspension 22 was transported from the inlet 45 to the outlet 46 by an expansion due to the evaporation of the nitric acid aqueous solution, and while the CB particles were being dispersed (including dispersion of aggregate particles into individual particles), the surface of each of the CB particles was subjected to an oxidizing process by nitric acid, resulting in hydrophilic particles whose surface possesses carboxylic groups serving as a hydrophilic group.

Successively, after a mixture of the hydrophilic particles and the evaporated gas had been transported from the particle oxidizing section 4 by the expansion of the evaporated gas of the nitric acid aqueous solution (acidic liquid) (S25), for example, clean nitrogen gas, serving as a dilution gas, was introduced from a dilution gas introducing section 5 to the mixture so that the mixture was diluted by the nitrogen gas. A pneumatic transport, formed by the dilution, was pneumatically transported to the first liquid processing section 6 by using the dilution gas and the evaporated gas contained in the pneumatic transport (S26).

Thereafter, as illustrated in FIG. 9, the pneumatic transport was introduced in the tube section 61a that had been cooled (273K) inside the first cooling section 61 of the first liquid processing section 6, and cooled therein (S27), with the result that the portion of the evaporated nitric acid aqueous solution (acidic liquid) was virtually liquefied and collected (recovered) so as to be removed therefrom (S28). Next, after the resulting pneumatic transport had been dehumidified and dried (S29) at the first drying section 62 (S29), hydrophilic particles contained in the pneumatic transport were collected (captured) therefrom in the first particle collecting section 7a (S30).

Successively, the pneumatic transport from the first particle collecting section 7a, from which the hydrophilic particles had almost been removed, was further introduced to the second cooling unit 91 that had been cooled to cryogenic temperature, that is, 250K (S31), so as to reduce the amount of saturated vapor by the cooling, with the result that the residual nitric acid aqueous solution (acidic liquid) was collected and removed, and the residual hydrophilic particles were collected in the second particle collecting section 7b (S32).

Thereafter, the pneumatic transport was allowed to pass through the second drying section 92 so as to be dehumidified, and then exhausted (S33); thus, the surface-modifying process for CB particles was completed. The hydrophilic particle, thus collected, was washed with super pure water so that impurities were removed therefrom.

Next, the above-mentioned hydrophilic particles that are CB particles that have been surface-modified and CB particles prior to the process were added into super pure water respectively, and these were stirred so as to examine the wettability of the respective particles. As a result, the CB particles prior to the process did not get wet in super pure water, and stayed on the water surface. In contrast, the hydrophilic particles got wet in super pure water, and were dispersed and suspended therein. Thus, it is confirmed that the hydrophilic particles obtained from the process, which is pigment that has been subjected to a surface-modifying process of the method of the present invention, has an improved wettability as compared with the non-processed particles.

[Embodiment 2]

The above-mentioned embodiment 1 exemplified a method and a device in which the suspension 22 with CB particles suspended in the acidic liquid 43 was introduced to the particle oxidizing section 4 so that the surface of each CB particle was subjected to an oxidizing process. However, referring to FIGS. 10 through 16, embodiment 2 exemplifies a method and a device in which a suspension 22, in the form of droplets, is introduced to the particle oxidizing section 4.

Figure 10:
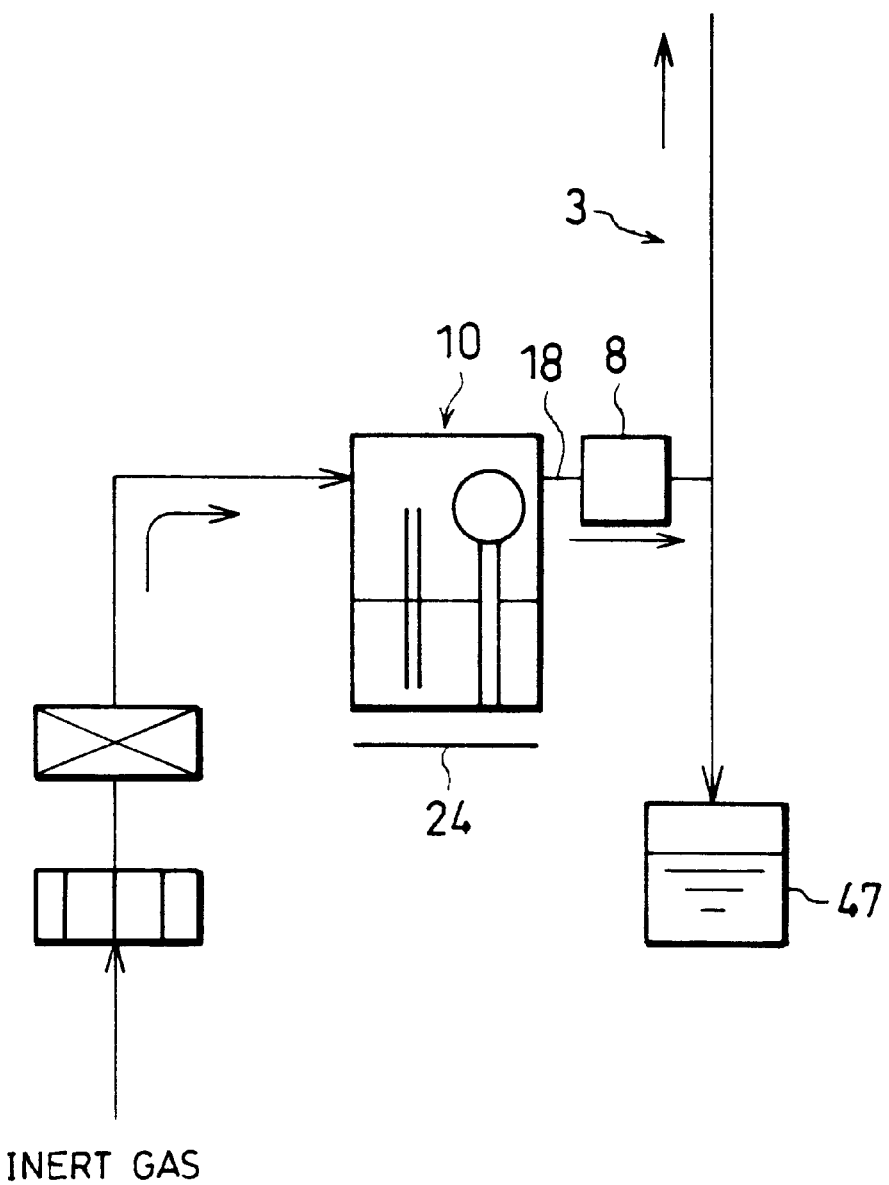
FIG. 10 is a schematic view that shows the construction of a droplet forming section in a particle surface-modifying device of embodiment 2 of the present invention.
Figure 11:
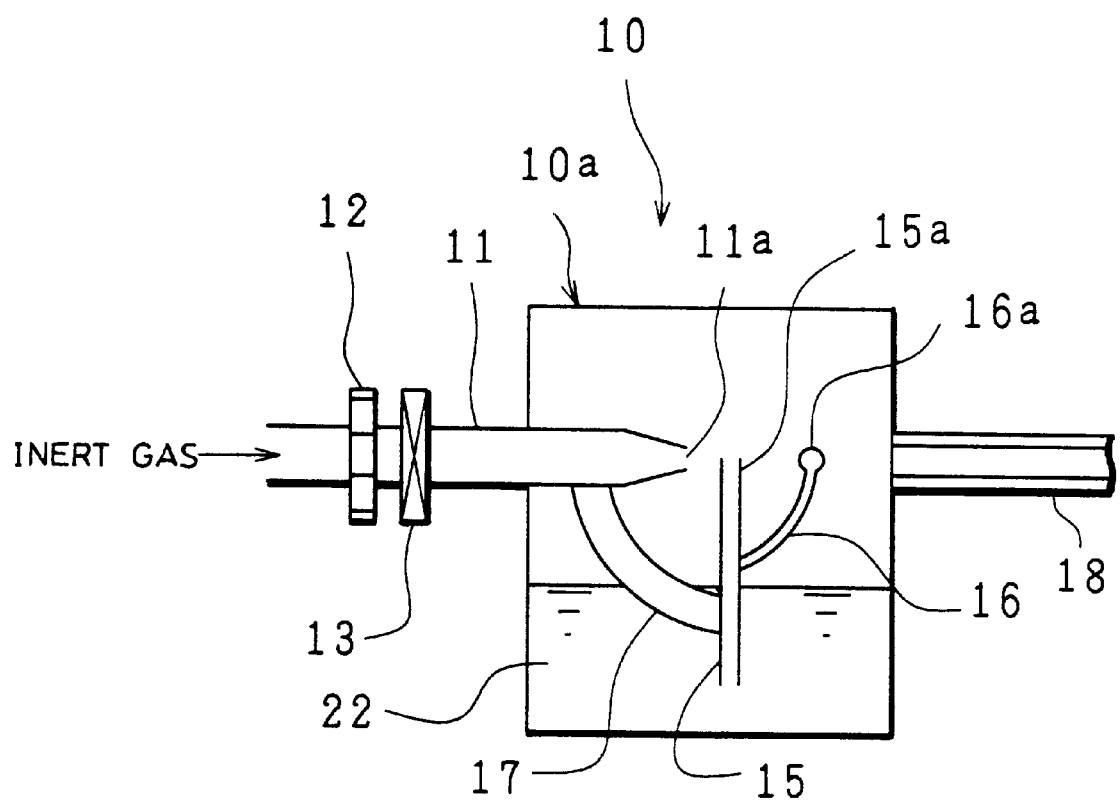
FIG. 11 is an enlarged schematic view that shows the construction of the droplet forming section.
Figure 12:
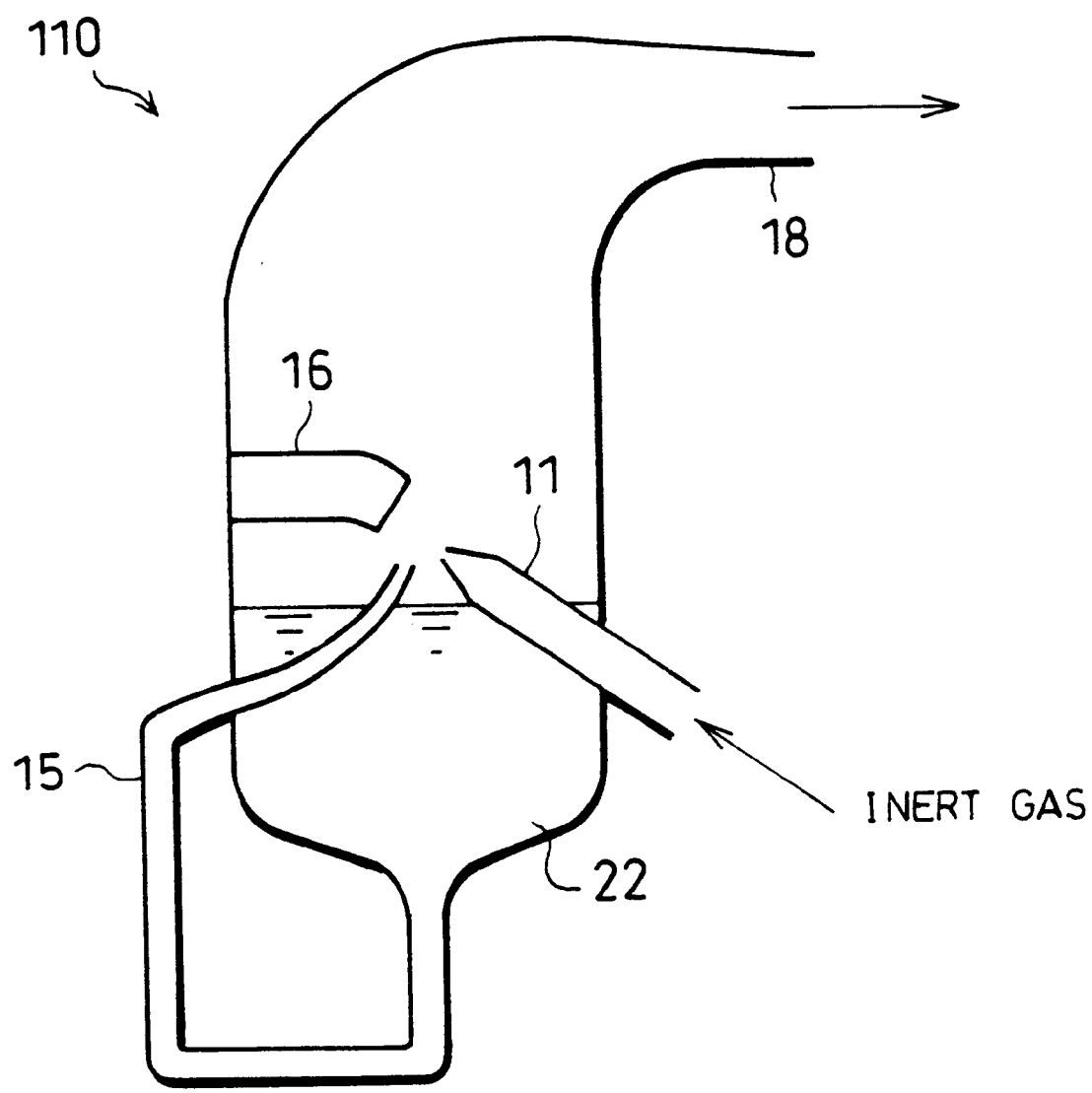
FIG. 12 is a schematic view that shows a modified example of the droplet forming section.
Figure 13:
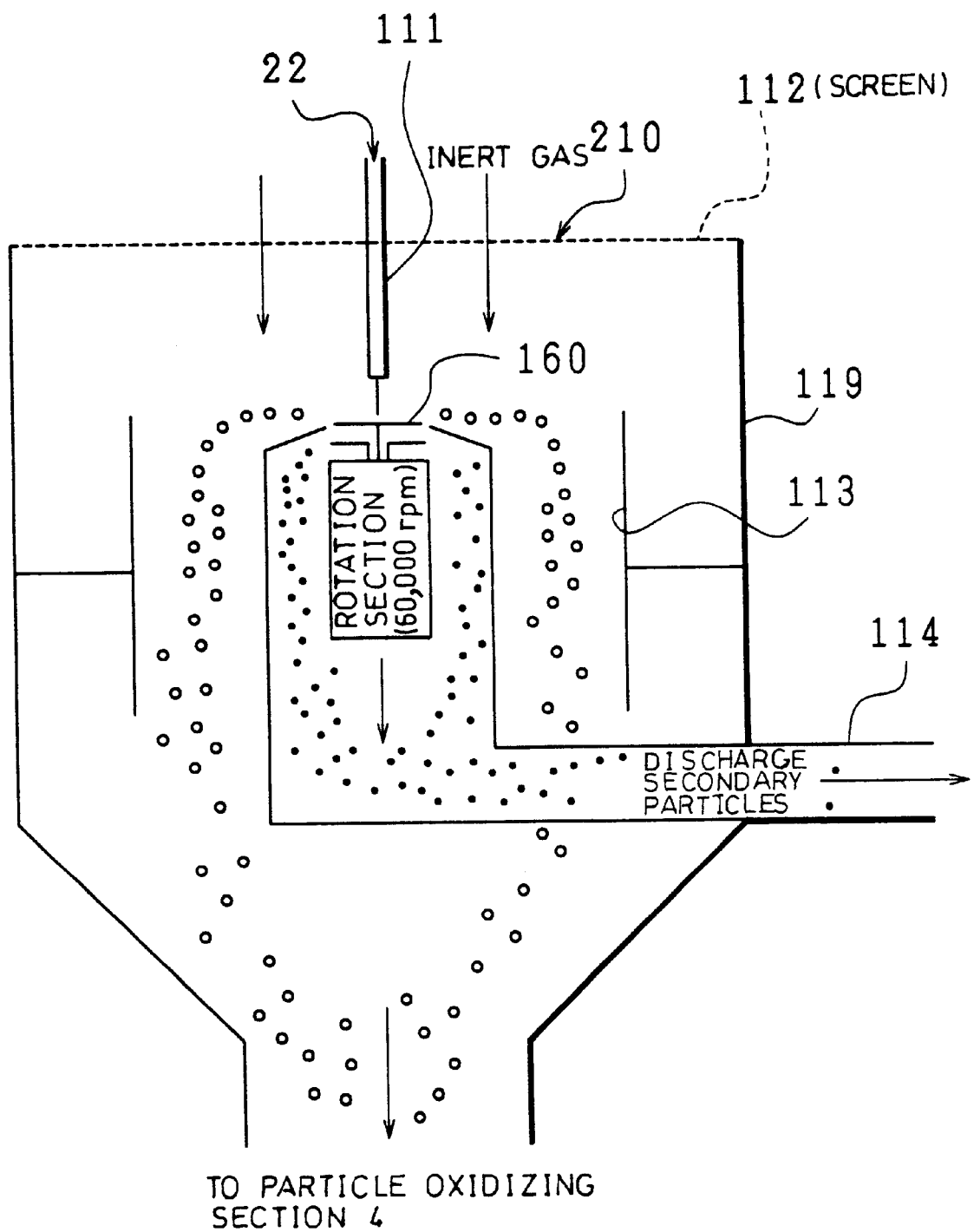
FIG. 13 is a schematic view that shows another modified example of the droplet forming section.
Figure 14:
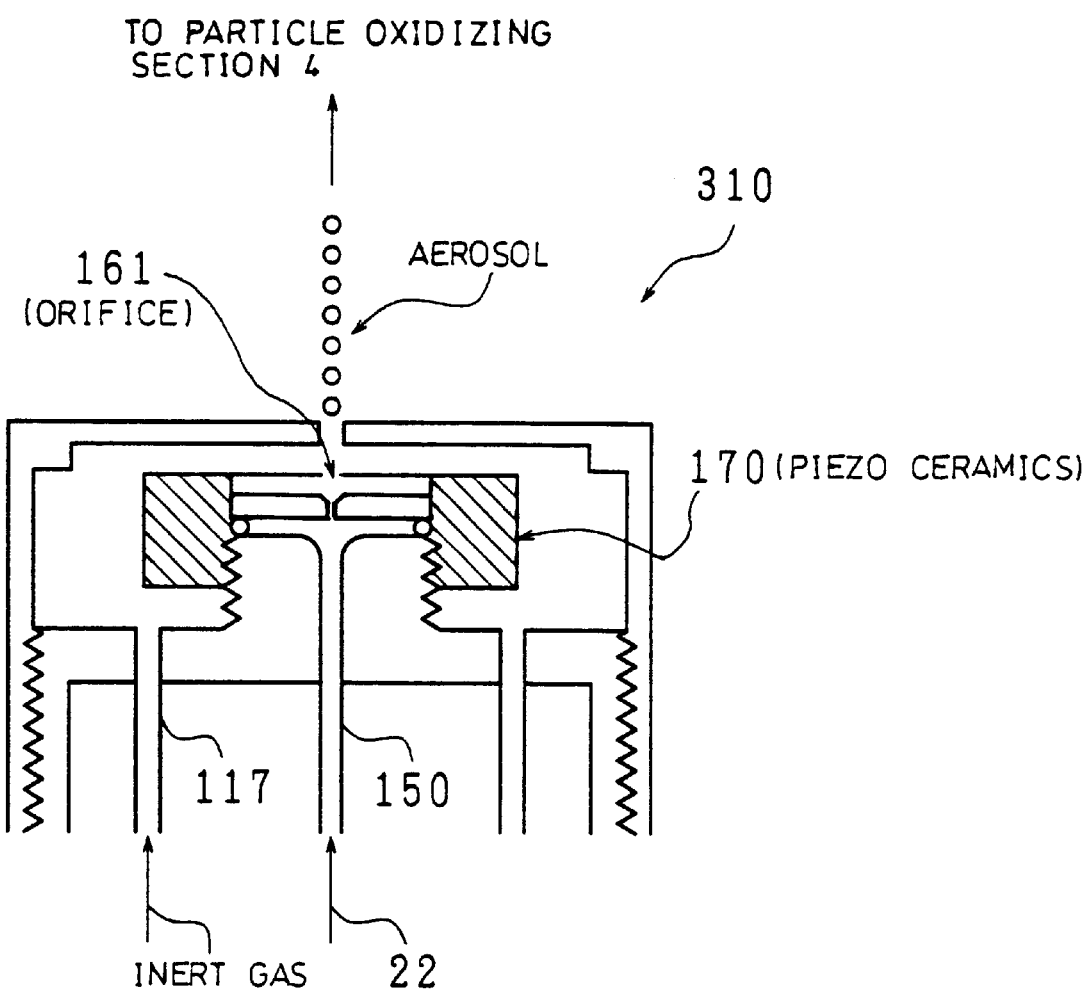
FIG. 14 is a schematic view that shows still another modified example of the droplet forming section.
Figure 15:
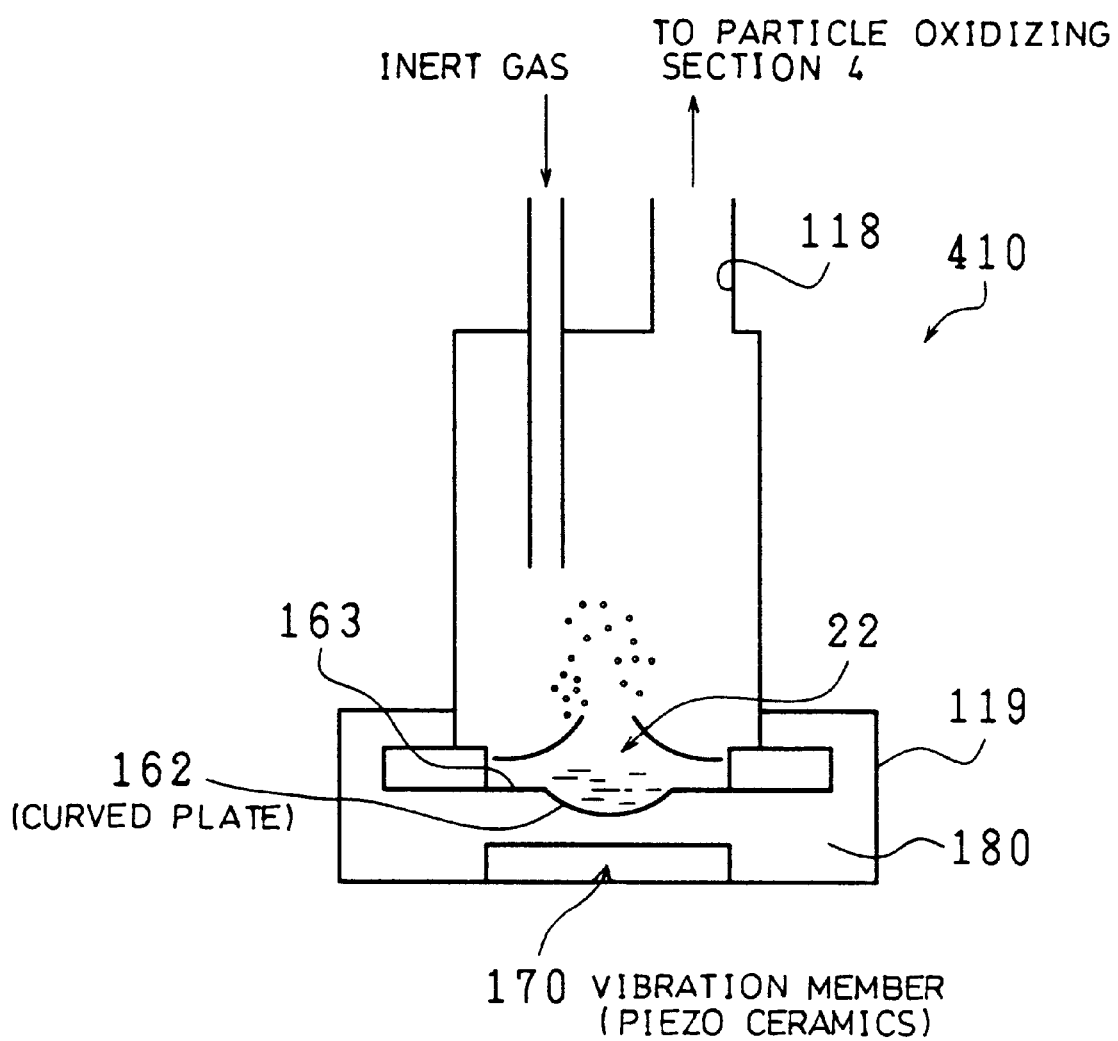
FIG. 15 is a schematic view that shows still another modified example of the droplet forming section.
Figure 16:
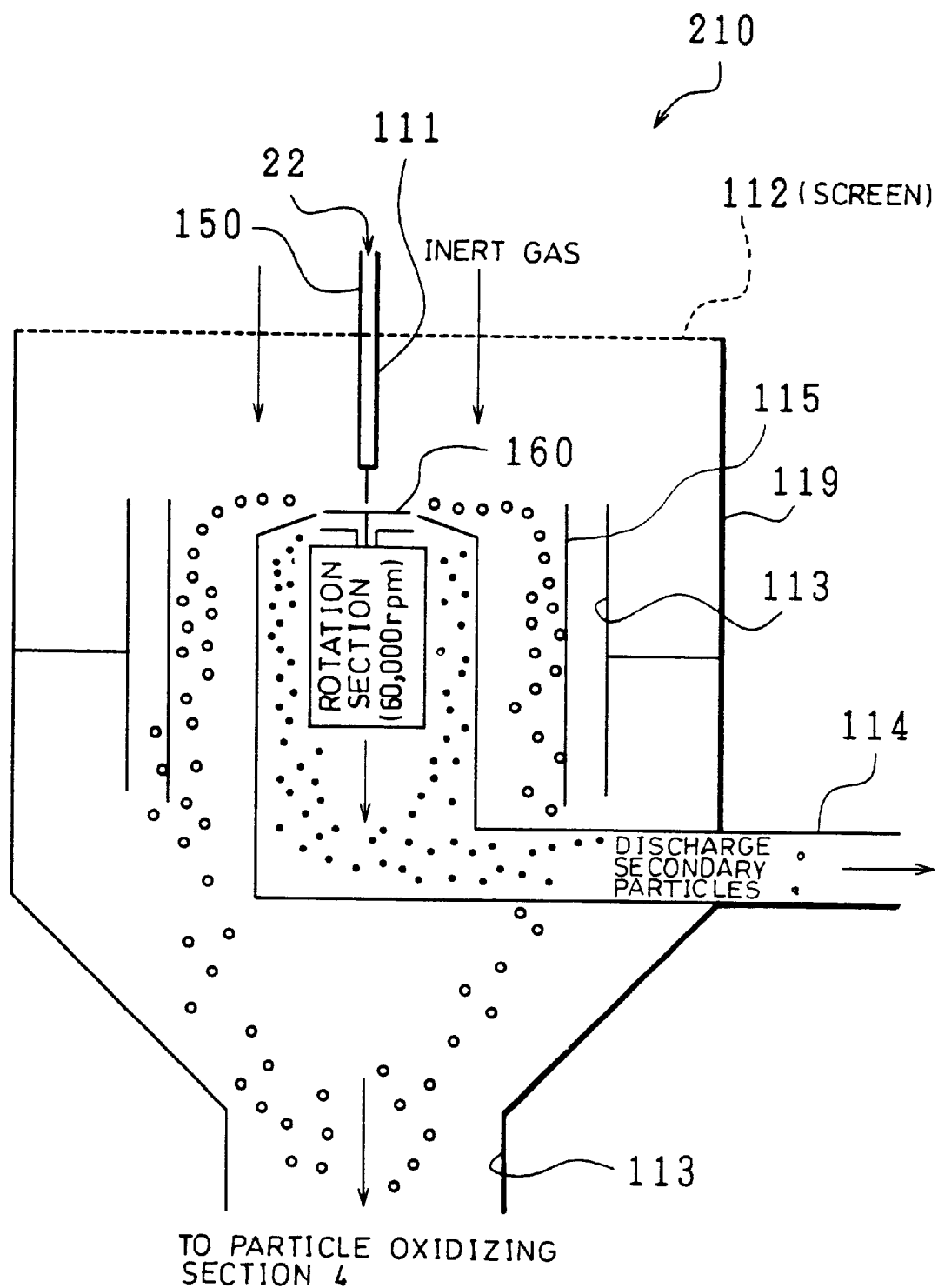
FIG. 16 is a schematic view that shows still another modified example of the droplet forming section.

First, as illustrated in FIG. 10, in order to form droplets from the suspension 22, a droplet forming section 10 is installed instead of the particle suspension section 2 shown in FIG. 3. The other device constructions except the installation of the droplet forming section 10 and the method of the surface-modifying process for CB particles are the same as those described in the above-mentioned embodiment 1.

The method for forming droplets from the suspension 22 is not particularly limited; however, a method for spraying the suspension 22 is simple and preferable. The size of the droplets is not particularly limited, and may be set in accordance with the particle size of desired hydrophilic particles; however, it is preferable to set it in the range of 0.1 μm to 100 μm.

FIG. 11 shows one example of a construction of the droplet forming section 10. The droplet forming section 10 is provided with a container 10*a*, a nozzle 11, a suspension supply tube 15, a baffle (droplet-size adjusting section) 16, and a droplet supply tube 18. The tip 11*a* of the nozzle 11, the upper end 15*a* of the suspension supply tube 15, and the tip 16*a* of the baffle 16 are horizontally aligned virtually along a straight line.

In the container 10*a* is loaded a predetermined amount of suspension 22 in which hydrophobic particles such as pigment, for example, CB particles, are suspended in an acidic liquid 43. Here, in the case when a pigment is used as the hydrophobic particles, the particle size of the pigment is normally set approximately in the range of 10 nm to 20 μm; however, it is not particularly limited by this range.

The suspension supply tube 15 is secured to the nozzle 11 by a supporting member 17. The suspension supply tube 15 has its lower end dipped in the suspension 22 and opened therein; thus, when inert gas is horizontally sprayed to the upper end 15*a* and the inside thereof becomes an evacuated state, the suspension 22 is sucked up to the upper end 15*a*.

The nozzle 11 is connected to a position of the container 10*a* that faces the droplet supply tube 18 so that inert gas (carrier) is supplied to the container 10*a*. The nozzle 11 is connected to an inert gas supply device, not shown, through an air filter (impurity stripper) 13 and a mist removing section (impurity stripper) 12.

Thus, the nozzle 11 horizontally sprays the inert gas to the upper end 15*a* of the suspension supply tube 15 from its tip 11*a*, thereby sucking the suspension 22 and dispersing it; thus, the suspension 22 is made into droplets (mist). The above-mentioned mist removing section 12 and air filter 13 are designed to remove impurities contained in the inert gas so as to supply clean inert gas to the container 10*a*.

The baffle 16, which is secured to the suspension supply tube 15, has a tip 16*a* having a spherical shape. The baffle 16 is designed so that the droplets, formed at the upper end 15*a* of the suspension supply tube 15, are allowed to collide with the tip 16*a* together with the inert gas, thereby making it possible to remove droplets having comparatively large particle sizes. In other words, by adjusting the size of the droplets by using the baffle 16, the droplet forming section 10 can supply uniform droplets having comparatively small particle sizes to the particle oxidizing section 4.

The maximum particle size of the droplets to be supplied to the particle oxidizing section 4 can be desirably controlled by appropriately adjusting the size of the tip 16*a* of the baffle 16. Moreover, the amount of supply of the droplets per unit time can be desirably controlled by adjusting spraying conditions such as the tube diameter of the suspension supply tube 15, the amount of flow and the flow rate of the inert gas. Here, the droplets, removed by the baffle 16, drop along the baffle 16, and are reused as a suspension 22.

Additionally, the above-mentioned description exemplified a spraying construction as a construction of the droplet forming section 10; however, the present invention is not particularly limited by this construction, and, for example, another droplet forming section 110 having a spraying construction as shown in FIG. 12, or other droplet forming sections 210, 310 and 410 using other methods as shown in FIGS. 13 through 15, may be adopted respectively.

First, the droplet forming section 210 shown in FIG. 13 sprinkles a liquid film of the suspension 22 by utilizing a centrifugal force so as to form droplets containing minute CB particles. The droplet forming section 210 makes it possible to stably form droplets having small particle sizes even when the suspension 22 has a high concentration and a high viscosity.

In the droplet forming section 210 of this type, a disc shaped rotary section 160 serving as a droplet generating section is installed in the center of a cylindrical casing 119, a nozzle 111, which supplies the suspension 22, is placed right above the center of the rotary section 160. Moreover, a screen 112, which covers the opening at the end of the casing 119 on the upper side of the rotary section 160, is installed so that inert gas is sprayed to the rotary section 160 through this screen 112.

On the periphery of the rotary section 160 are provided paths 113 which are used for introducing only some droplets having desired sizes out of droplets containing minute CB particles formed from the suspension 22 to the particle oxidizing section 4. Moreover, below the rotary section 160 are provided drain paths 114 which recover and discharge droplets having sizes smaller than the desired sizes, which are generated by the sprinkling process of the suspension 22.

Next, an explanation will be given of the operation of such a droplet forming section 210. First, the suspension 22 with CB particles suspended in an acidic liquid 43 is supplied onto the rotary section 160 rotating at a high speed by the nozzle 111 through an introducing tube (not shown), and the suspension 22, forming a liquid film on the rotary section 160, is sprinkled outward from the peripheral edge of the rotary section 160 by a centrifugal force, thereby forming droplets (in the form of mist). The droplets are transported to the particle oxidizing section 4 by the inert gas (carrier) from the screen 112 through the paths 113. Here, unnecessary droplets, for example, whose particle size is too small, are discriminated and discharged through the drain paths 114.

Next, in a droplet forming section 310 as illustrated in FIG. 14, a jet flow of the suspension 22 rushing out from an orifice 161 is further added by ultrasonic wave vibration so that droplets are generated from the suspension 22.

In such a droplet forming section 310, the suspension 22 is introduced into the orifice 161 by an introducing tube 150, and ultrasonic wave vibration, generated by a vibration member 170 such as a piezo electric element (piezo ceramics), is applied through the orifice 161 to the suspension 22 that rushes out from the orifice 161 in a jet form so as to change it into droplets (aerosol). The generation rate of the droplets is controlled by the oscillation frequency of the vibration member 170. The droplets thus formed are transported to the particle oxidizing section 4 by a pneumatic transport using inert gas (carrier) that is supplied from a gas supply tube 117 that is connected to the lower side of a space 116 storing the orifice 161, etc.

Lastly, in a droplet forming section 410 as shown in FIG. 15, droplets are generated by using ultrasonic wave vibration. In such a droplet forming section 410, a supply section 163 having a vessel shape, to which the suspension 22 is introduced through an introducing tube (not shown), is installed on the lower portion of the casing 119, and a vibration member 170 made of a piezo element (piezo ceramics) for generating ultrasonic wave vibration is placed in the lower portion of the supply section 163. Here, a medium 180 for transmitting the ultrasonic wave vibration from the vibration member 170 to the supply section 163 is loaded between the supply section 163 and the vibration member 170.

Moreover, the bottom of the supply section 163 is provided as a curved plate 162 that protrudes downward, and the ultrasonic wave vibration, generated by the vibration member 170, is concentrated on the liquid surface of the suspension 22 inside the supply section 163 by the above-mentioned curved plate 162 so that the generation of droplets from the suspension 22 is accelerated on the liquid surface of the suspension 22. Furthermore, inert gas (carrier) is supplied into the casing 119 from above the casing 119, with the result that the droplets thus generated are transported to the particle oxidizing section 4 through an outlet 118 by a pneumatic transport using the inert gas (carrier).

In the respective droplet forming sections 10, 110, 210, 310 and 410 having the above-mentioned constructions, these constructions are preferably designed to adjust the size of droplets to be supplied. With respect to the method for adjusting the size of droplets, although it is not particularly limited, one example is given as shown in FIG. 16 in which a partition plate 115 is placed inside the path 113 so as to divide the path in the flow path direction in the droplet forming section 210 for generating droplets by using a centrifugal force. Only droplets having desired sizes can be transported to the particle oxidizing section 4 by arranging the setting position of the partition plate 115. Here, in the droplet forming devices 310 and 410, the size of droplets can set to a desired size by changing the oscillation frequency given by the vibration member 170.

In addition, in the above-mentioned constructions, the suspension 22 inside the container 21 and the droplets of the suspension 22 may be preliminarily heated to, for example, the vicinity of the boiling point of the suspension 22, if necessary, by using a heater, etc. With this arrangement, the acidic liquid 43 in the suspension 22 can be more quickly nuclear boiled and evaporated; thus, it becomes possible to further improve the efficiency of the production of hydrophilic particles.

The droplets of the suspension 22, thus formed, are gas-transported to the particle oxidizing section 4 through the particle supply section 3, and thereafter, this is subjected to the same processes as described in embodiment 1 so that hydrophilic particles which have their surface oxidized and possess hydrophilic groups can be obtained.

In accordance with the constructions of the present embodiment 2, when the suspension 22 in a droplet state is heated at the particle oxidizing section 4 so as to be nuclear boiled or evaporated, the nuclear boiling or evaporation, that is, a phase change, can be carried out more quickly by setting the condition of the droplets. Thus, the above-mentioned constructions make it possible to provide uniform hydrophilic particles having a comparatively small particle size by using simple device and operation in a short time, at low costs, in a stable manner, without charging the resulting hydrophilic particles.

The above descriptions exemplified a manufacturing device 1 which can successively produce hydrophilic particles; however, the specific construction of the manufacturing device is not intended to be limited by the above-exemplified construction. The manufacturing device for hydrophilic particles of the present invention may have a construction for producing hydrophilic particles by using a batch system.

EXAMPLE 2

Referring to flow chart in FIG. 17, the following description will discuss example 2 that is a specific example of the above-mentioned embodiment 2. First, carbon black particles (hereinafter, referred to as CB particles), which have a particle size of 0.122 μm, were mixed in a nitric acid aqueous solution (nitric acid concentration 0.22 N) serving as an acidic liquid 43 so as to have a particle number concentration of $10^{16}$ particles/m$^3$; thus, a suspension 22 was prepared (S31).

Thereafter, ultrasonic wave vibration was applied to the suspension 22 by a particle-dispersing device 24 for generating ultrasonic wave vibration so that the CB particles was dispersed so as to form a more uniform suspension 22 (S32). Moreover, the temperature of the particle oxidizing section 4 was raised to 650K by using an electric heater 44 (S33).

Next, the suspension 22 was pressurized at a pressure of 2.0 kgf/cm$^2$ by using clean nitrogen gas from which dusts, etc. had been removed by an air filter, etc., and supplied to the droplet forming section 10 at a ratio of 10 ml/min. so that it was sprayed (atomized) from the nozzle 11, thereby generating droplets derived from the suspension 22 (S34).

At this time, since those droplets having sizes larger than a desired size were removed by the baffle 16, droplets having comparatively uniform sizes, such as a droplet size of approximately 0.3 μm with a geometric standard deviation of 1.8, were obtained.

Thereafter, the above-mentioned droplets of the suspension 22 was introduced into the particle oxidizing section 4 by using a pneumatic transportation (S35), and abruptly heated to approximately 650K while being transported within the particle oxidizing section 4 so that the nitric acid aqueous solution in the suspension 22 was nuclear boiled and evaporated in the tube 41 with the CB particles in the droplets of the suspension 22 serving as nuclei; thus, the surface of each of the CB particles was subjected to an oxidizing process so that hydrophilic groups were formed on the surface (S36).

In this oxidizing process, inside the particle oxidizing section 4, the suspension 22 was transported from the inlet 45 to the outlet 46 by an expansion due to the evaporation of the nitric acid aqueous solution, and while the CB particles were being dispersed (including dispersion of aggregating particles into individual particles) the surface of each of the CB particles was subjected to an oxidizing process by nitric acid, resulting in hydrophilic CB particles whose surface processes carboxylic groups serving as a hydrophilic group.

With respect to processes taken after the above-mentioned S36, the same processes as described in S25 through S33 of FIGS. 8 and 9 of the aforementioned embodiment 1 were carried out, and washed hydrophilic particles were obtained also in the present example 2.

Next, the above-mentioned hydrophilic CB particles that are CB particles that have been surface-modified and non-processed CB particles were added into super pure water respectively, and these were stirred so as to examine the wettability of the respective particles. As a result, the non-processed CB particles did not get wet in super pure water, and stayed on the water surface. In contrast, the hydrophilic particles got wet in super pure water, and were dispersed and suspended therein. Thus, it is confirmed that the hydrophilic particles obtained from the process, which is pigment that has been subjected to a surface-modifying process of the method of the present invention, has an improved wettability as compared with the non-processed particles.

Next, CB particles were suspended in various nitric acid aqueous solutions having mutually different concentrations, and these were subjected to the same processes as those in example 1 and example 2; thus, by using a back titration method, consideration was given to the effects of the nitric acid concentration in the acidic liquid 43 on the amount of carboxylic groups formed on the surface of a resulting hydrophilic particle. In the case of the nitric acid concentration of 0 N (zero), no carboxylic group was imparted; however, as the nitric acid concentration was varied from 0.22 N to 1.1 N, the amount of carboxylic groups on the surface gradually increased, proving that it increases in proportion to the nitric acid concentration. Here, with respect to hydrophilic particles obtained under the respective nitric acid concentrations, examinations were made on the wettability to water thereof, and the results have revealed that any of the nitric acid concentrations from 0.22 N to 1.1 N shows superior wettability.

In general, in industrial processes, the lower the nitric acid concentration, the more advantages, such as 1) a reduction in the cost of materials, 2) a reduction in the processing cost of the acidic liquid 43 and 3) minimizing the complexity of equipment, it provides. Therefore, it is preferable to set the nitric acid concentration as low as possible within a range necessary to impart an effective hydrophilic property.

Referring to FIGS. 18 through 43, the following description will discuss embodiment 3 of the present invention.

Figure 18:
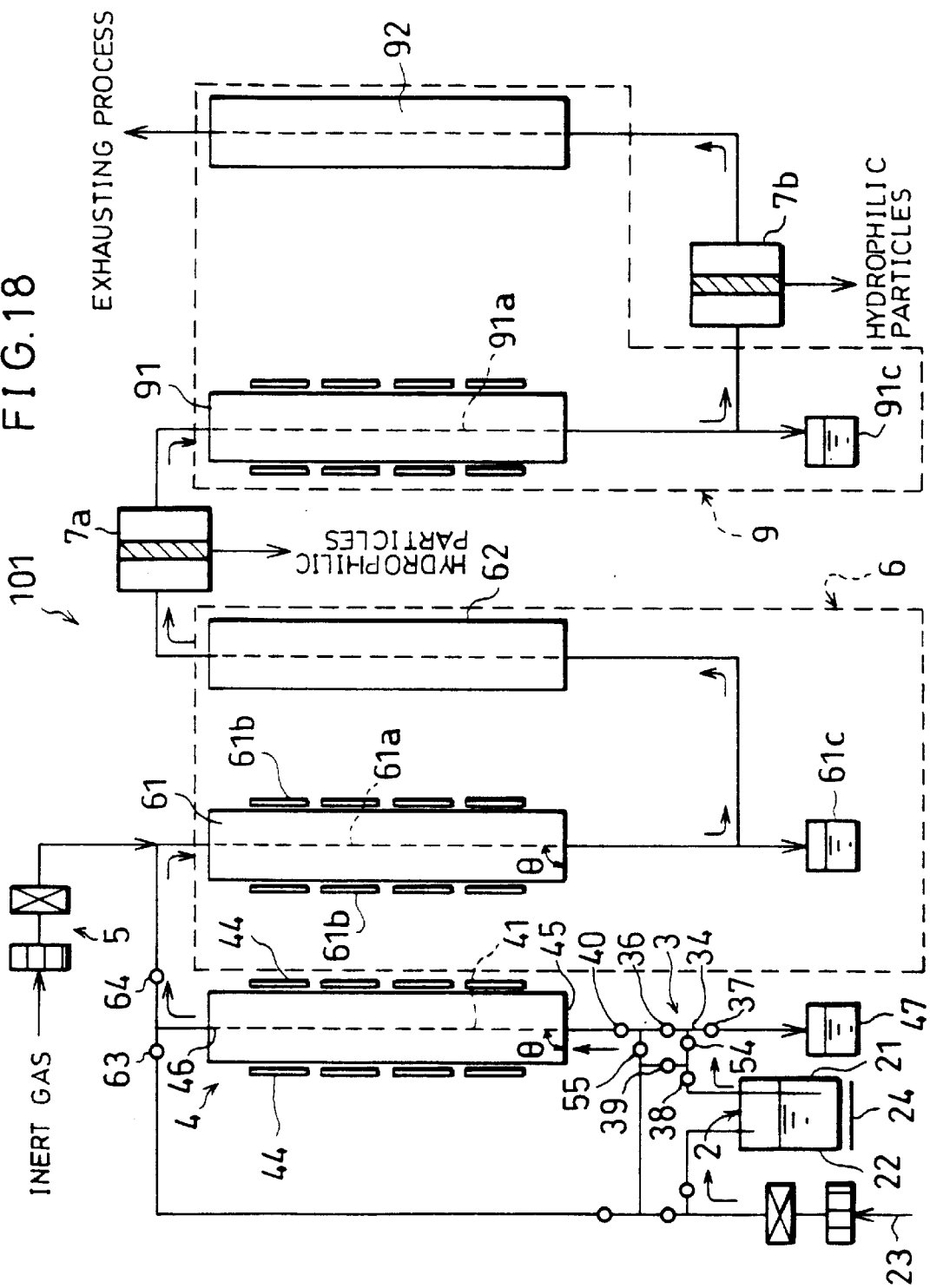
FIG. 18 is a schematic view that shows the construction of a particle surface-modifying device of example 3 of the present invention.

Referring to FIG. 18, an explanation will be given of one example of a particle surface-modifying device in accordance with the present invention. As illustrated in FIG. 18, the particle surface-modifying device (hereinafter, referred to as a manufacturing device) 101 is designed so that the manufacturing device shown in FIG. 3 is provided with various valves for controlling addition, washing and recovering processes, and detectors for controlling these valves, as will be described below.

Here, in the present embodiment 3, in the manufacturing device 101, those members having the same functions as the manufacturing device 1 of FIG. 3 are indicated by the same reference numerals, and the description thereof is omitted. Moreover, those modified examples and applied examples, shown in the aforementioned embodiments 1 and 2, are also applied to the present embodiment 3.

In the manufacturing device 101, a piping 34 from the particle oxidizing section 4 to the reservoir section 47 is provided with a collection valve 37 for controlling the opening and closing of the piping 34, which is installed so as to be closed at the time of a normal oxidizing process. The collection valve 37 is designed to be opened when the suspension 22 adhering the inner wall of the tube 41 have reached a predetermined amount or when some of the suspension 22 that forms unnecessary acidic liquid or particles generated inside the piping 34 or the tube 41 is recollected to the reservoir section 47, thereby allowing the unnecessary suspension 22 to be discharged from the particle oxidizing section 4 and the piping 34.

As described earlier, even when the suspension 22 is supplied to the particle oxidizing section 4 in the state where the particles 42 are uniformly dispersed in the suspension 22 or in the state where the suspension 22 have been sprayed into droplets 22a by atomizing, etc., there is a possibility that the particles 42 might aggregate without being sufficiently dispersed, depending on conditions.

FIGS. 19(a) through 19(d) respectively show states of the particles 42 when the particles 42 are supplied in the form of the droplets 22a. Although not shown in Figures, the same phenomena may also occur in the case where the particles 42 dispersed in the acidic liquid 43 are supplied. As illustrated in FIGS. 19(a) and 19(b), it is preferable to form a state where one to several tens of particles 42 are contained in a droplet 22.

In the particle surface-modifying method of the present invention, nuclear-boiling is carried out with the particles 42 in the acidic liquid 43 serving as nuclei, and an abrupt expansion of the volume due to the phase change at this time is utilized as an external force for dispersing aggregate particles 42a; and in this case, even if several tens of particles 42 are contained in a droplet, an oxidizing process is available.

However, as shown in FIG. 19(c) or FIG. 19(d), there are cases in which an extreme aggregation occurs or no particles 42 are included in a droplet 22a. When such an extreme aggregation of the particles 42 occurs, it becomes difficult to oxidize all the particles 42 in a uniform manner, and at least one part of the particles 42 might not be sufficiently oxidized.

In order to stably manufacture desired hydrophilic particles 42b, various conditions (various states), such as the flow rate, the concentration of the particles 42 and the degree of dispersion of the particles 42 in the suspension 22 to be supplied to the particle oxidizing section 4, the particle size, the flow rate and the concentration of the particles 42 in the droplets 22a, the concentration of the droplets 22a and the degree of dispersion of the particles 42, have to be controlled strictly.

Figure 20:
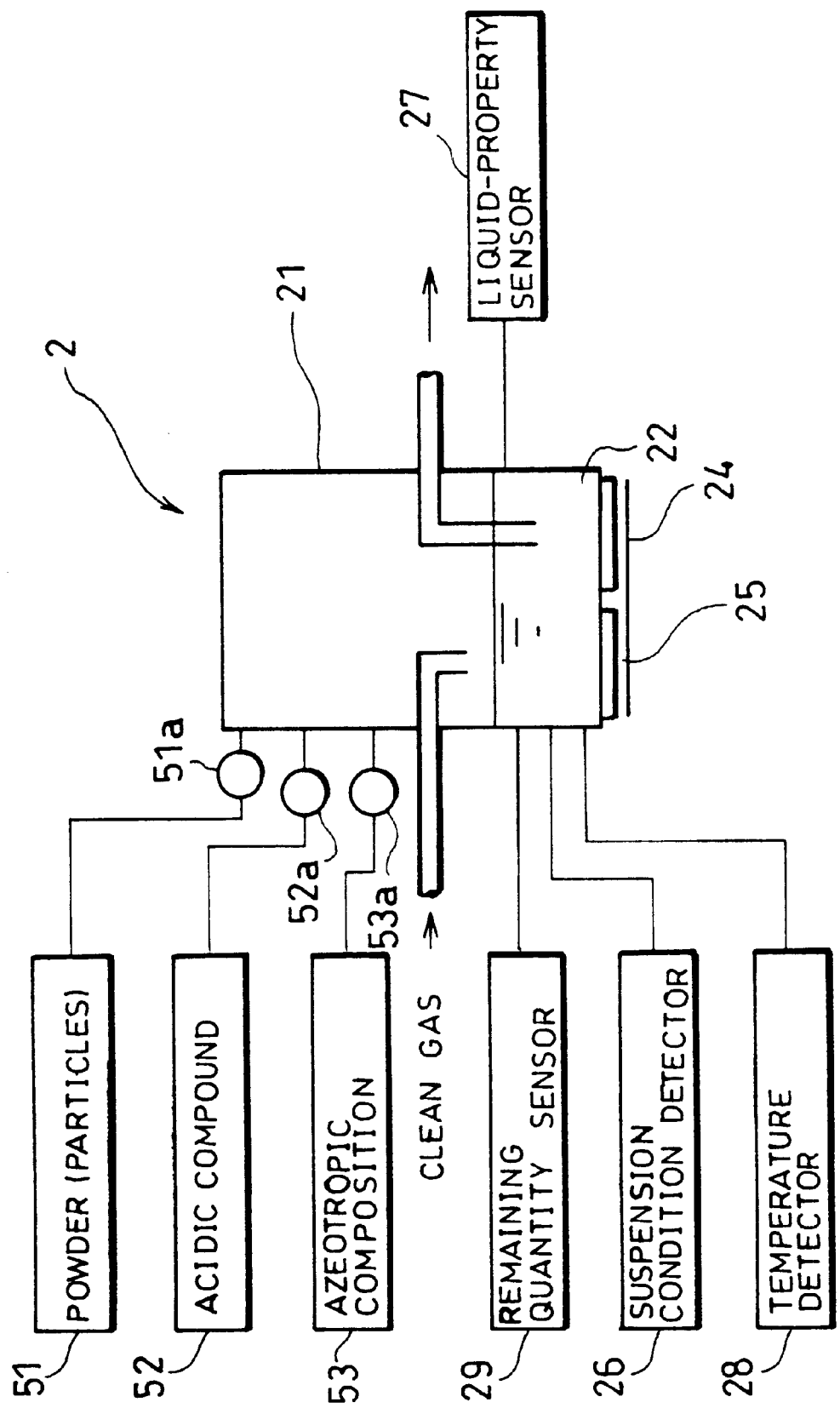
FIG. 20 is a block diagram that shows a particle suspension section in the particle surface-modifying device.

FIG. 20 shows one example of a construction for supplying the particles 42 in the state of the suspension 22 to the particle oxidizing section 4 in the particle suspension section 2. First, an explanation will be given to the particle suspension section 2. The particle suspension section 2 is provided with the aforementioned particle dispersing device 24 for dispersing the suspension 22 stored in a container 21 in the particle suspension section 2 and a heating member 25 for controlling the temperature of the suspension 22 by applying heat.

Moreover, the particle suspension section 2 is further provided with a suspension condition detector 26 of the suspension 22 for monitoring the degree of dispersion of the particles 42 in the suspension 22, a liquid-property sensor 27 for detecting the pH, etc., a temperature detector 28 and a remaining quantity sensor 29. The following description will discuss these detectors and sensors respectively.

The suspension condition detector 26 is used for monitoring the degree of dispersion and the number concentration in the particles 42 in the suspension 22, and the same device as used in the aforementioned optical measurement section 8 is adopted. The results of the monitoring are compared with predetermined reference values, and the results of the comparison are fed back so as to control the opening and closing operations with respect to the particle dispersing device 24 and the supply valve 51a of a powder supply source 51.

Figure 21:
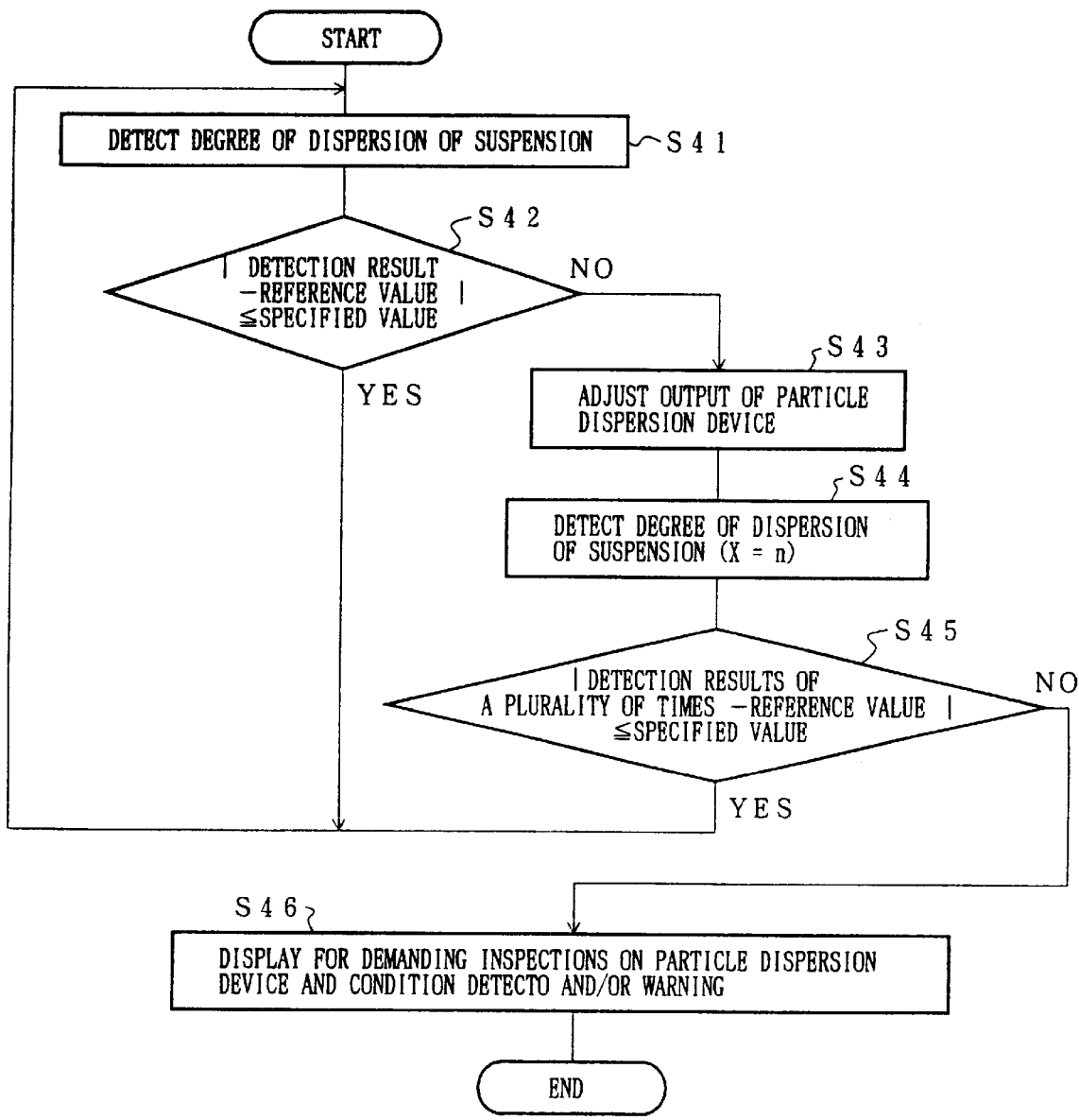
FIG. 21 is a flow chart that shows a control process based upon detections on the degree of dispersion of the suspension.

Referring to FIG. 21, an explanation will be given of a controlling operation at the time of detecting the degree of dispersion of the particles 42 in the suspension 22. First, at S41, the degree of dispersion of the particles 42 in the suspension 22 is detected. Nest, at S42, the results of the detection are compared with a reference value so as to judge whether or not the results of the detection are within a specified range. Here, with respect to the comparison method between the results of the detection and the reference value, for example, a method is suggested in which, as shown in S42, the absolute values of differences between the results of the detection and the reference value are calculated, and a judgement is made as to whether or not these differences are located within the specified range; however, the present invention is not particularly limited by this method.

When the results of the detection are located within the specified range, the detection of the degree of dispersion is continuously carried out; however, when they are located outside the specified range, the output of the particle dispersing device 24 serving as the stirrer and/or the dispersion member is adjusted at S43.

Next, at S44, the degree of dispersion of the suspension 22 is detected a plurality of times (X=n: n is an integer not less than 2). The results of these plural detections are compared with the reference value (S45), and when the results of the detections show that the differences from the reference value are located within a specified range, the process for supplying the suspension 22 to the particle oxidizing section 4 is successively carried out and the detection of the degree of dispersion is continued; however, when the differences from the reference value are located outside the specified range (for example, the results of a plurality of detections show that the dispersion of the particles 42 is located in such a range that it is not regarded as a normal distribution), a judgement is made that any abnormality is occurring in the particle dispersing device 24 or the suspension condition detector 26 that is detecting the degree of dispersion, with the result that a display for demanding an inspection on the particle dispersing device 24 and the suspension condition detector 26 or a warning is given (S46). Here, the display and the warning may be given simultaneously, or only either of them may be given.

Moreover, when the number concentration of the particles 42 in the suspension 22 is detected in the suspension condition detector 26, feedback controlling is carried out on the particle dispersing device 24 or the supply valve 51a of the powder supply source 51 at S43, and at S46, a display for demanding inspections on the powder supply source 51, the supply valve 51a, the particle dispersing device 24 and the condition detector 26, or a warning for informing of any abnormality, may be given.

Next, an explanation will be given of the liquid property sensor 27. In the present invention, a mixture, prepared by dispersing particles 42 to be subjected to an oxidizing process in an acidic liquid 43 made by mixing an azeotrope composition (for example, water) 53 with an acidic compound 52 such as nitric acid, is used as the suspension 22, and in order to efficiently carry out the oxidizing process of the particles 42 in a stable manner, the liquid property (pH, the degree of acidity in this case) of the suspension 22 has to be controlled to be made constant. When the degree of acidity in the suspension 22 is too low (close to neutral), it is difficult to uniformly oxidize the surface of the particles 42. In contrast, in the case when the degree of acidity is too high, although no problem is raised in carrying out the oxidizing process, the acidic liquid 43 is consumed above what is required, thereby increasing the costs.

Figure 22:
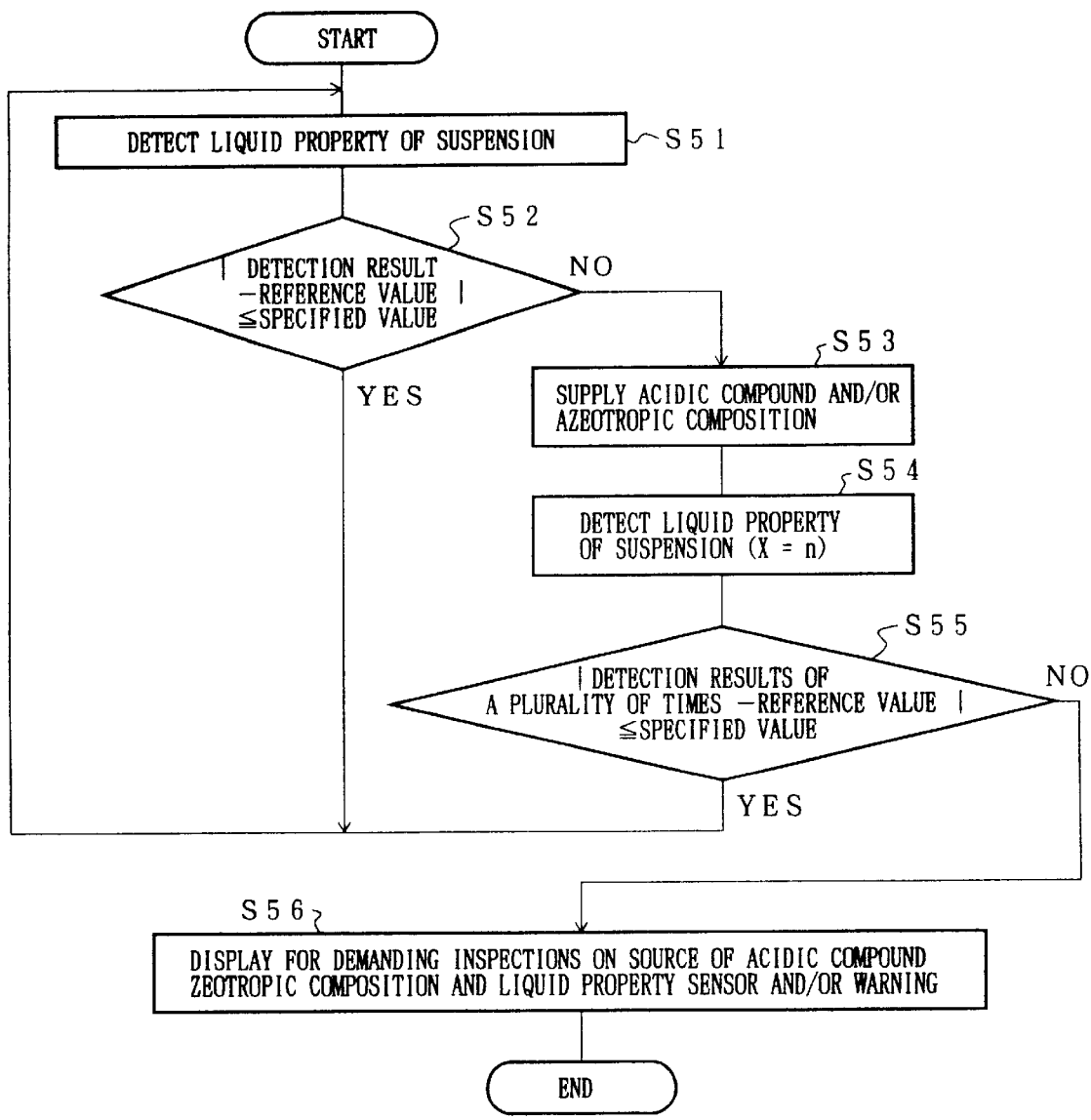
FIG. 22 is a flow chart that shows a control process based upon detections on the liquid property of the suspension.

With respect to the above-mentioned liquid property sensor 27, a glass electrode for pH measurement may be used. The glass electrode is provided with a glass thin film of a lithium compound serving as a pH sensing section, and when the suspension 22 to be measured and the inner buffer solution (liquid of pH7) come into contact with the glass film, a voltage that is proportional to the difference in the pH between the two liquids is generated. The results of the detection in the liquid property sensor 27 are fed back so as to control the respective supply valves 52a and 53a of the acidic compound 52 and the azeotrope composition 53, thereby providing control so as to make the liquid property of the suspension 22 constant. FIG. 22 shows this operation. Since the processing method (S51 to S56) is the same as the method for carrying out the aforementioned condition detection on the suspension 22 (S41 to S46), the detailed description thereof is omitted.

In order to form hydrophilic particles 42b that are modified particles with a high dispersing property through the oxidizing process in the particle oxidizing section 4 and the nuclear boiling, it is necessary to coat the particles 42 with the acidic liquid 43 in an appropriate amount, when the particles 42 in the state of the suspension 22, or the suspension 22 in the form of droplets 22a, are supplied to the particle oxidizing section 4.

When the temperature of the suspension 22 containing the particles 42 becomes higher than a predetermined value, problems arise in which the particles 42 melt and are fused to each other to form aggregation and the acidic liquid 43 adhering to the particles 42 supplied to the particle oxidizing section 4 becomes less, failing to carry out sufficient oxidation and dispersion.

Figure 23:
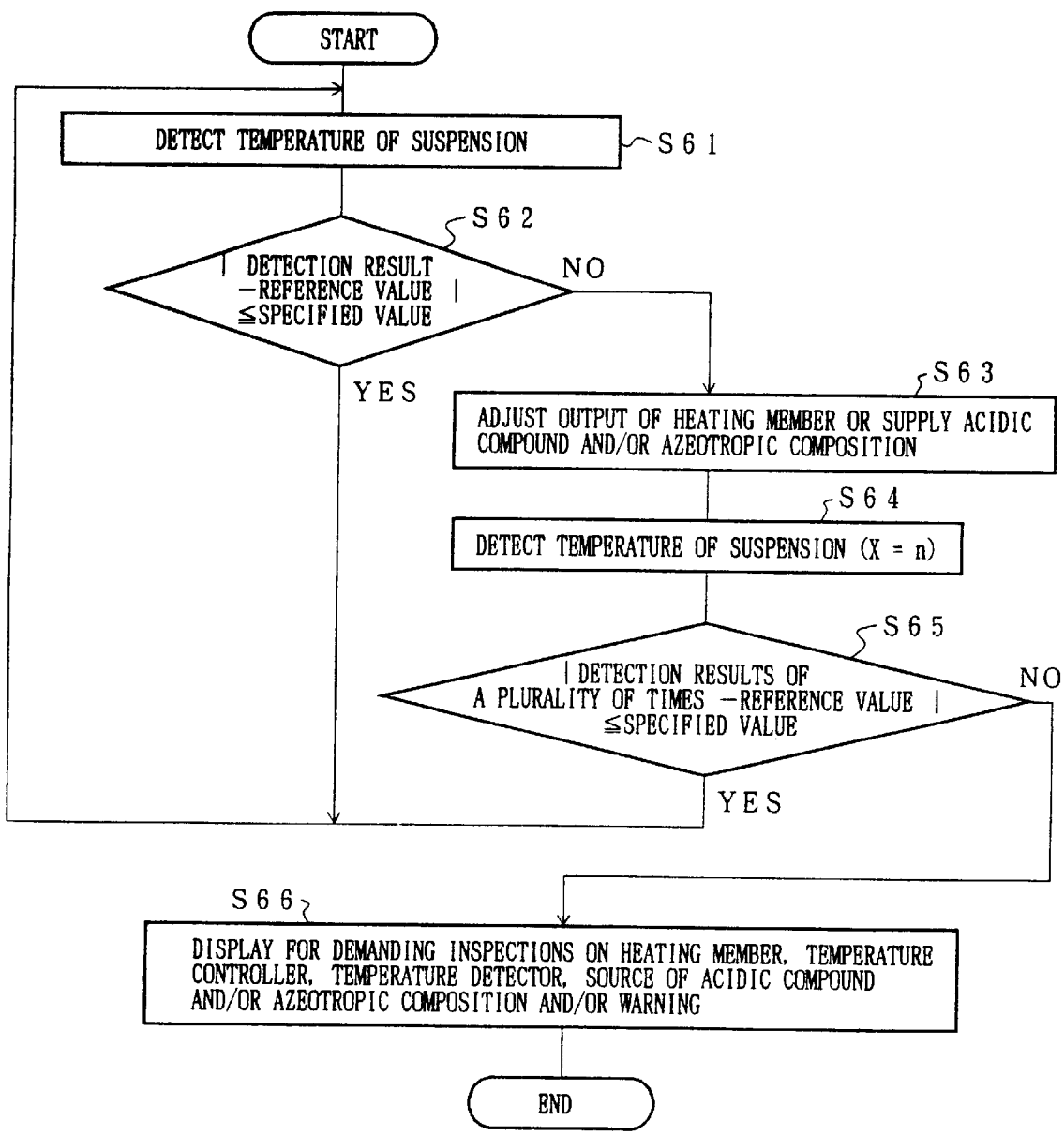
FIG. 23 is a flow chart that shows a control process based upon detections on the temperature of the suspension.
Figure 24:
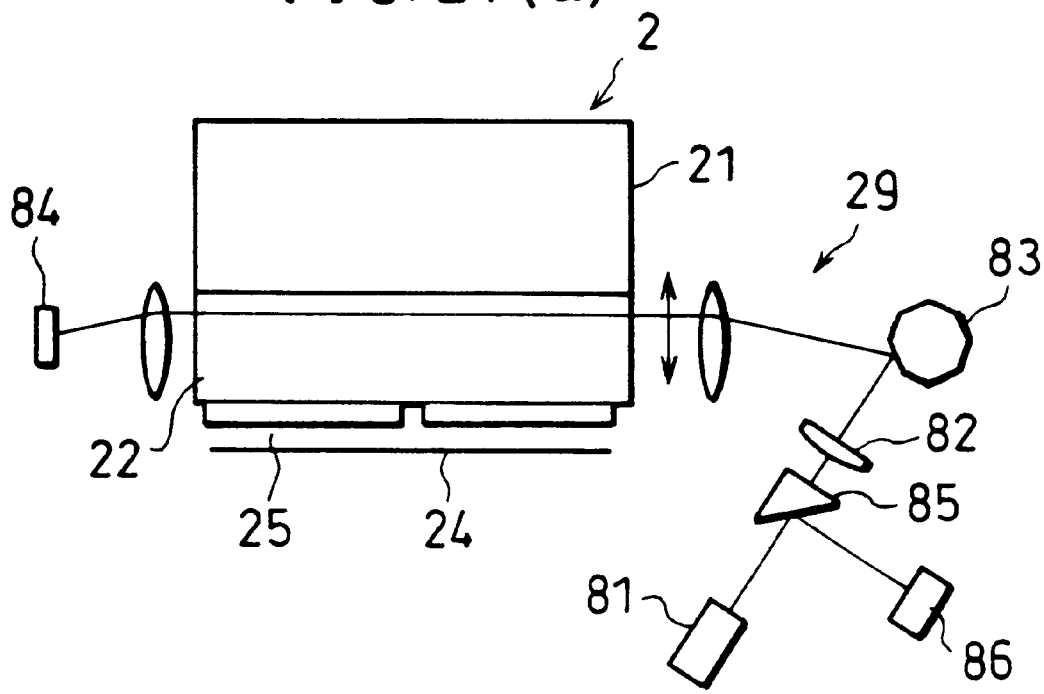
FIGS. 24(a) and 24(b) are explanatory drawings that show a remaining amount detector in the particle surface-modifying device.
Figure 24:
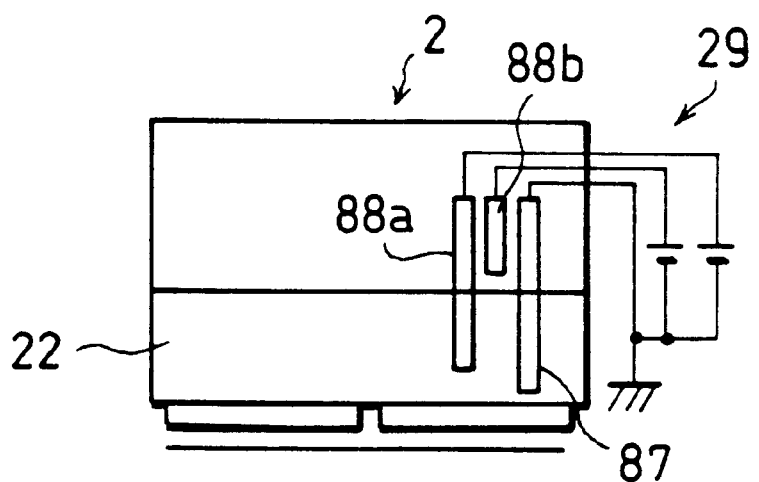

Therefore, the aforementioned temperature detector 28 for detecting the temperature of the suspension 22 is installed, and it is necessary to control the temperature of the suspension 22 so as to be maintained within a specified range by using a temperature controller (not shown) based upon the results of the detection. With respect to the temperature detector 28, for example, a thermocouple and a resistance thermometer may be used. In the present invention, since the acidic liquid 43 is used as the suspension 22, a temperature detector 28 with an acid-resistant protective tube for preventing corrosion thereof may be used. FIG. 23 shows a flow chart that indicates the temperature controlling operation. Since this processing method (S61 to S66) is the same as the processing method (S41 to S46) shown in FIG. 21, the detailed description thereof is omitted.

The remaining quantity sensor 29 is used for detecting the remaining quantity of the suspension 22 in the container 21. Here, as illustrated in FIG. 24(a), a method may be adopted in which: a laser light beam from a laser 81 is expanded in the horizontal direction by using a beam expander 82, scanning is carried out by using a polygon mirror 83 in the vertical direction within a given region, a detector 84 detects the laser light beam after scanning, and the results of the detection are standardized based upon the results of detection for comparison made by a reference-light-use detector 86, which detects a reference-use laser light obtained by dividing the laser light beam from the laser 81 by a beam splitter 85, so that the distance from a reference point to the upper surface of the suspension 22 that has been detected is found. Further, another method may be adopted in which, as illustrated in FIG. 24(b), two electrodes 88a and 88b having different lengths with respect to an earth electrode 87 are used to detect the upper and lower surfaces of the suspension 22.

Figure 25:
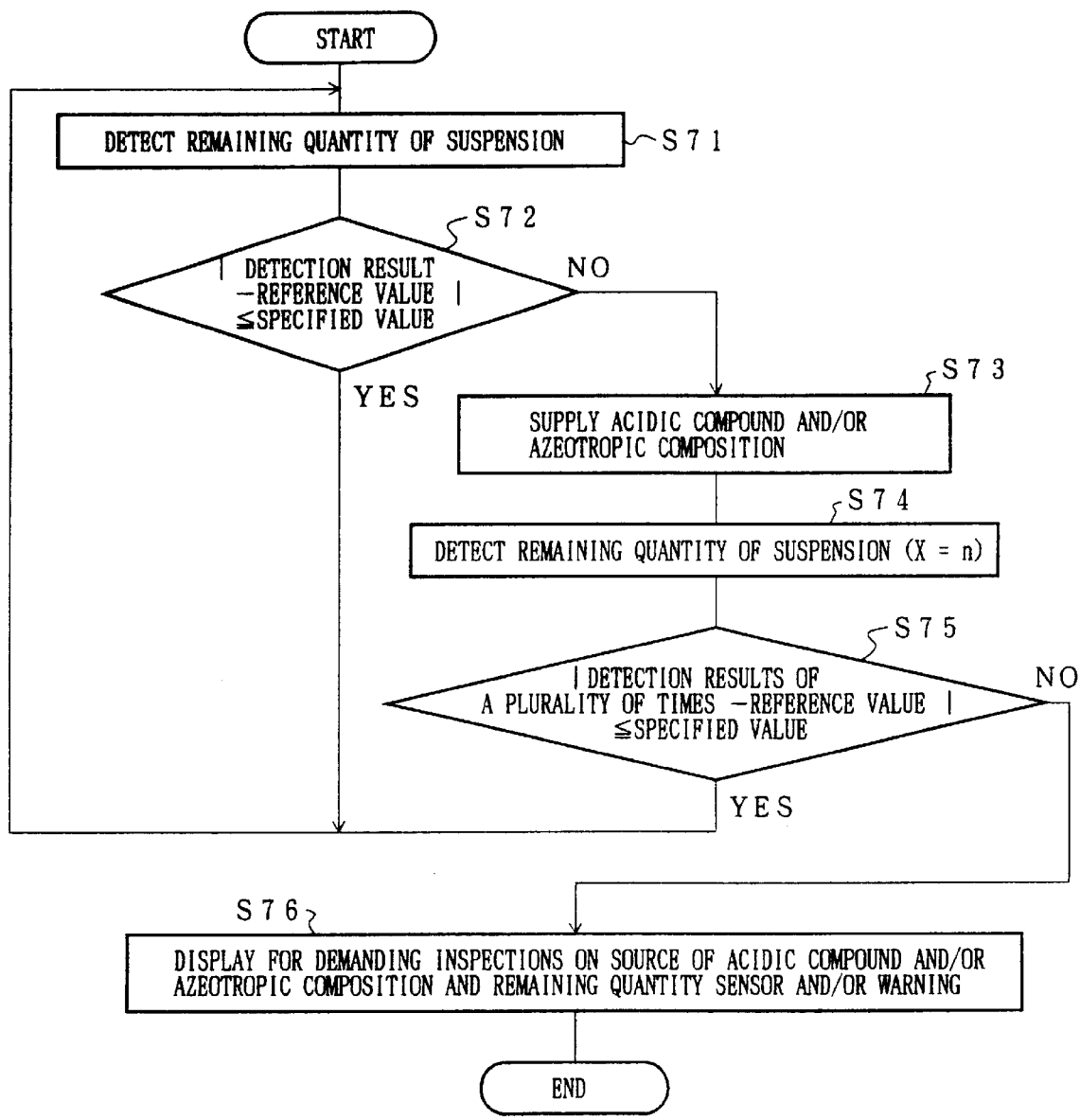
FIG. 25 is a flow chart that shows a control process based upon detections on the remaining amount of the suspension.

The results of the detection in the remaining quantity sensor 29 are fed back so as to control the respective supply valves 52a and 53a of the acidic compound 52 and the azeotrope composition 53. In other words, upon detecting the lower surface, the acidic compound 52 and the azeotrope composition 53 are automatically supplied to the container 21 of the particle suspension section 2, while upon detecting the upper surface, the supply is stopped. FIG. 25 shows a flow chart of the above-mentioned controlling operation. Since the contents of the processes (S71 to S76) are the same as those in the processing method shown in FIG. 21 (S41 to S46), the detailed description thereof is omitted.

Here, when the above-mentioned acidic compound 52 and azeotrope composition 53 are supplied, the liquid property has been detected by the liquid property sensor 27; thus, the amounts of supply of the two are adjusted to predetermined values. Moreover, in order to uniformly mix the two, it is preferable to stir and disperse the contents of the container 21 by using the particle dispersing device 24 serving as a stirrer and a dispersing means.

Figure 26:
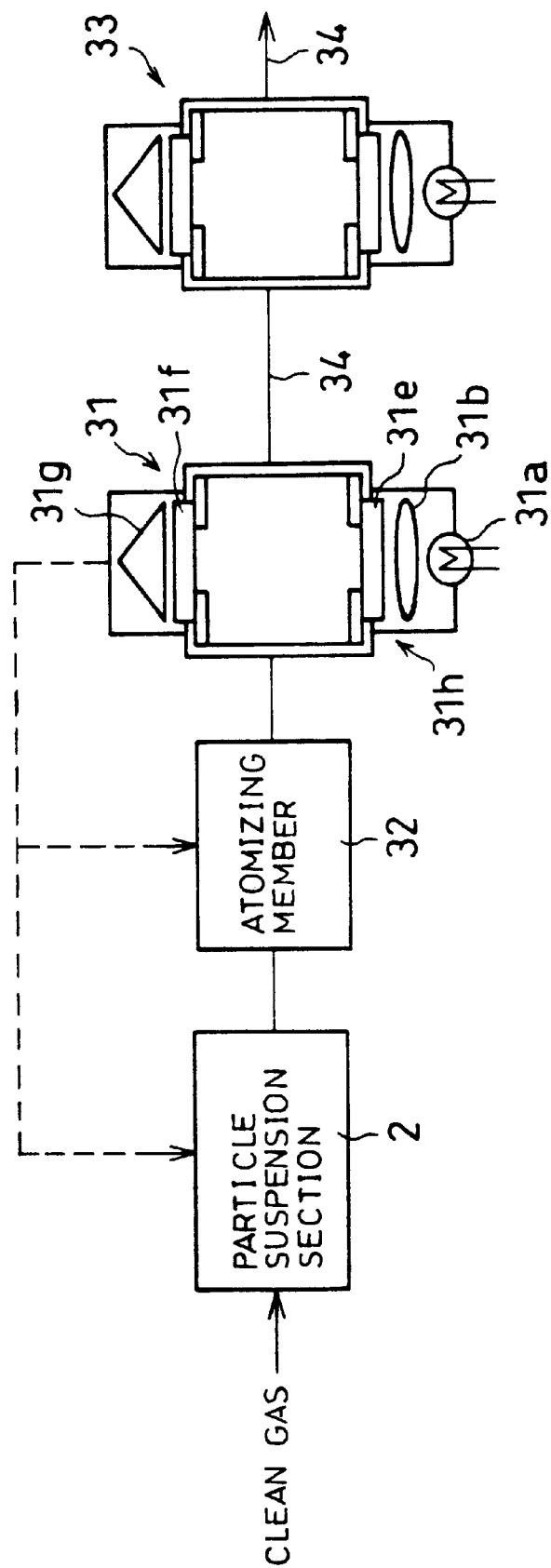
FIG. 26 is a block diagram that shows a particle suspension section, an atomizing member and a particle supply section in the particle surface-modifying device.

Next, an explanation will be given of a controlling operation carried out at the time of supplying the suspension 22 in the form of droplets 22a is supplied to the particle oxidizing section 4. In the case when the supply is made as the droplets 22a, as illustrated in FIG. 26, an atomizing member 32 for forming droplets 22a from the suspension 22 by atomizing, etc. is installed at the succeeding stage of the particle suspension section 2, and at the further succeeding stage, a first condition detector 31 for detecting the condition of the droplets 22a is installed. Moreover, as will be described later, a second condition detector 33, which has the same arrangement as the first condition detector 31, may be installed at the succeeding stage of the first condition detector.

With respect to the first condition detector 31, that having the same arrangement as the aforementioned optical measurement section 8 is preferably used, in which a light source 31a, a lens 31b, light-transmitting plates 31e and 31f, an optical detection section 31g, etc., are installed inside a case 31h. Light, released from the light source 31a, is diffused and reduced by particles 42 (including droplets 22a) that have been introduced into the case 31h, with the result that its luminous energy is changed. Thus, the first condition detector 31 measures the particle diameter and the number concentration of the above-mentioned particles 42 and the droplets 22a based upon signals that have been outputted from the light detection section 31g in accordance with the luminous energy made incident thereon.

Here, the above-mentioned first condition detector 31 is designed to measure the particle diameter by adopting a light dialysis-diffusion method; however, the measuring method is not particularly limited by this, and other methods may be adopted in the same manner as the aforementioned optical measurement section 8.

Since the first condition detector 31 is installed, the condition of the particles 42 (droplets 22a) supplied from the atomizing member 32 can always be confirmed. For this reason, with respect to the oxidizing process for the particles 42, it is possible to avoid any adverse effect caused by the particles 42 aggregating with each other beyond what is necessary. Moreover, since the quantity of the particles 42 that have been supplied can always be detected, it is possible to make the control of the oxidizing process easier.

In the above-mentioned particle surface modifying method, the first condition detector 31 is used for detecting the particle size of the droplets 22a. As described earlier, depending on states in which the particles 42 forming nuclei are optimally contained in each droplet 22a [FIG. 19(a) and FIG. 19(b)], in which the particles 42 forming nuclei extremely aggregate with each other [FIG. 19(c)] and in which no particles 42 forming nuclei are contained therein [FIG. 19(d)], the diameters of the droplets 22a are different from each other respectively. Therefore, the judgement as to whether or not the droplets 22a are formed in an optimal manner can be made by detecting the particle diameter of the droplets 22a.

The particle sizes (the results of the detection) of the droplets 22a, detected by the first condition detector 31 serving as a particle size detector, are fed back to the particle suspension section 2 and the atomizing member 32, as indicated by an arrow in a broken line in the Figure, and based on the results of the detection, the particle suspension section 2 and the atomizing member 32 adjust the generation of the droplets 22a.

Figure 27:
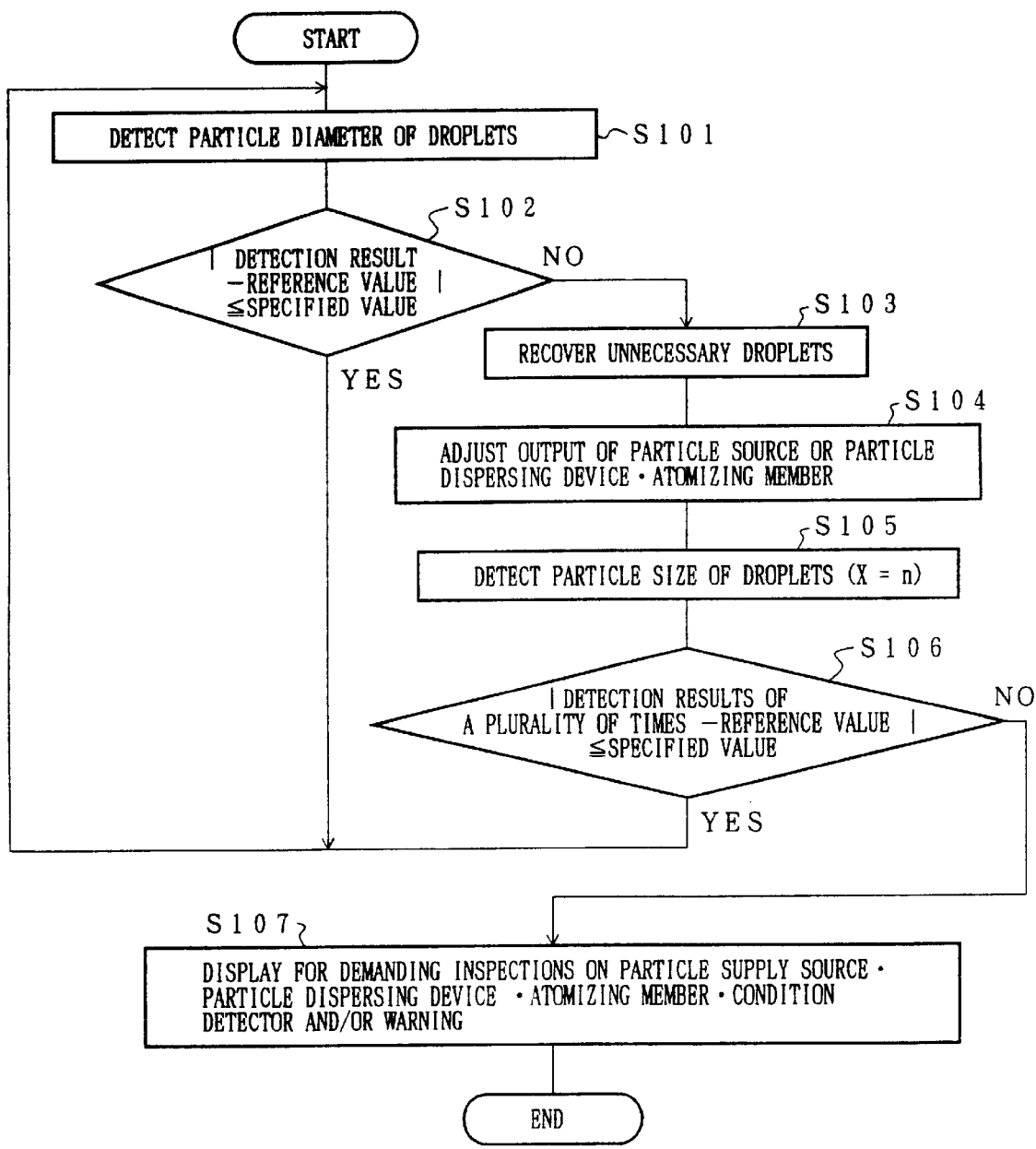
FIG. 27 is a flow chart that shows a control process based upon detections on the particle size in droplets formed by the atomizing member.
Figure 28:
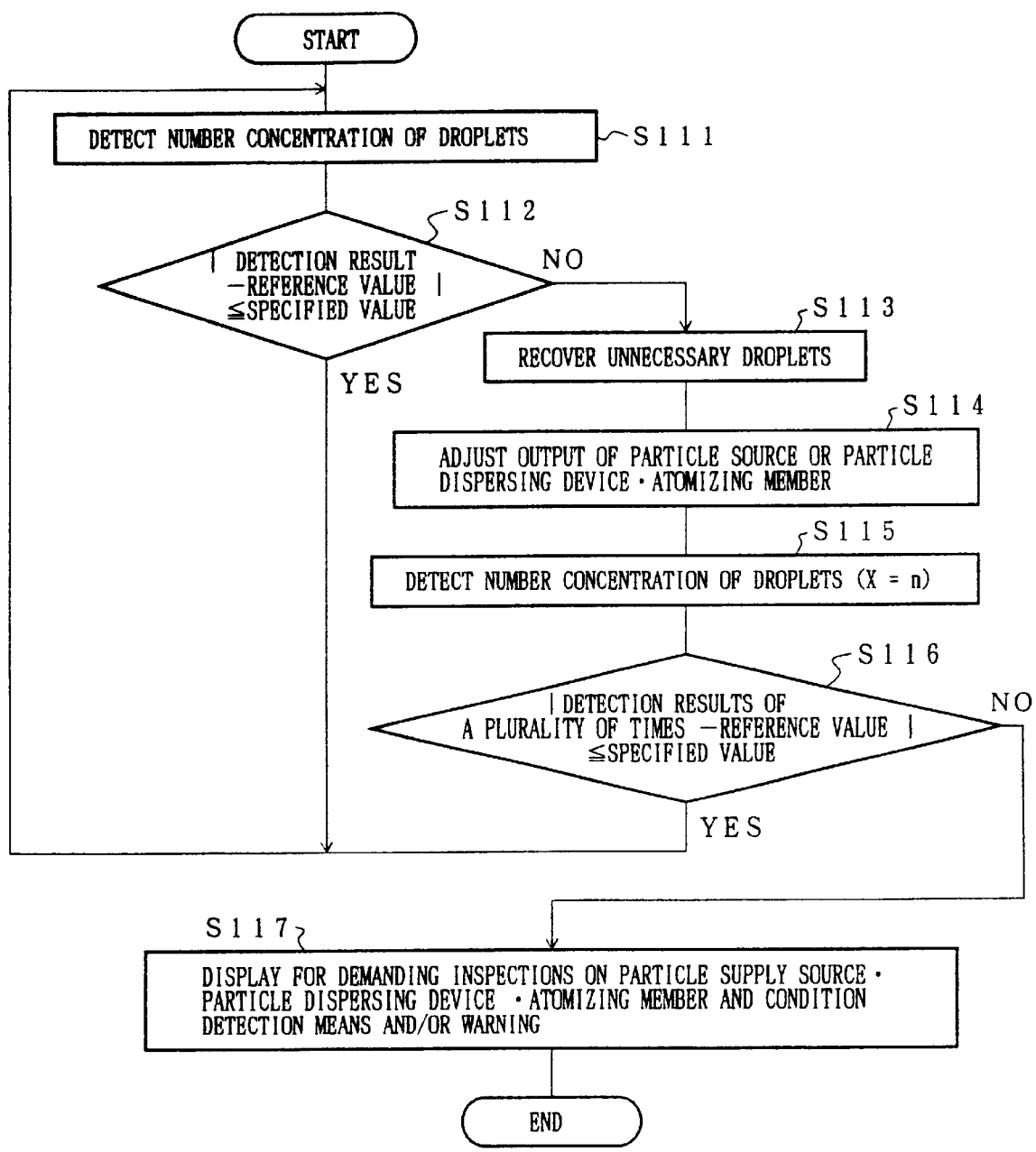
FIG. 28 is a flow chart that shows a control process based upon detections on the number concentration in droplets formed by the atomizing member.

An explanation will be given of this feed-back control as follows: As illustrated in FIG. 27, first, at S101, the first condition detector 31 detects the particle size a first time (X=1). Next, at S102, the results of the detection (actual particle sizes of the droplets 22a) are compared with a reference value (an optimal particle size of the droplets 22a); thus, a judgement is made as to whether or not the results of the detection are located within a specified range.

If the results of the detection are located within the specified range, the detection of the particle size is continuously carried out; however, in the case when they are not located within the specified range, since these particles 42 are likely to fail to undergo a sufficient oxidizing process, the corresponding droplets 22a are regarded as inappropriate ones and are recollected in the reservoir section 47 (the method of which will be described later) at S103, and at S104, the particle suspension section 2 and the atomizing member 32 are adjusted.

For example, in the case when the results of the detection are out of the specified range, since this indicates that aggregate particles 42a, formed by many particles 42 aggregating with each other as illustrated in FIG. 19(c), are generated in the droplets 22a, the supply valve 51a of the powder supply source 51 is adjusted so as to reduce the number (that is, the number concentration) of the particles 42 that are to form nuclei. In contrast, in the case when the results of the detection are located narrower than the specified range, since this indicates that no particles 42 are contained in the droplets 22a as illustrated in FIG. 19(d), the supply valve 51a of the powder supply source 51 is adjusted so as to increase the number (that is, the number concentration) of the particles 42 that are to form nuclei.

The extreme degree of aggregate particles 42 is considered to be caused by the fact that the particles 42 are not uniformly dispersed in the suspension 22 as well as by the fact that the number concentration (particle concentration) in the particle suspension section 2 is not appropriate as described earlier. In this case, the output of the particle dispersing device 24 serving as a stirrer and a dispersion member is adjusted so as to form an appropriate dispersing state.

Moreover, even if the particles 42 are uniformly dispersed in the particle suspension section 2, there is a possibility that the droplets 22a aggregate with each other and that no particles 42 are contained in the droplets 22a, because of inappropriate generation conditions for the droplets 22a. In this case, the generation conditions (the output of the atomizing member 32) of the droplets 22a may be adjusted.

Next, at S105, the particle size of the droplets 22a is detected a plurality of times (X=n: n is an integer of not less than 2). The results of these plural detections are compared with a reference value (S106), and if the results of the detections are located within a specified range, the sequence for the oxidizing process is continued so that the detections of the particle size are continued; however, in the case when these are located out of the specified range (for example, when a plurality of results of the detections are located in such a range that it is not regarded that normal droplets 22a are formed), a judgement is made that any abnormality is occurring in the particle suspension section 2, the atomizing member 32 or the first condition detector 31, a display for demanding an inspection on the particle suspension section 2, the atomizing member 32 or the first condition detector 31, or a warning is given (S107). Here, the display and the warning may be given simultaneously, or either of them may be given.

With respect to the detection method for the particle size in the first condition detector 31, the same method as the aforementioned optical measurement section 8 may be adopted; however, the present invention is not particularly limited thereby, and any method may be adopted as long as the size of the droplets 22*a* is measured. Moreover, these methods may be combined appropriately and adopted.

The output adjusting method of the atomizing member 32 is not particularly limited, and appropriately selected depending on the arrangement of the atomizing member 32. For example, as illustrated in FIGS. 19(*a*) and 19(*b*), in the case when the particles 42 are supplied in the form of the droplets 22*a* by atomizing the suspension 22, an adjusting method in which the diameter of the baffle is changed may be used. Moreover, in the case when the particles 42 are supplied as the droplets 22*a* formed by using a centrifugal method, an adjusting method for variably changing the number of revolutions may be used. In the case when the particles 42 are supplied as the droplets 22*a* formed by applying jet vibration, an adjusting method for variably changing the oscillation frequency may be used. In the case when the particles 42 are supplied as the droplets 22*a* formed by using a ultrasonic wave vibration method, an adjusting method for changing the frequency of the ultrasonic wave may be used.

Besides the particle size detector for detecting the particle size of the droplets 22*a,* the first condition detector 31 and the second condition means 33, shown in FIG. 26, may be provided, for example, as a number concentration detector for detecting the number concentration of the particles 42.

Figure 19:
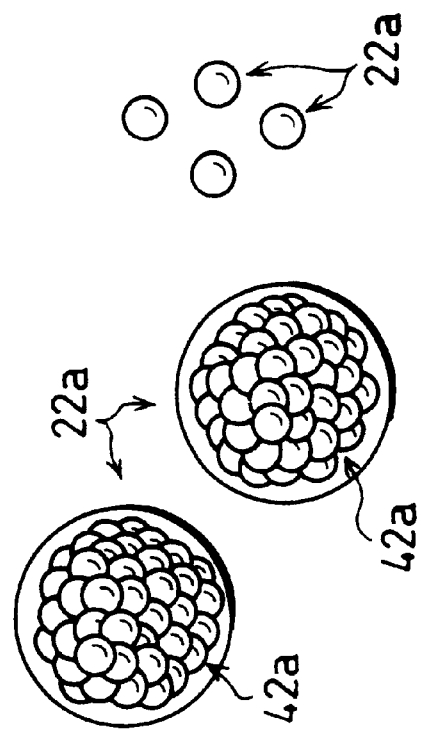
FIGS. 19(a) through 19(d) are explanatory drawings that show respective states of droplets from the suspension.

As described earlier, depending on states in which the particles 42 forming nuclei are optimally contained in each droplet 22*a* [FIG. 19(*a*) and FIG. 19(*b*)], in which the particles 42 forming nuclei extremely aggregate with each other [FIG. 19(*c*)] and in which no particles 42 forming nuclei are contained therein [FIG. 19 (*d*)], the number of the droplets 22*a* within a given space (unit space) (number concentration) is different from each other.

Therefore, the number of the droplets 22*a* located within a predetermined space (that is, the number concentration) is detected by using the first condition detector 31 as the number concentration detector; thus, it becomes possible to determine the condition of the droplets 22*a* in the same manner as the aforementioned method for detecting the particle size. In the same manner as the results of detection on the particle size, the results of detection obtained by detecting the number concentration are fed back to the supply valve 51*a* of the powder supply source 51, the particle suspension section 2 and the atomizing member 32 so as to control the formation of the suspension 22 and its droplets 22*a*. Consequently, it becomes possible to always maintain the resulting droplets 22*a* in a good condition.

FIG. 28 shows the feed-back control in this case. This control is basically carried out in the same manner as the control shown in FIG. 27 that is carried out by detecting the particle size; therefore, the detailed description thereof is omitted. Here, with respect to the detection of the particle size and the detection of the number concentration, either one of these types may be adopted by the first condition detector 31, or both of them may be adopted in a combined manner, which is more preferable to confirm the formation condition of the droplets 22*a* more accurately. Moreover, another arrangement may be adopted in which one detector is allowed to detect the particle size and the number concentration and the resulting signals are used to detect the particle size and the number concentration.

In the above-mentioned particle surface-modifying method, in the case of the installation of the first condition detector 31, it is preferable to install the second condition detector 33 in a piping that is located on the downstream side of the first condition detector 31 and that also forms the preceding stage of the particle oxidizing section 4. Thus, by comparing the results obtained from both of the first condition detector 31 and the second condition detector 32, it becomes possible to more accurately detect any abnormality in the dispersing condition and supply condition of the resulting droplets 22*a*. Based upon the results of the detection, the outputs of the supply valve 51*a*, the particle dispersing device 24 and the heating member 25 can be adjusted and the number concentration of the droplets 22*a* from the atomizing member 32 can be adjusted; thus, it becomes possible to form and supply the droplets 22*a* in a more stable manner.

More specifically, for example, as illustrated in FIG. 29, in the case when the first condition detector 31 capable of detecting both of the particle size and the number concentration is installed in a piping 34 of the particle supply section 3, the second condition detector 33 capable of detecting both of the particle size and the number concentration is preferably installed on the downstream side of the piping 34, and a vibrator 35 for applying vibration to the piping 34 is preferably installed in a piping 34 between the first condition detector 31 and the second condition detector 33.

As described earlier, the results of the detection obtained from the second condition detector 33 are compared with the results of the detection of the first condition detector 31, and fed back so as to control the formation conditions of the droplets 22*a* and the vibrator 35, as indicated by an arrow in a broken line in FIG. 29.

Here, an explanation will be given of the vibrator 35. As described earlier, in the present invention, there is a possibility that, immediately after having been formed in the particle suspension section 2 and the atomizing member 32, the particles 42 and the acidic liquid 43, which are to undergo the surface modifying process, adhere to the pipe wall of the piping 34. Therefore, the installation of the vibrator 35 for vibrating the piping 34 makes it possible to prevent the adhesion of the particles 42 and the acidic liquid 43. Thus, it is possible to avoid plugging of the piping 34 due to the adhesion of the acidic liquid 43 and the particles 42, and consequently to efficiently form and transport (pneumatic transport) stable droplets 22*a* preferably.

The vibrator 35 is not particularly limited as long as it can apply mechanical vibration to the piping 34; and, for example, those using ultrasonic wave vibration and applying vibration by a hammer, etc., may be adopted.

The vibrator 35 can prevent the plugging of the piping 34 effectively when it is installed over the entire portion of the piping 34 in the particle supply section 3. Here, the vibrator 35 may be installed only in a portion that is susceptible to plugging from the viewpoint of costs for manufacturing the piping 34 and running costs necessary to operate the piping 34.

As described earlier, the above-mentioned vibrator 35 may be operated in accordance with the results of detection made by the first condition detector 31 and the second condition detector 33. Here, the oscillation frequency of the vibrator 35 is not particularly limited, and it is only necessary to impart vibration required to avoid the plugging of the piping 34.

In addition to the preventive measures of plugging by the use of the vibrator 35, the plugging of the piping 34 may be prevented by selecting the material of the piping 34, as described earlier. More specifically, the material of the piping 34 may be selected from materials that have a low affinity to the main component of the droplets 22a. When the material of the piping 34 has a low affinity to the main component of the droplets 22a, that is, when the material of the piping 34 and the suspension 22 forming the droplets 22a are less affinitive to each other, it is possible to prevent the plugging of the piping 34 more effectively.

In the case when a water-related material is used as the suspension 22 (that is, the droplets 22a), a hydrophobic material is used for the piping 34. With respect to materials for the inner wall of the piping 34, fluorocarbon polymers, polystyrene, flushing glass with a roughened surface, etc., may be listed. However, the material of the piping 34 is not particularly limited, and any material may be used as long as it has a low affinity to the main component of the droplets 22a and it provides predetermined strength and durability for use as the piping 34.

The particle size is detected by the first condition detector 31 and the second condition detector 33, and if the results of comparison between the two results of detection are located out of the predetermined range, the particle size and the number concentration of the droplets 22a are judged to be inappropriate (for example, particle size: too large, number concentration: too high). Therefore, in order to control these values appropriately, adjustments are made on the number concentration in the suspension 22 and the formation conditions of the droplets 22a.

With respect to those droplets 22a that have been formed inappropriately as described above, since they are likely to fail to undergo a sufficient oxidizing process, the supply valve 36 is closed and the collection valve 37 is opened so that the acidic liquid 43 and the particles 42 in the droplets 22a are collected in the reservoir section 47.

When it is judged that appropriate droplets 22a have been formed by the use of the first condition detector 31 and the second condition detector 33, the supply valve 36 is opened and the collection valve 37 is closed so that the particles 42 in the droplets 22a are subjected to an oxidizing process.

Moreover, in the case when any abnormality (an extreme reduction in the number concentration at the succeeding stage) is detected in the number concentration of the droplets 22a by the first condition detector 31 and the second condition detector 33, since it is judged that the acidic liquid 43 and the particles 42 in the droplets 22a adhere to the pipe wall of the piping 34, thereby causing plugging in the piping 34, the oxidizing process is stopped, and the vibrator 35 is preferably operated. In this case, since the particles 42 might aggregate with each other, the supply valves 36 and 38 are closed and the collection valve 37 and the gas supply valve 39 are opened so that clean gas is introduced into the piping 34 from a first gas inlet 57 so as to collect those inappropriate droplets 22a (those adhering to the pipe wall of the piping 34, and aggregate particles 42) in the reservoir section 47 in the same manner as described above. In this case, the clean gas is preferably introduced in a pulsed state so as to collect the acidic liquid 43 and the particles 42 in the droplets 22a efficiently.

After the above-mentioned collection process has been carried out for a given time, the supply valves 36 and 38 are respectively opened and the collection valve 37 and the gas supply valve 39 are closed so that the oxidizing process is again carried out. The introduction of the clean gas may be provided from a branch of the piping line for the clean gas supplied to the particle suspension section 2; there is no need to place new piping system and air-supply source.

Figure 30:
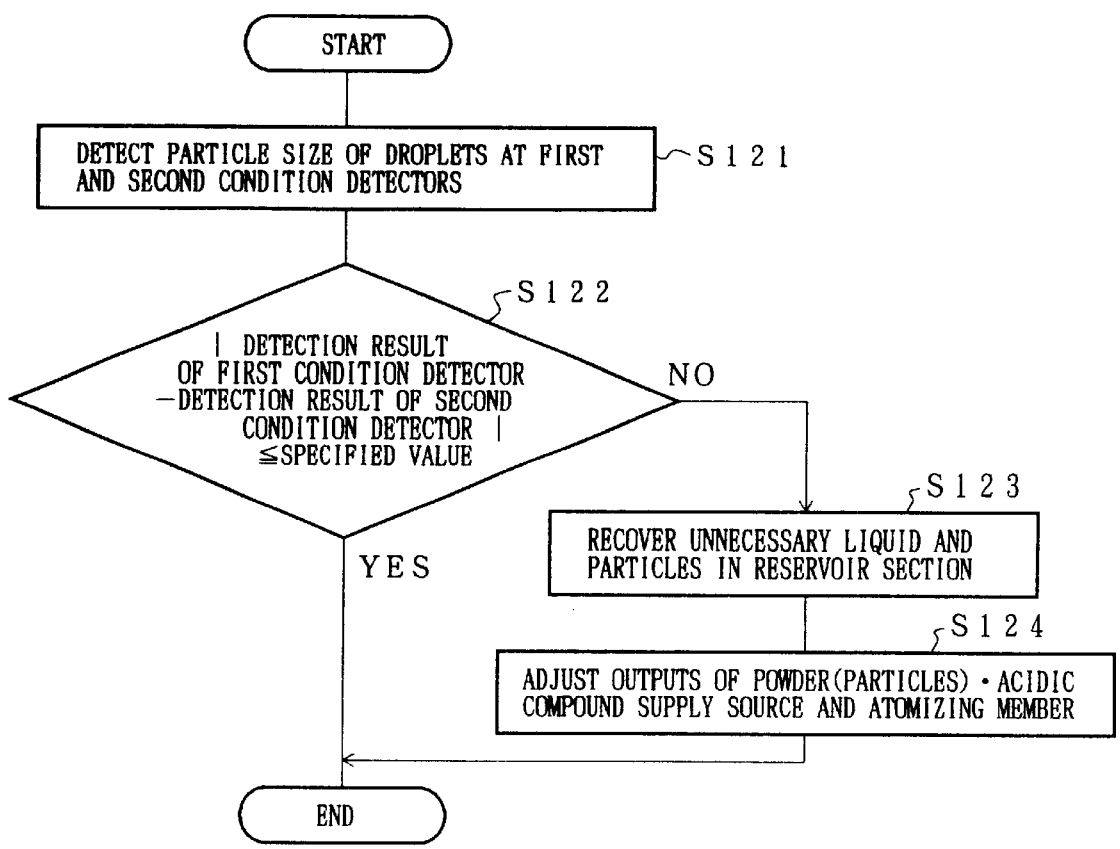
FIG. 30 is a flow chart that shows a control process based upon detections on the particle size of droplets in the first and second condition detector.
Figure 31:
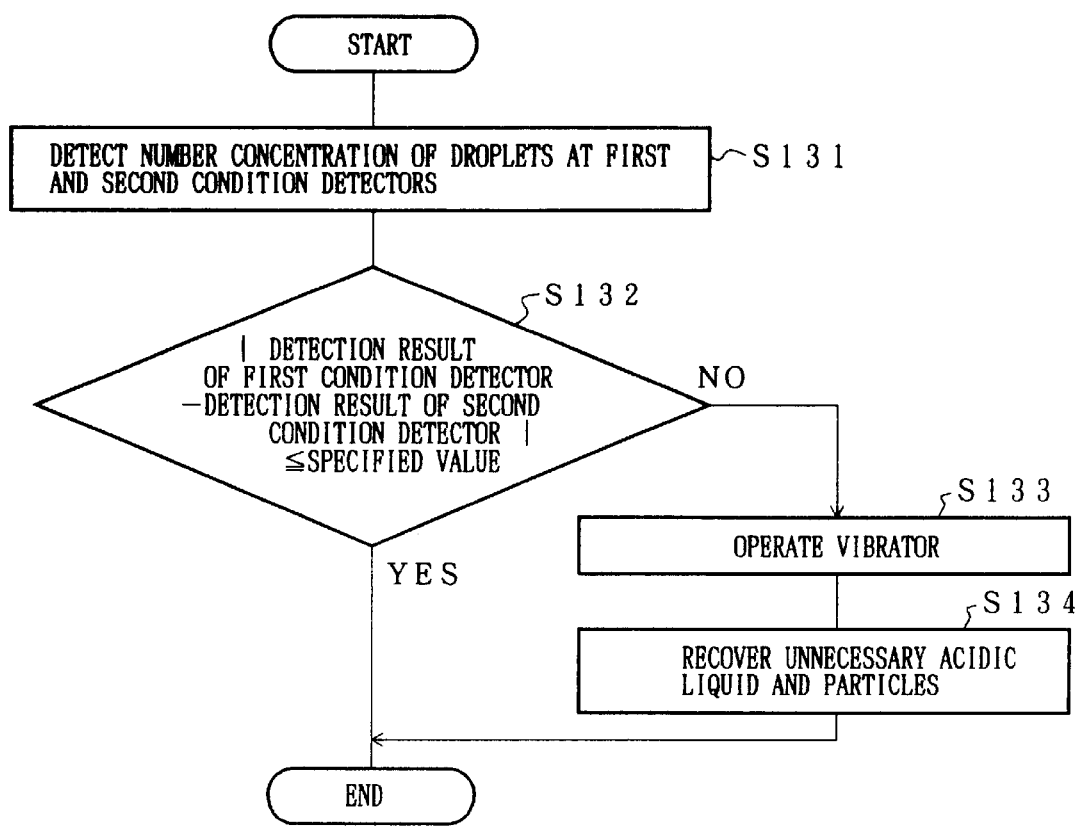
FIG. 31 is a flow chart that shows a control process based upon detections on the number concentration of droplets in the first and second condition detector.

With respect to the feed-back control in the case when the second condition detector 33 is further installed as the particle size detector and the number concentration detector, its processing method (S121 to S124, S131 to S134) is shown in FIG. 30 and FIG. 31. However, since it is virtually the same as the feed-back control system of the first condition detector 31, the detailed description thereof is omitted except the differences as explained below:

Here, in the case of the sole installation of the first condition detector 31, the results of detection of the first condition detector 31 are compared with a reference value; however, as indicated by steps S122 and S132 of the flow charts of FIG. 30 and FIG. 31, the second condition detector 33 is further installed, and in this case, the results of detection of the first condition detector 31 and the second condition detector 33 are compared with each other and a judgement is made as to whether or not the difference between these results of detection is located out of a range of specified values; thus, this arrangement makes it different from the case of the sole installation of the first condition detector 31.

The above explanation exemplified a method in which the particle size and the number concentration of the droplets 22a are detected so as to provide feed-back control. However, the same controlling method may be applied to cases in which the particles 42 are supplied in a dispersed state in the acidic liquid 43, that is, in a state of the suspension 22. In this case, the detection of the size and number concentration is made not on the droplets 22a, but on the particles 42 of the suspension 22, and the results of the detection are fed back so as to control the preparation of the suspension 22 in the particle suspension section 2.

As explained above, in the particle surface-modifying device and its method of the present invention, various detectors and detector are provided in the particle suspension section 2 and the particle supply section 3, and feed-back control is carried out on the supply source and the control system based upon the results of these detections. With this arrangement, upon carrying out an oxidizing process on the particles 42, the above-mentioned method makes it possible to form processed hydrophilic particles 42b stably in a well-controlled manner.

Moreover, there is a possibility that feed-back control from mutually different detectors may be carried out on the same supply source or control system, and in such a case, for example, provision may be made so that those detectors that directly detect a phenomenon are defined as main device while those detectors that indirectly detect a phenomenon are defined as subsidiary device; that is, confirmation may be made as to whether a phenomenon is directly detected or indirectly detected. Alternatively, feed-back control may be carried out by combining the results of a plurality of detections, or setting may be made so as to specify the cause of occurrence of any problem.

Moreover, in order to form uniformly dispersed hydrophilic particles 42b having uniform particle sizes, factors, such as the flow rate and the temperature, of the suspension 22 and the droplets 22a to be transported to the particle oxidizing section 4 need to be detected and controlled so as to be always made constant, and in the event of any abnormality, it is necessary to quickly address the problem. Next, an explanation will be given of these controlling processes and collecting processes in the event of any abnormality.

Figure 29:
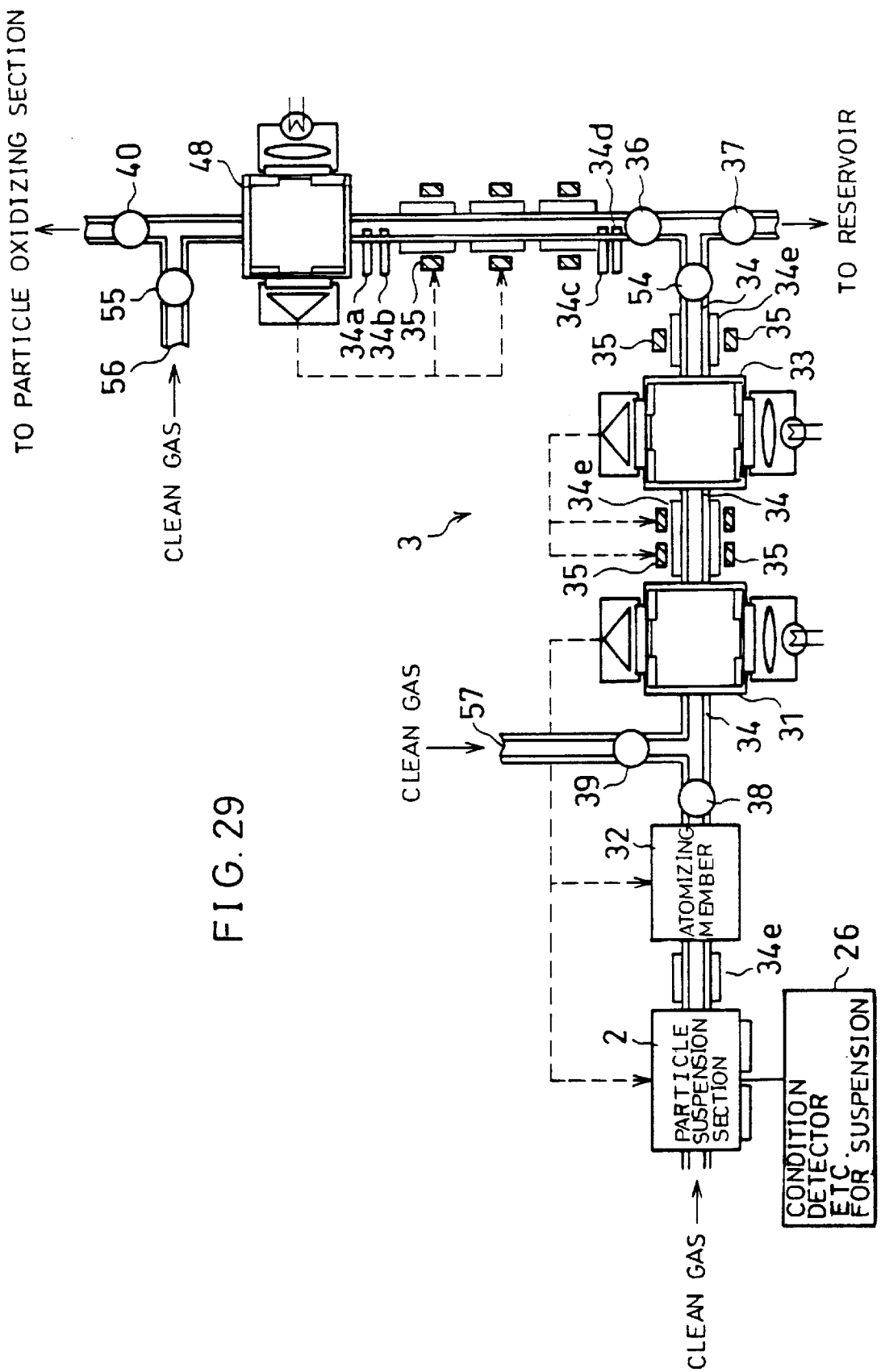
FIG. 29 is a schematic view that shows the construction of the particle supply section having piping on which the first, the second and the third condition detector are installed.

First, the following description will discuss a flow rate detector. For example, as illustrated in FIG. 29, a device such as a hot-wire anemometer provided with an acid-resistant protective tube, etc., may be used as the flow rate detector 34b, and this is installed, for example, on the upstream side in the transporting direction, that is, in the vicinity of the front side, of the particle oxidizing section 4. In order to control the flow rate, for example, a supply valve 36, which can be opened and closed, is placed in the processing space of the particle supply section 3 so that the flow rate can be adjusted by the degree of opening and closing of the supply valve 36. Although, upon supplying the particles 42 through the droplets 22a, the droplets 22a are partially blocked by the supply valve 36, these are collected by the reservoir section 47 that is placed below in the perpendicular direction.

Figure 32:
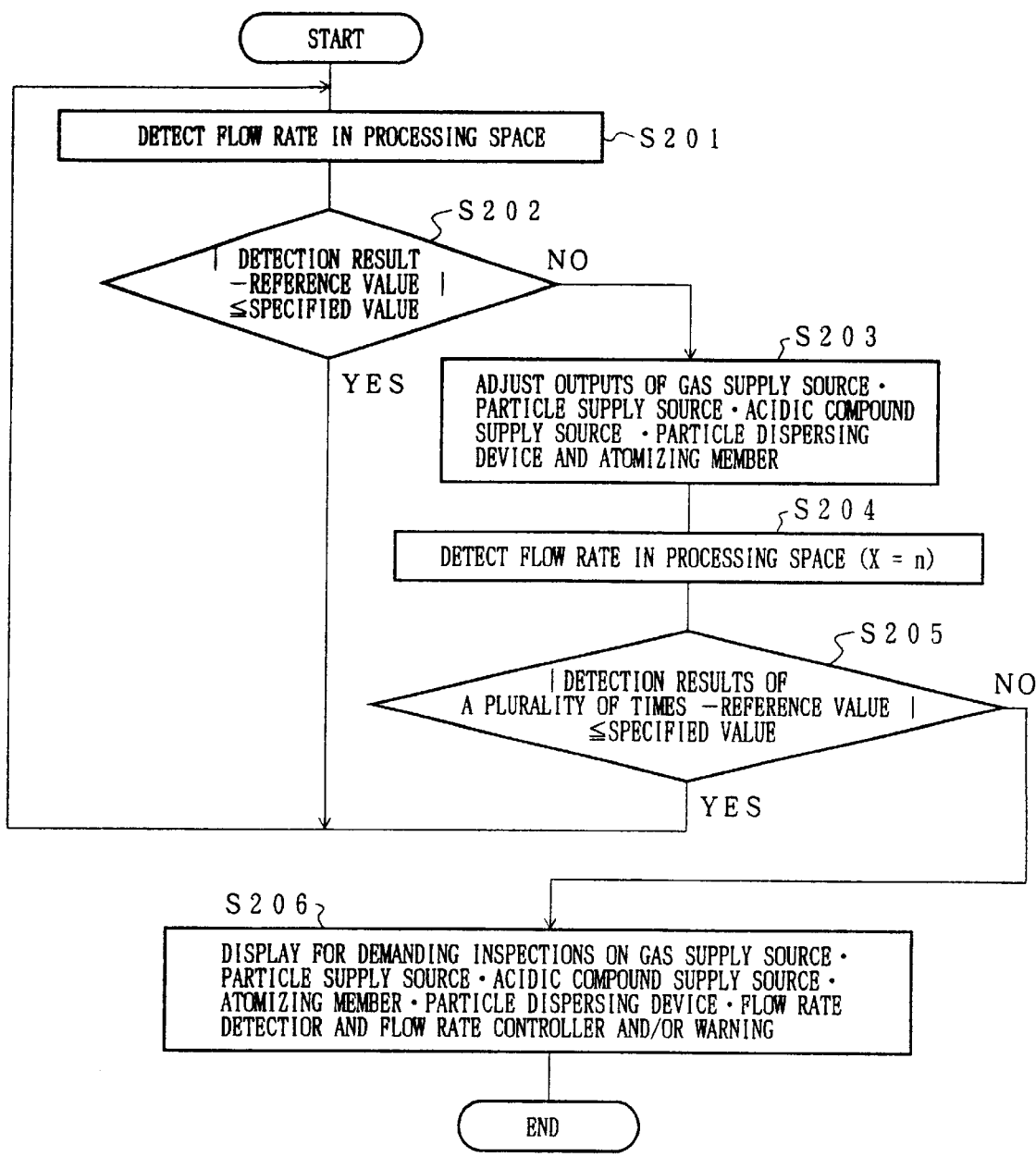
FIG. 32 is a flow chart that shows a control process based upon detections on the flow rate in the processing space in the particle supply section.

An explanation will be given of a feed-back control process using the flow rate detector 34b. As illustrated in FIG. 32, first, at S201, the flow rate of a pneumatic transport or transported liquid in the particle supply section 3 is detected. Next, at S202, the results of the detection are compared with a reference value that has been predetermined, and it is judged whether or not the results of comparison (differences between the results of the detection and the reference value) are located within a specified range.

If they are located within the specified range, the detection of the flow rate in the processing space is again carried out (that is, the sequence returns to S201). At this time, even if the results of comparison are within the specified range, the output of the control device (opening and closing of the valve, etc.) is varied so as to compensate for the difference.

In contrast, if the results of comparison are out of the specified range, the factors causing variations in the flow rate are considered to be: changes in the gas supply source (not shown), the powder (particle) supply source 51, the acidic compound supply source 52 and the particle suspension section 2 (the amount of the particles 42 contained in the acidic liquid 43 and the formation conditions of the droplets 22a, that is, the number concentration and the degree of dispersion in the particle suspension section 2 or the output of the atomizing member 32).

In this case, at S203, the outputs of the gas supply source (not shown), the powder (particle) supply source 51, the acidic compound supply source 52 and the particle suspension section 2 are adjusted, and at S204, after the above-mentioned output adjustments have been made, the detection of the flow rate in the processing space is carried out predetermined times, and at S205, the results of the detection are compared with the reference value that has been predetermined so that it is judged whether or not the results of comparison are located within the specified range.

If they are within the specified range, the detection of the flow rate in the processing space is again carried out. In contrast, if they are out of the specified range, it is regarded that any abnormality is occurring in the flow rate detector, the controller for controlling the flow rate, the gas supply source, the powder (particle) supply source 51, the acidic compound supply source 52, or the particle suspension section 2, and at S206, a display for demanding inspections thereon, or a warning is given.

Figure 33:
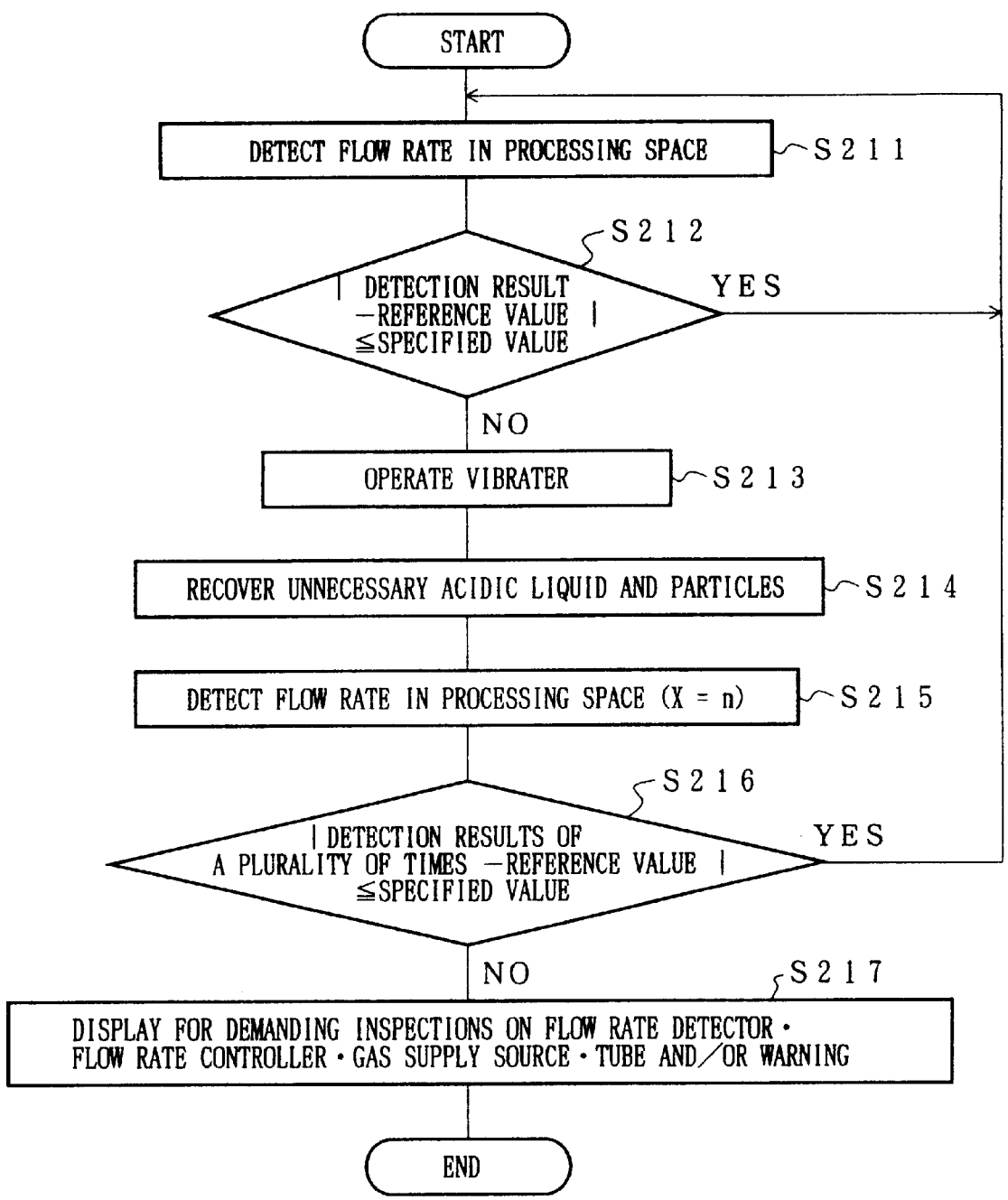
FIG. 33 is a flow chart that shows another control process based upon detections on the flow rate in the processing space in the particle supply section.

Moreover, if the above-mentioned results of comparison are out of the specified range, plugging of the piping 34 is suspected as a cause of the variations in the flow rate. In this case, as illustrated in FIG. 33, at S213, the aforementioned vibrator 35 is operated so as to collect unnecessary acidic liquid 43 and particles 42 (S214) Thereafter, at S215, the detection of the flow rate in the processing space is carried out a predetermined times, and at S216, the results of the detection are compared with a predetermined reference value; then, it is judged whether or not the results of comparison are located within the specified range.

If they are within the specified range, the detection of the flow rate in the processing space is again carried out. In contrast, if they are out of the specified range, it is regarded that any abnormality is occurring in the flow rate detector, the controller for controlling the flow rate, the gas supply source, or the piping 34, and at S217, a display for demanding inspections thereon, or a warning is given. In this case, on the upstream side of the flow rate detector 34b, a second flow rate detector 34d may further be installed; thus, since it becomes possible to recognize which area of the piping 34 undergoes plugging (whether it is occurring at an area in the lateral section or an area in the longitudinal section of the piping), based upon the results of recognition, vibration is applied to the corresponding plugged area.

If any plugging is occurring at an area in the lateral section of the piping 34, the supply valves 36 and 38 are respectively closed while the collection valve 37 and the gas supply valve 39 are opened so that clean gas is introduced from the first gas inlet 57 in a pulsed state. If any plugging is occurring at an area in the longitudinal section of the piping 34, a transport-use value 40 and a valve 54 are closed while the collection valve 37 and the supply valve 36 as well as the gas supply valve 55 are opened so that clean gas is introduced from the second gas inlet 56 in a pulsed state so as to collect unnecessary acid liquid 43 and particles 42.

Next, the following description will discuss the temperature detector. As illustrated in FIG. 29, a device that is the same as the aforementioned temperature detector 28 may be used as the temperature detector 34a, and this is placed in the proximity of the flow rate detector 34b. The temperature of the entire system including the acidic liquid 43 containing the particles 42 or the droplets 22a is detected immediately before they are introduced to the particle oxidizing section 4 so that the conditions of the particles 42 to be supplied (phenomena such as fusing and aggregation) can be recognized, and based upon the results of this, it becomes possible to set energy (temperature) that needs to be supplied in the particle oxidizing section 4.

Figure 34:
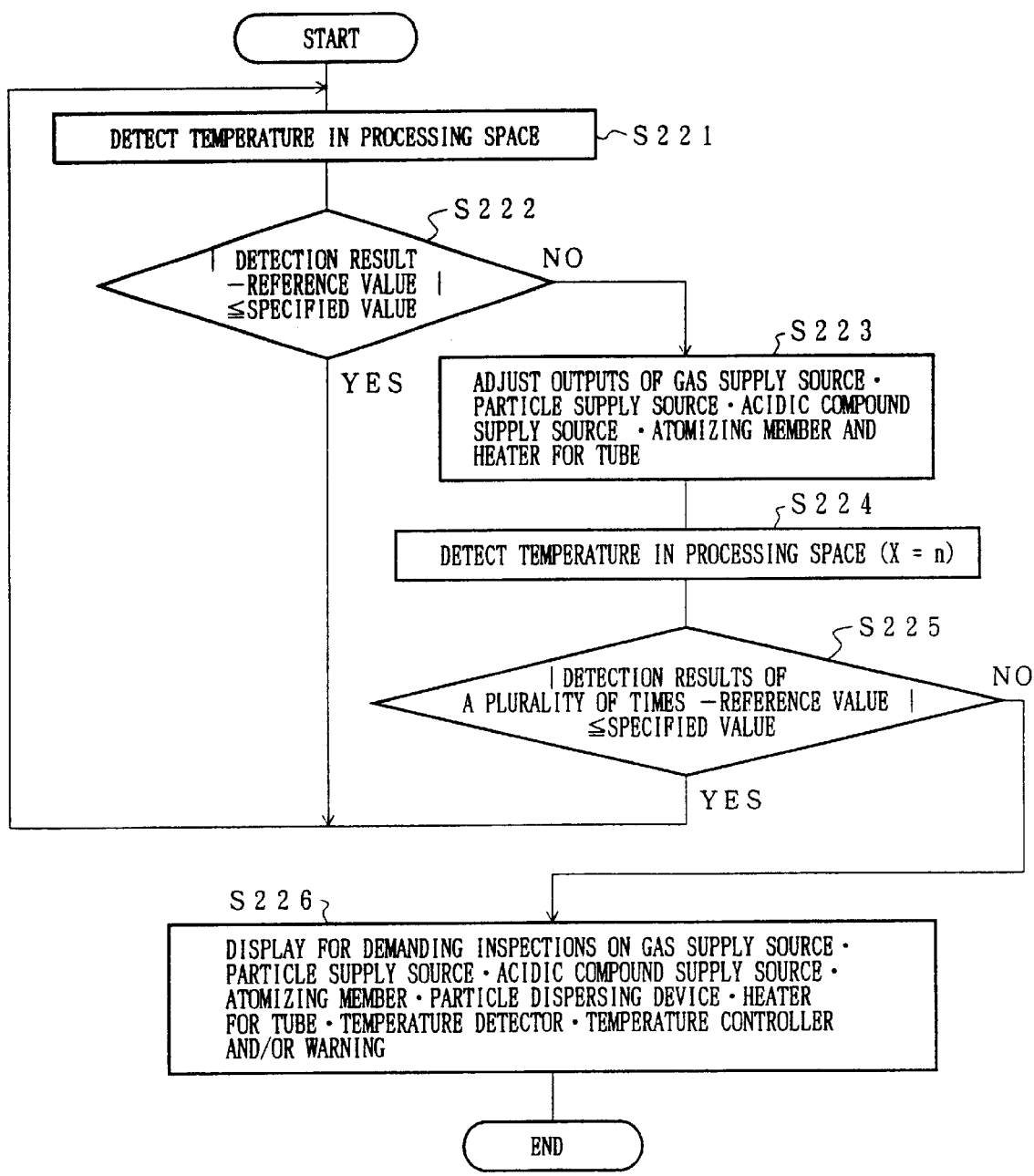
FIG. 34 is a flow chart that shows a control process based upon detections on the temperature in the processing space in the particle supply section.

Referring to FIG. 34, an explanation will be given of a feed-back control process using the temperature detector 34a as a condition detector. Since processes at S221 and S222 are the same as those at S211 and S212 in the case of the flow rate detection, the description thereof is omitted.

In the processing space in the particle supply section 3, if the results of the temperature detector 34a are located out of a specified range, it is judged that it is highly possible any abnormality is occurring in the piping 34 somewhere from the particle suspension section 2 to the temperature detector 34a. This is explained as follows: Although there is a possibility that any abnormality is occurring in the suspension 22 inside the particle suspension section 2, the temperature detection of the suspension 22 is carried out separately as shown in FIG. 23 so that any abnormality in the suspension 22 is detected thereby.

Any abnormality occurring somewhere from the particle suspension section 2 to the temperature detector 34a is mainly caused by the following reasons: malfunction of a heater 34e installed in the piping 34, variations in the flow rate of the pneumatic transport for transporting the suspension 22 and the droplets 22a that contain the particles 42 out of a predetermined amount and the resulting non-supply of the suspension 22 and the droplets 22a that contain the particles 42 of a specified quantity, and inappropriate outputs of the suspension 22 and the droplets 22a that contain the particles 42.

Therefore, at S223, the gas supply source, the particle suspension section 2 (the particle dispersing device 24 including the respective supply valves 51a and 52a of the powder supply source 51, the acidic liquid supply source 52, etc., the stirrer and the dispersion member, the atomizing member 32) and the respective heaters 34e inside the piping 34 are adjusted in their outputs. Then, at S224, after the above-mentioned output adjustments, the detection of temperature in the processing space is carried out a predetermined times, and at S225, the results of the detection are compared with a predetermined reference value; thus, it is judged whether or not the results of comparison are located within a specified range.

If they are within the specified range, the detection of the temperature in the processing space is again carried out. In contrast, if they are out of the specified range, it is regarded that any abnormality is occurring in the inert gas 23 from the gas supply source (not shown), the particle suspension section 2, the heater 34e of the piping 34, the temperature controller (not shown) or the temperature detector 34a, and at S226, a display for demanding inspections thereon, or a warning is given.

Moreover, also in the case when the temperature is detected immediately before the particle oxidizing section 4, a second temperature detector 34c is installed on the upstream side of the temperature detector 34a in the same manner as the case of the flow rate detection, so that an area having any abnormality in temperature can be specified, and based on the results of the detection, it is possible to quickly address the problem. Here, with respect to the control for feeding back the results of the temperature detection in the processing space to the particle oxidizing section 4, the description thereof will be collectively given in the following description dealing with the controlling operation of the particle oxidizing section 4.

Furthermore, in the processing space in the particle supply section 3, a third condition detector 48 for detecting the conditions of the particles 42 in the suspension 22 and the droplets 22a immediately before being supplied to the particle oxidizing section 4 is installed on the downstream side of the processing space.

The application of the third condition detector 48 makes it possible to always confirm the conditions of the particles 42 immediately before being supplied to the particle oxidizing section 4. In other words, since it is possible to always detect the quantity of the particles 42 to be supplied, the controlling operation of the oxidizing process applied to the particles 42 can be simplified. The following description will exemplify a case in which the particles 42 are supplied in the form of the droplets 22a.

In the above-mentioned particle surface modifying method, the third condition detector 48 is used for detecting the particle size of the droplets 22a. As described earlier, depending on states in which the particles 42 forming nuclei are optimally contained in each droplet 22a [FIG. 19(a) and FIG. 19(b)], in which the particles 42 forming nuclei extremely aggregate with each other [FIG. 19(c)] and in which no particles 42 forming nuclei are contained therein [FIG. 19(d)], the diameters of the droplets 22a are different from each other respectively. Therefore, the judgement as to whether or not the droplets 22a are formed in an optimal manner can be made by detecting the particle diameter of the droplets 22a.

The particle sizes (the results of the detection) of the droplets 22a, detected by the third condition detector 48 serving as a particle size detector, are fed back to the particle suspension section 2 and the atomizing member 32, and based on the results of the detection, the particle suspension section 2 and the atomizing member 32 adjust the generation of the droplets 22a. This feed-back control is the same as the aforementioned control method indicated by reference to FIG. 27; therefore, the detailed description thereof is omitted.

With respect to the detection method for the particle size in the third condition detector 48, the same method as the aforementioned optical measurement section 8 may be used; however, this is not particularly limited, and any device may be used as long as it measures the size of the droplets 22a. Here, these methods described above may be combined appropriately.

Besides the particle size detector for detecting the particle size of the droplets 22a, the third condition detector 48 may be constituted by, for example, a number concentration detector for detecting the number concentration of the particles 42.

In the case when a number of droplets 22a exist with a high concentration of droplets 22a, the droplets 22a collide and aggregate with each other while they are flowing, and tend to cause degradation in their dispersing state.

Therefore, by using the third condition detector 48 serving as the number concentration detector, the number of the droplets 22a existing inside a predetermined space (that is, number concentration) is detected; thus, it becomes possible to judge the condition of the droplets 22a in the same manner as the case for detecting the particle size. The results of the detection on the number concentration are also fed back to the supply valve 51a of the powder supply source 51, the particle suspension section 2 and the atomizing member 32 in the same manner as the results of the detection on the particle size so that they are used for controlling the formation of the suspension 22 and the droplets 22a thereof. Consequently, it becomes possible to always maintain the resulting droplets 22a in a good condition.

The feed-back control at this time is basically the same as that which is carried out based on the detection of particle size (see FIG. 28); therefore, the detailed description thereof is omitted. Here, with respect to the detection of the particle size and the detection of the number concentration, either one of these types may be adopted by the third condition detector 48, or both of them may be adopted in a combined manner, which is more preferable to confirm the formation condition of the droplets 22a more accurately. Moreover, another arrangement may be adopted in which one detector is allowed to detect the particle size and the number concentration and the resulting signals are used to detect the particle size and the number concentration.

In the above-mentioned particle surface-modifying method, it is preferable to further install another condition detector on the upstream side of the third condition detector 48. In this case, for example, as illustrated in FIG. 29, the second condition detector 33 installed in the particle supply section 3 may be used. Thus, by comparing the results obtained from both of the third condition detector 48 and the second condition detector 33, it becomes possible to more accurately detect any abnormality in the dispersing condition and supply condition of the resulting droplets 22a. Based upon the results of the detection, the outputs of the supply valve 51a, the particle dispersing device 24 and the heating member 25 can be adjusted and the number concentration of the droplets 22a from the atomizing member 32 can be adjusted; thus, it becomes possible to form and supply the droplets 22a in a more stable manner.

More specifically, in the case when the third condition detector 48 capable of detecting both of the particle size and the number concentration is installed, the second condition detector 33 capable of detecting both of the particle size and the number concentration is preferably installed on the upstream side of the third condition detector 48, and the same vibrator 35 as described earlier for applying vibration to the piping 34 is preferably installed in the piping 34 between the third condition detector 48 and the second condition detector 33. The results of the detection in the third condition detector 48 are compared with the results of the detection in the second condition detector 33 as described above, and fed back so as to adjust the formation conditions of the droplets 22a and to control the vibrator 35 as indicated by an arrow in a broken line in FIG. 29.

The particle size is detected by the third condition detector 48 and the second condition detector 33, and if the results of comparison between the two results of detection are located out of the predetermined range, the particle size and the number concentration of the droplets 22a are judged to be inappropriate (for example, particle size: too large, number concentration: too high). Therefore, in order to control these values appropriately, adjustments are made on the number concentration in the suspension 22 and the formation conditions of the droplets 22a.

With respect to those droplets 22a that have been formed inappropriately as described above, since they are likely to fail to undergo a sufficient oxidizing process, the transport-use value 40 and the valve 54 are closed while the collection valve 37 and the supply valve 36 as well as the gas supply valve 55 are opened so that clean gas is introduced from the second gas inlet 56 in a pulsed state so as to collect unnecessary acid liquid 43 and particles 42 in the reservoir section 47.

Moreover, in the case when any abnormality (an extreme reduction in the number concentration at the succeeding stage) is detected in the number concentration of the droplets 22a by the third condition detector 48 and the second condition detector 33, since it is judged that the acidic liquid 43 and the particles 42 in the droplets 22a adhere to the pipe wall of the piping 34, thereby causing plugging in the piping 34, the oxidizing process is stopped, and the vibrator 35 is preferably operated. In this case, after the operation of the vibrator 35, those inappropriate droplets 22a (those adhering to the pipe wall of the piping 34, and aggregate particles 42) are collected in the reservoir section 47 in the same manner as described above.

After the above-mentioned collection process has been carried out for a given time, the transport-use valve 40 and the valve 54 are respectively opened, and the collection valve 37 and the gas supply valve 55 are closed. Thus, the detection of the number concentration of the droplets 22a is again carried out by the third condition detector 48 and the second condition detector 33, and if the results of comparison between these means are located in the specified range, the oxidizing process is carried out. The introduction of the clean gas may be provided from a branch of the piping line for the clean gas supplied to the particle suspension section 2; there is no need to place new piping system and air-supply source.

Figure 35:
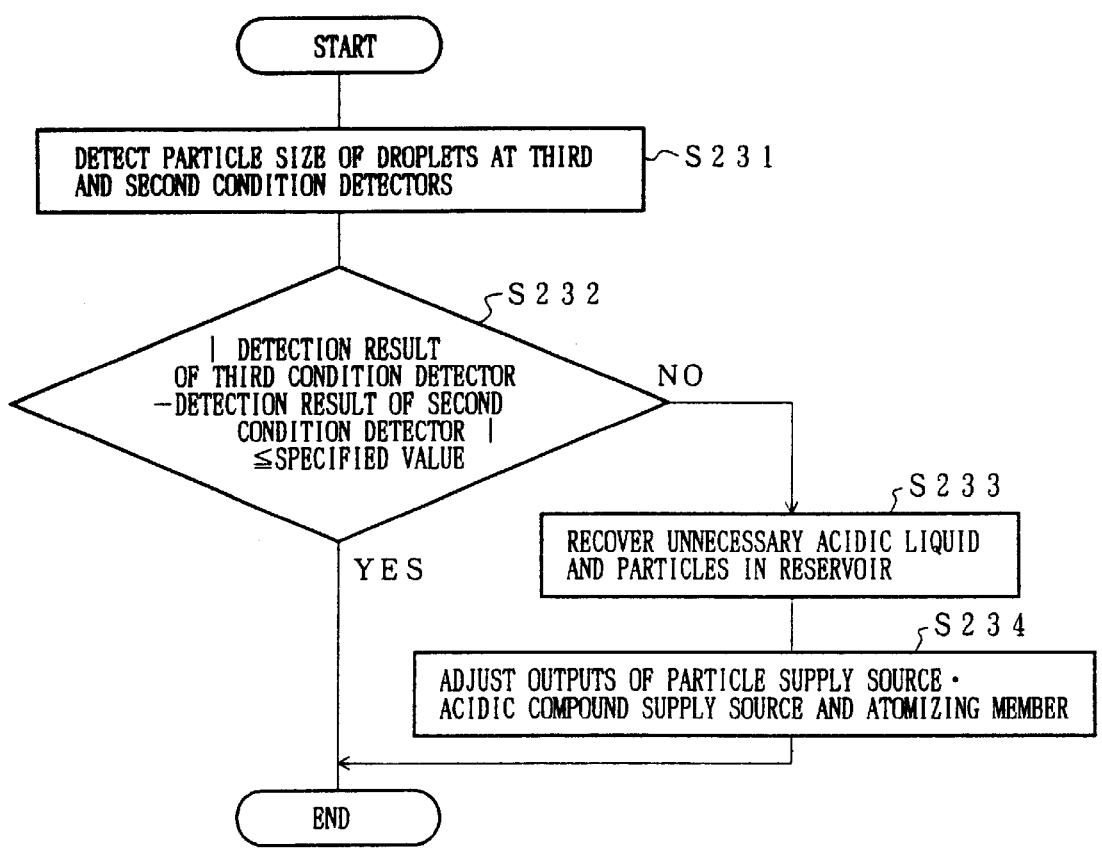
FIG. 35 is a flow chart that shows a control process based upon detections on the particle size of droplets in the second and third condition detector.
Figure 36:
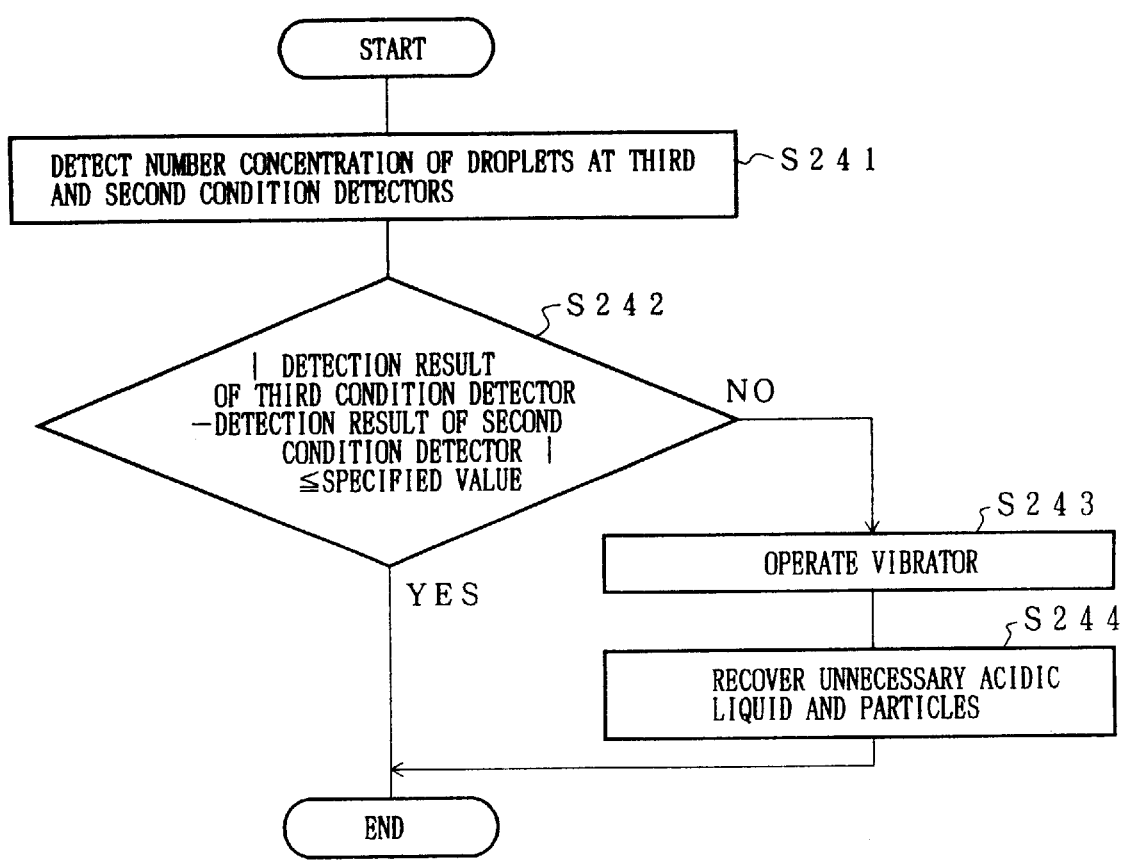
FIG. 36 is a flow chart that shows a control process based upon detections on the number concentration of droplets in the second and third condition detector.

With respect to the feed-back control in the case when the third condition detector 48 and the second condition detector 33 are installed, it is virtually the same as the feed-back control system of the aforementioned third condition detector 48, as shown in respective flow charts (S231 to S234, S241 to S244) of FIGS. 35 and 36, the detailed description thereof is omitted except the following distinctions.

Here, in the case of the sole installation of the third condition detector 48, the results of detection of the third condition detector 48 are compared with a reference value; however, as indicated by steps S232 and S242 of the flow charts of FIG. 35 and FIG. 36, the second condition detector 33 is further installed, and in this case, the results of detection of the third condition detector 48 and the second condition detector 33 are compared with each other and a judgement is made as to whether or not the difference between these results of detection is located out of a range of specified values, which makes it different from the case of the sole installation of the third condition detector 48.

The above explanation exemplified a method in which the particle size and the number concentration of the droplets 22a are detected so as to provide a feed-back control. However, the same controlling method may be applied to cases in which the particles 42 are supplied in a dispersed state in the acidic liquid 43, that is, in a state of the suspension 22. In this case, the detection of the size and number concentration is made not on the droplets 22a, but on the particles 42 of the suspension 22, and the results of the detection are fed back so as to control the preparation of the suspension 22 in the particle suspension section 2.

Figure 37:
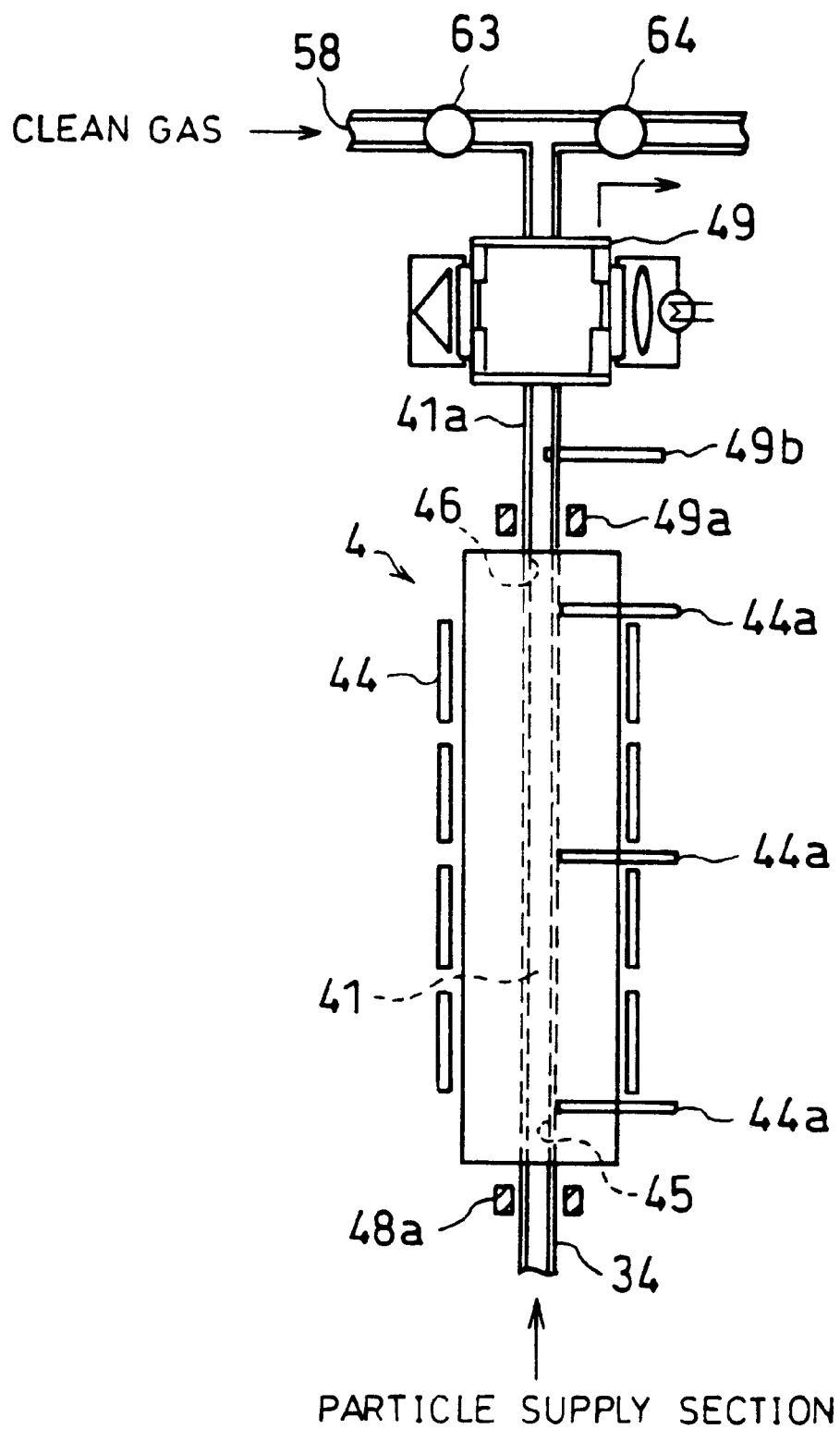
FIG. 37 is a schematic explanatory view related to the particle oxidizing section and the fourth condition detector in the particle surface-modifying device.

Moreover, as illustrated in FIG. 37, for example, three temperature detectors 44a for detecting the temperature of a pipe 41 are installed in the particle oxidizing section 4 along the transporting direction. Furthermore, in the tube 41a on the downstream side in the proximity of the outlet 46 of the particle oxidizing section 4, a vibrator 49a, a flow rate detector 49b and a fourth condition detector 49 are respectively installed along the transport direction.

First, an explanation will be given of the fourth condition detector 49. The fourth condition detector 49 is used for always monitoring the condition of hydrophilic particles 42b that have been subjected to the oxidizing process, and if any abnormality is found in the formation of the hydrophilic particles 42b, feed-back control can be applied to the source causing the abnormality so as to remove the problem.

With respect to the condition detecting factor for the hydrophilic particles 42b that have been subjected to the oxidizing process, the particle size of the resulting hydrophilic particles 42b is taken into consideration. In the present invention, nuclear boiling is carried out with the particles 42 forming nuclei in the acidic liquid 43, and an abrupt expansion of the volume due to a phase change at this time is utilized as an external force for dispersing aggregate particles 42a, thereby carrying out an oxidizing process on the surface of the particles 42 so as to obtain uniformly dispersed hydrophilic particles 42b. Since the hydrophilic particles 42b are in a dispersed state without aggregation if they have been subjected to a normal process, the particle size of an individual particle 42 is detected by the fourth condition detector 49.

However, there is a possibility that the detected particle size may become large or no particle size may be detected, due to any abnormality. The reason for the large particle size, that is, the subsequent aggregate hydrophilic particles 42b, includes insufficient stirring and dispersion in the particle suspension section 2 and the subsequent aggregate particles 42 in the suspension 22 or inappropriate formation conditions of the droplets 22a.

For these reasons, by applying feed-back control to the supply source and the control system based upon the results of detection on the particle size, it becomes possible to quickly extract the causes of a problem and to carry out the oxidizing process of the particles 42 in a stable manner.

Figure 38:
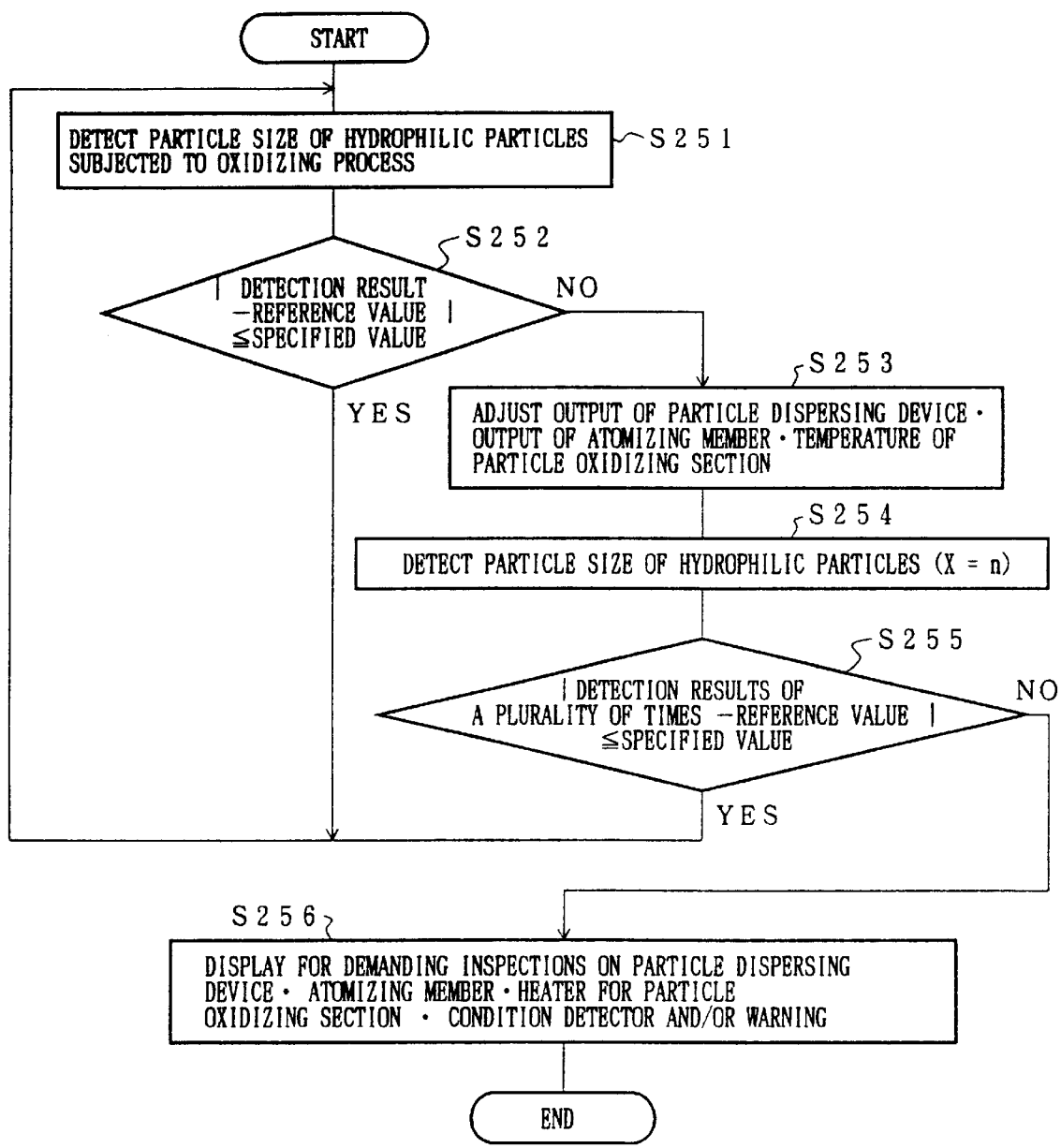
FIG. 38 is a flow chart that shows a control process based upon detections on the particle size of hydrophilic particles obtained in the particle oxidizing section.

The above-mentioned processes are shown in a flow chart in FIG. 38. Here, the processing method (S251 to S256) is the same as the controlling method based upon the detection of the particle size in the droplet 22a shown in FIG. 27; therefore, the description thereof is omitted. Moreover, with respect to those hydrophilic particles located outside of the specified range, clean gas is introduced from the third gas inlet 58 so as to collect them in the reservoir section 47 located below. With respect to a detailed method thereof, an explanation will be separately given later.

Besides the particle size detector for detecting the particle size of the hydrophilic particles 42b after the oxidizing process, the fourth condition detection meas 49 may be provided as, for example, a number concentration detector for detecting the number concentration of the resulting hydrophilic particles 42b. The particles 42, supplied to the particle oxidizing section 4 through the particle supply section 3, are dispersed while being subjected to the oxidizing process; therefore, the number of the hydrophilic particles 42 after the oxidizing process increases as compared with the number before the process. In the case of the detection of the number concentration by the use of the fourth condition detector 49, it is preferable to use it in combination with the third condition detector 48 installed in the processing space of the particle supply section 3.

Figure 39:
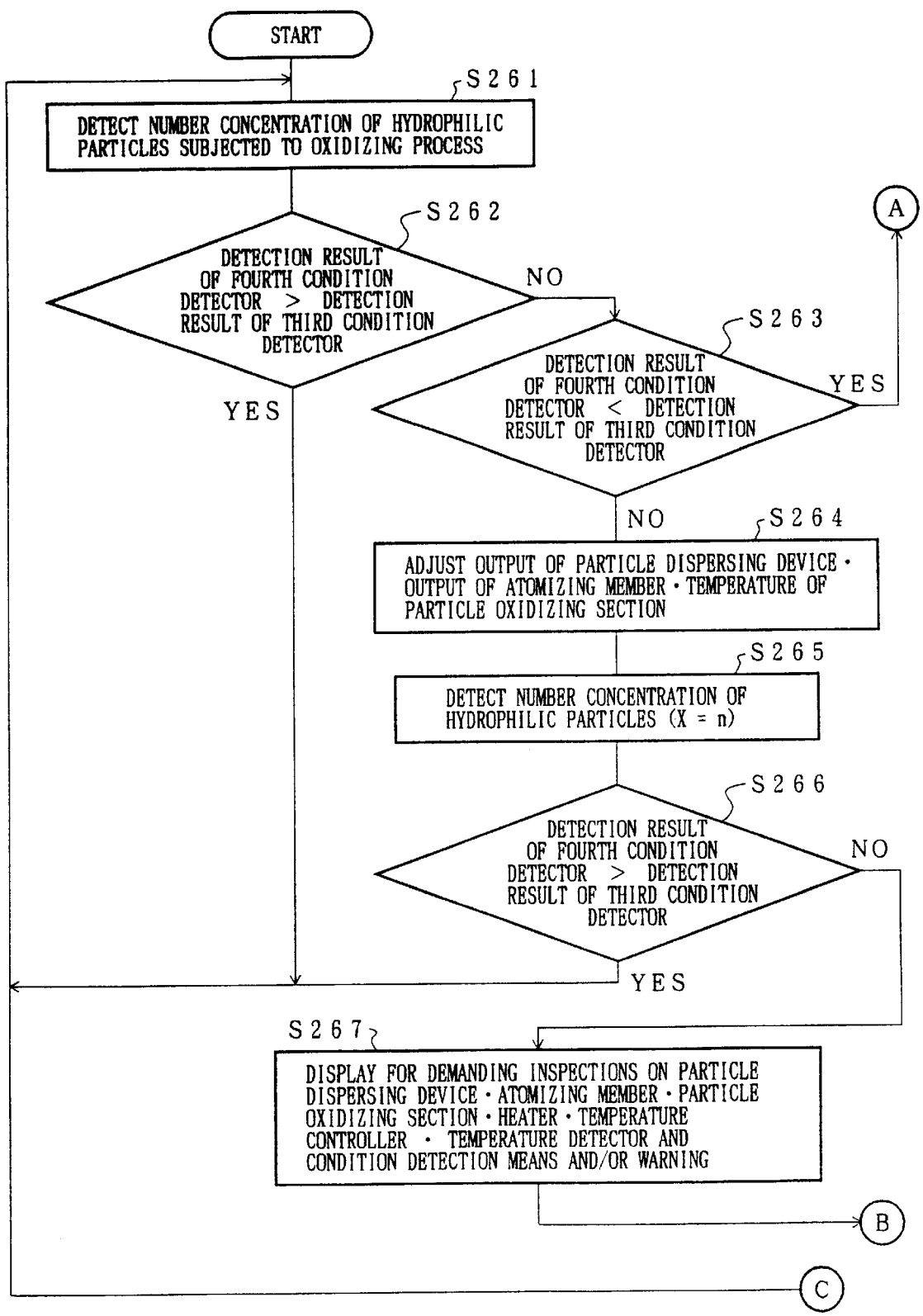
FIG. 39 is the former half of a flow chart that shows a control process based upon detections (third condition detector) on the number concentration of particles immediately before the particle oxidizing section as well as detections (fourth condition detector) on the number concentration of hydrophilic particles obtained in the particle oxidizing section.
Figure 40:
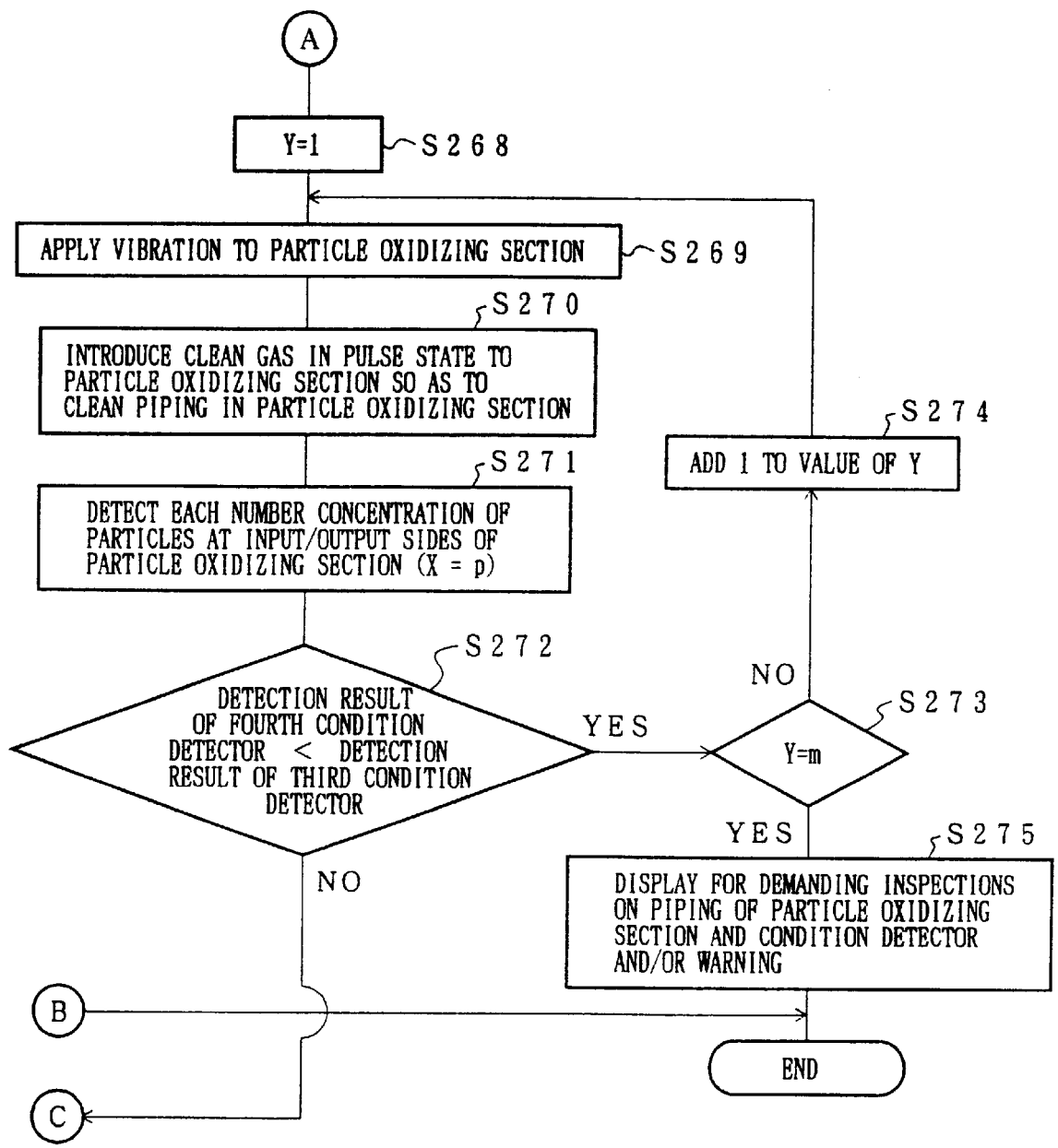
FIG. 40 is the latter half of the above-mentioned flow chart.

Flow charts in FIGS. 39 and 40 show the above-mentioned detection. First, at S261, the number concentration of the hydrophilic particles 42b which have been subjected to the oxidizing process in the fourth condition detector 49 is detected. Next, at S262, the results of the detection are compared with the results of detection of the third condition detector 48 so that it is judged whether or not the number concentration of the hydrophilic particles 42b is increased. If it is increased, a judgement is made that it is normal, and the detection of the number concentration is again made (that is, the sequence returns to S261).

In contrast, in the case when it is not increased in the results of the comparison, first, at S263, the results of detection in the fourth condition detector 49 and the results of detection in the third condition detector 48 are compared with each other; thus, it is judged whether the number concentration of the hydrophilic particles 42b is virtually equal to each other, or is reduced.

As a result, if a judgement is made that it is virtually equal, that is, the oxidizing process is not being carried out appropriately, the possible causes are that the particles 42 aggregate with each other in the suspension 22 or the formation conditions of the droplets 22a in the atomizing member 32 is not appropriate, as described earlier. Moreover, there is another possibility that even if the suspension 22 including the particles 42 are appropriately formed in the particle suspension section 2 and the droplets 22a are also formed appropriately in the atomizing member 32, the heating temperature in the particle oxidizing section 4 is not sufficient, with the result that the particles 42 are not dispersed sufficiently.

In this case, at S264, the particle dispersing device 24 of the particle suspension section 2, the output of the heating member 25 and the atomizing member 32 are adjusted, and the output of the electric heater 44 for the particle oxidizing section 4 are adjusted. Successively, at S265, after the output adjustments, the aforementioned detection of the number concentration is carried out a predetermined times, and at S226, the results of the detections of the fourth condition detector 49 and the third condition detector 48 are compared with each other so that it is judged whether or not the number concentration is increased. If it is increased, the detection of the number concentration is again carried out, thereby continuing the oxidizing process.

In contrast, in the case when the number concentration virtually is not increased and considered to be virtually in the same level, it is judged that there is any abnormality in the particle dispersing device 2 or the heating member 25 of the particle suspension section 2, or in the atomizing member 32, the electric heater 44, the temperature detector 44a or the temperature controller, not shown, in the particle oxidizing section 4; thus, at S267, an instruction for demanding inspections on these is displayed, and a warning is given.

In contrast, at S263, as a result of the comparison between the results of detection in the fourth condition detector 49 and the results of detection in the third condition detector 48, if it is judged that the number concentration of the hydrophilic particles 42b is reduced, the possible cause of the malfunction is plugging inside the tube 41 in the particle oxidizing section 4.

Therefore, first, Y=1 is as the number of cleaning (S268), and successively, the vibrators 48a and 49a are operated so as to apply vibration to the particle oxidizing section 4 (S269), thereby carrying out cleaning inside the tube 41 (S270) by introducing cleaning gas in a pulsed state from the third clean gas inlet 58 shown in FIG. 37.

During such a cleaning process, the gas supply valve 63 is opened with a transport valve 64 being closed, and the transport-use valve 40, the collection valve 37 and the supply valve 36, shown in FIG. 29, are opened with the gas supply valve 55 and the valve 54 being closed so as not to give adverse effects to the particle suspension section 2, the atomizing member 32 and the gas supply source (not shown). Therefore, defective products inside the tube 41 are collected in the reservoir 47.

Here, with respect to the clean gas to be introduced, it is preferable to supply it in a pulsed state. With respect to the third clean gas inlet 58, it is preferable to provide it as a branch from the piping system for supplying a transport-use gas to the particle suspension section 2 in the same manner as the other cases.

After carrying out the cleaning for a given period of time, at S271, the oxidizing process is again started so that the number concentration is detected by the fourth condition detector 49 and the third condition detector 48 a plurality of times, and successively, at S272, the results of the detections are compared and if the results of the former are not reduced as compared with the results of the latter, the resumed oxidizing process is continued (that is, the sequence returns to S261).

In contrast, if the results as described above are still reduced, it is judged whether or not the above-mentioned set value Y has reached m (a positive integer not less than 1) (S273), and if the set value Y has not reached m, the application of vibration to the tube 41 and the cleaning by the use of cleaning gas are carried out while the above-mentioned set value Y is increased, for example, with an increment of 1 (S274) (that is, the sequence returns to S268, and the loop is repeated).

Moreover, if, even after the above-mentioned cleaning has been carried out a plurality of times, the above-mentioned set value Y reaches m (S273), that is, the abnormality is not eliminated even after the cleaning of a plurality of times, it is judged that there is an abnormality occurring inside the tube 41, or that the fourth condition detector 49 or the third condition detector 48 is not operated normally; thus, a display demanding for inspections on these is given, or a warning is given (S275).

Here, upon carrying out the detections of the number concentration in the fourth condition detector 49 and the third condition detector 48 respectively, detection timing in these means forms an essential factor to be taken into account.

In normal cases, the suspension 22 including the particles 42 and the droplets 22a are transported at virtually constant speeds; therefore, at whichever timing the number concentration is detected, the presence or absence of an increase in the number concentration between the particles 42 and the hydrophilic particles 42b can be approximately detected. However, there is a possibility that the supply speeds, that is, the transport speeds of the suspension 22 and the droplets 22a may vary and in the event of an abnormality, the supply speeds will vary abruptly.

Therefore, in order to carry out the detections in the fourth condition detector 49 and the third condition detector 48 more accurately, it is preferable to make the respective detections synchronized with each other; that is, the particles 42, which have been detected by the third condition detector 48 and have passed through the third condition detector 48, are allowed to form the hydrophilic particles 42b through the oxidizing process in the particle oxidizing section 4 while being transported through it, and the conditions of the respective hydrophilic particles 42b (for example, the number concentration and the particle size) are preferably detected by the fourth condition detector 49.

In order to make the third condition detector 48 and the fourth condition detector 49 synchronized with each other, a trigger pulse is first generated upon starting a detection in the third condition detector 48, and a pulse is next formed each time the number concentration is detected. Then, the pulse is inputted to the fourth condition detector 49 with a delay corresponding to a lapse of time determined by the distance between the fourth condition detector 49 and the third condition detector 48 and the supply speed (transport speed) of the particles 42, and in the fourth condition detector 49, upon detection of the pulse, the data of the hydrophilic particles 42b that have just passed through it is taken and the resulting data is outputted.

Figure 41:
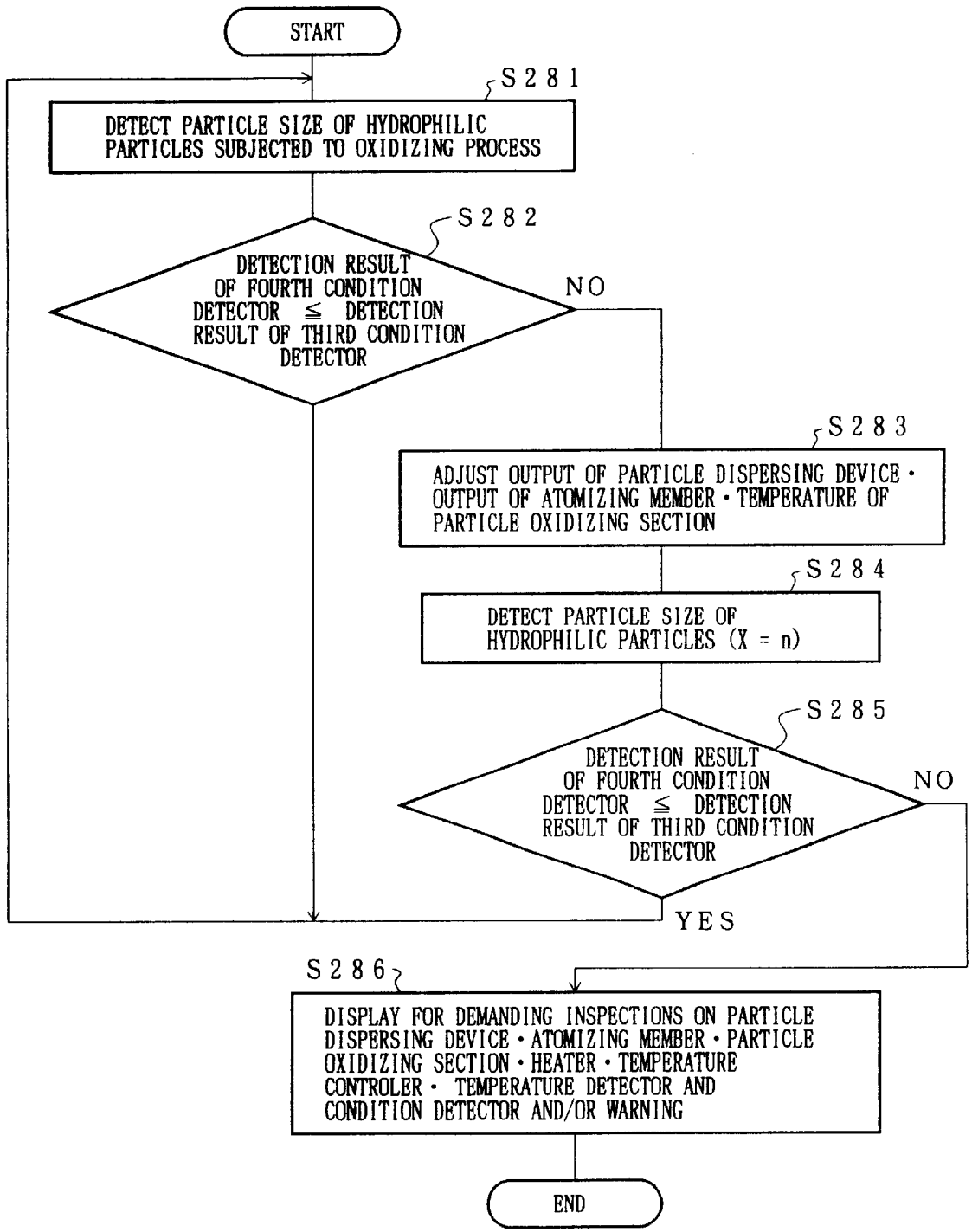
FIG. 41 is a flow chart that shows a control process based upon detections (third condition detector) on the particle size before the oxidizing process in the droplets or the suspension as well as detections (fourth condition detector) on the particle size of the hydrophilic particles after the oxidizing process.
Figure 42:
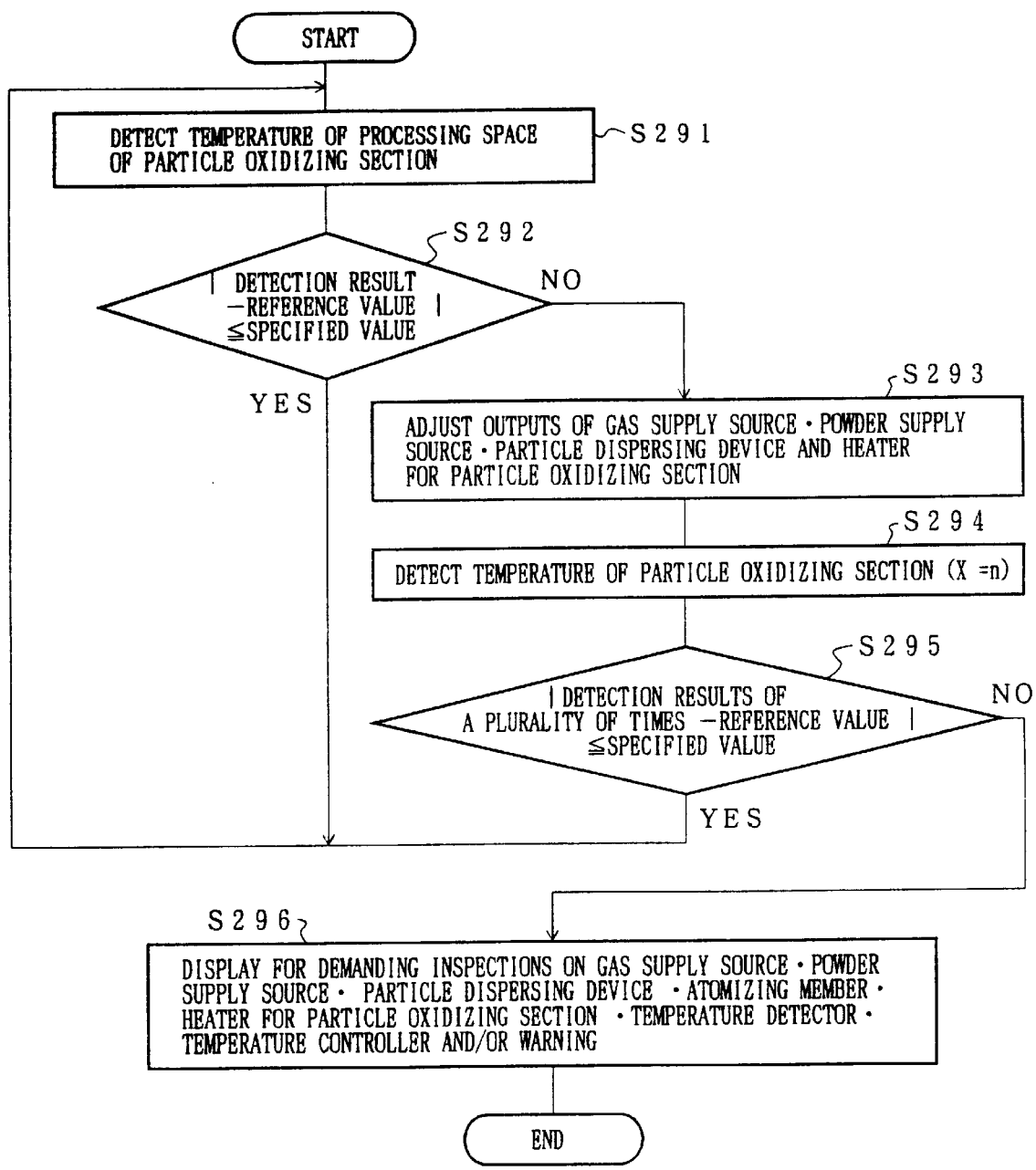
FIG. 42 is a flow chart that shows a control process based upon detections on the temperature of the processing space of the particle oxidizing section.

In the detection of the number concentration, although information on an increase in the particles 42 is obtained, no information is obtained on the degree of dispersion; therefore, upon detecting the particle size, the results of detection of the fourth condition detector 49 and the third condition detector 48 may be compared with each other so as to provide the corresponding control. FIG. 41 shows a flow chart on this control operation. With respect to the processing method (S281 to S286), it is carried out in the same manner as S261 to S267 (except S263) of number concentration detection shown in FIG. 39; therefore, the detailed description thereof is omitted.

In order to make a judgement as to whether or not the oxidizing process is appropriately carried out on the resulting hydrophilic particles 42b, a positive method is to monitor the particle size of the hydrophilic particles 42b by using the fourth condition detector 49. However, the conditions inside the particle oxidizing section 4 can be more positively detected by combining the detection results of the fourth condition detector 49 and the third condition detector 48 as described above, and it is also possible to specify the cause of any abnormality more positively.

In the above-mentioned description, upon comparing the results of the detections between the fourth condition detector 49 and the third condition detector 48, the possible cause of a judgement made as being inappropriate is any abnormality in the particle dispersing device 24 or the heating member 25 of the particle suspension section 2, or in the atomizing member 32, or in the electric heater 44 of the particle oxidizing section 4. Among these, with respect the particle dispersing device 24, the heating member 25 and the atomizing member 32, the judgement can be made based upon the results of the detections in the particle suspension section 2 and the particle supply section 3.

Therefore, in the case when a judgement is made as being inappropriate, if no abnormality is found in any one of the particle dispersing device 24, the heating member 25 and the atomizing member 32, it is judged that there is a problem, that is, any abnormality, in the temperature control system in the particle oxidizing section 4. Moreover, by combining the results of the detections of the particle size and the number concentration, it becomes possible to increase the accuracy in specifying the cause of any abnormality.

Next, an explanation will be given of the temperature detector 44a. As described earlier, the temperature of the inside of the particle oxidizing section 4 is closely related to the amount of the particles 42 to be supplied, and needs to be set at a condition so as to give energy necessary to uniformly carry out the oxidizing process on the particles 42 to be supplied and also to uniformly disperse aggregate particles 42a. Therefore, the temperature is set so as to satisfy the above-mentioned condition, and it is not necessary to increase the temperature beyond the set temperature.

As described earlier, in the present invention, it is preferable to heat the suspension 22 that is to be transported into the particle oxidizing section 4; therefore, it is efficient to set the temperature of the suspension 22 based upon the results of the temperature measurements in the processing space of the particle supply section 3 located immediately before the particle oxidizing section 4 as shown in FIG. 29. In other words, heating energy, which corresponds to a difference $\Delta t$ between the temperature Tp required for the oxidizing process and the temperature To in the processing space in the particle supply section 3 is supplied to the suspension 22 in the particle oxidizing section 4.

The temperature detector 44a is of course used for controlling the temperature inside the particle oxidation section 4 so as to make it constant, and it is further used for carrying out a feed-back control on the particle supply source side such as the particle suspension section 2 and the atomizing member 32 based upon the results of the temperature detection. These control processes are shown in S291 to S296 of a flow chart of FIG. 42.

The possible causes of any abnormality in the particle oxidizing section 4 are defective control operations such as malfunctions in the electric heater 44 and the controller installed in the particle oxidizing section 4, a deviation of the flow rate of gas used for transporting the suspension 22 or the droplets 22a from a predetermined amount and the subsequent shortage of the suspension 22 or the droplets 22a from specified amounts (droplets 22a containing no particles or extremely aggregate particles 42), and inappropriate outputs of the suspension 22 or the droplets 22a. In order to avoid these defective control operations, a feed-back control process is carried out on each of the above-mentioned members. The respective control processes for the feed-back control are virtually the same as those control processes carried out based on the temperature detection inside the processing space in the particle supply section 3 shown in FIG. 42; therefore, the detailed explanation thereof is omitted.

Figure 43:
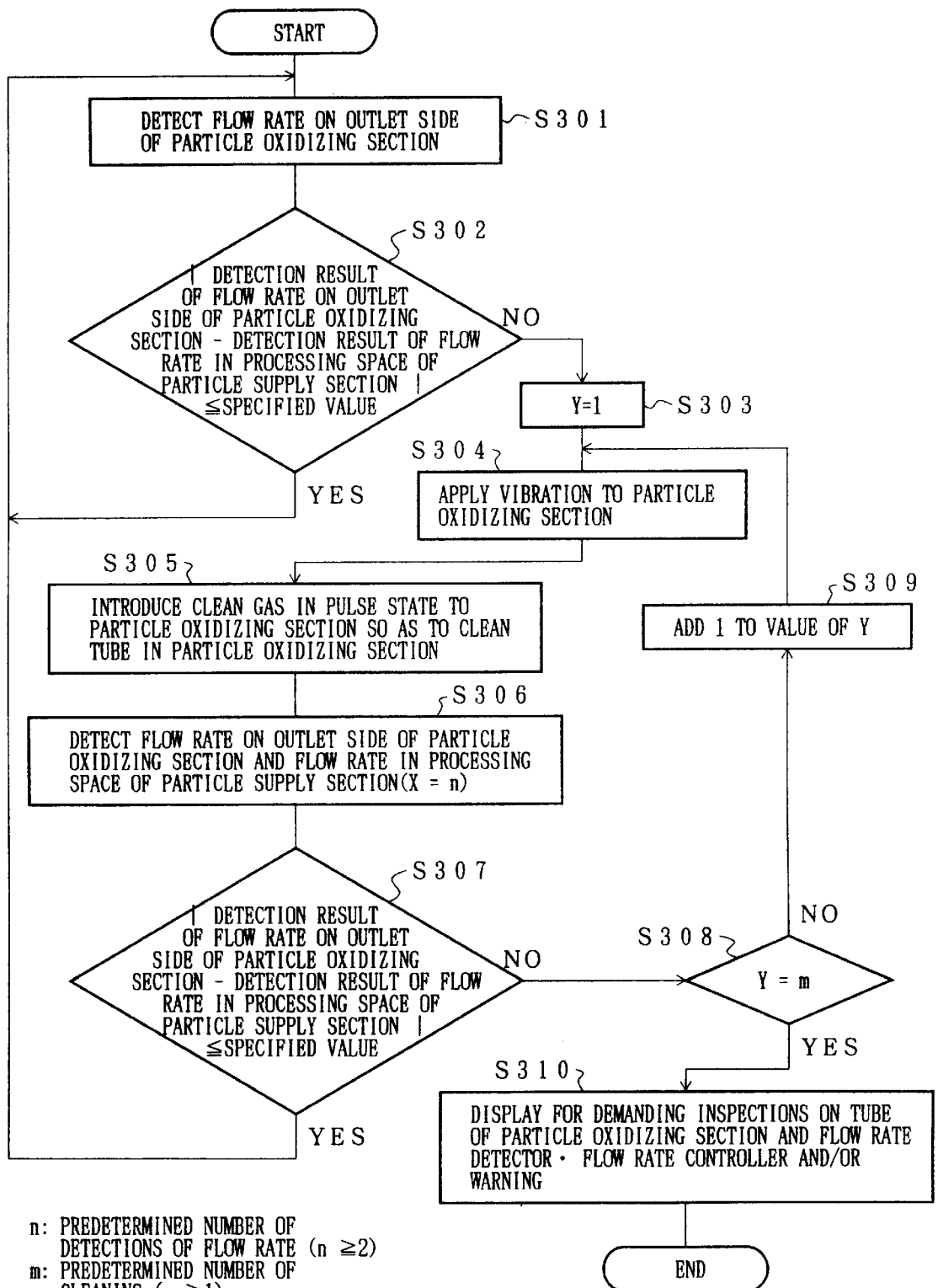
FIG. 43 is a flow chart that shows a control process based upon detections on the flow rate on the outlet side of the particle oxidizing section.

As described earlier, the flow rate detector 49b is installed on the outlet side of the particle oxidizing section 4, and this compares the results of the detections in the flow-rate detectors 34b and 34d installed in the processing space of the particle supply section 3 so as to detect the presence or absence of plugging inside the particle oxidizing section 4. FIG. 43 shows a flow chart with respect to a processing method at this time. This process can be carried out in the same manner as the method in which the fourth condition detector 49 and the third condition detector 48, shown in FIGS. 37 and 29, detect plugging inside the particle oxidizing section 4 and remove it.

Here, in the case when a plurality of detections on the flow rate are respectively carried out on the outlet side of the particle oxidizing section 4 and in the processing space of the particle supply section 3 at S306 shown in FIG. 43, it is only necessary to introduce clean gas, for example, from the first gas inlet 57 shown in FIG. 29, and it is not necessary to form the droplets 22a, etc. so as to introduce them thereto. Moreover, upon detecting the presence or absence of plugging inside the particle oxidizing section 4, the fourth condition detector 49 and the third condition detector 48 may be used in a combined manner.

As described above, in the particle surface-modifying method of the present invention, various detectors are installed in the particle supply section 3 and the particle oxidizing section 4, and based upon the results of the detections, feed-back control operations are carried out on the supply source and the control system; thus, it becomes possible to efficiently carry out the oxidizing process on the particles 42 with high precision.

Here, there is a possibility that feed-back control from different detectors in the respective sections may be carried out on the same supply source or control system, and in such a case, for example, provision may be made so that those detectors that directly detect a phenomenon are defined as main detectors while those detectors that indirectly detect a phenomenon are defined as subsidiary detectors; that is, confirmation may be made as to whether a phenomenon is directly detected or indirectly detected. Alternatively, feed-back control may be carried out by combining the results of a plurality of detections, or setting may be made so as to specify the cause of occurrence of any problem.

In the particle surface-modifying method of the present invention, it is preferable to apply heat to the suspension at a temperature not less than 10 K above the boiling point of the liquid of the suspension so as to evaporate the liquid. With this method, it is possible to heat or evaporate the liquid more positively, and consequently to obtain surface modified particles more efficiently.

In the above-mentioned method, the particles may be provided as hydrophobic particles. The above-mentioned method makes it possible to obtain hydrophilic surface-modified particles from the hydrophobic particles.

In the above-mentioned method, it is preferable for the liquid to contain water. In the above-mentioned method, since water is inactive to various kinds of substances, it becomes possible to apply the surface treatment to various kinds of particles and also to reduce material costs and liquid waste costs.

In the above-mentioned method, in the case when hydrophilic particles are obtained as the surface modified particles, it is preferable to use an acidic modifier. In this method, it is possible to efficiently carry out the oxidizing process on the particles, and consequently to efficiently produce surface modified particles that are hydrophilic particles.

In the above-mentioned method, in the case when hydrophilic particles are obtained as the surface modified particles, it is particularly preferable to use nitric acid as the modifier. In this method, it is possible to further efficiently carry out the oxidizing process on the particles, and consequently to efficiently produce surface modified particles that are hydrophilic particles in a stable manner.

In the above-mentioned method, it is preferable for the liquid to contain a volatile liquid having latent heat of vaporization not more than the latent heat of vaporization of water. In this method, since the volatile liquid is contained, it is possible to evaporate the liquid more quickly, to disperse aggregate particles more positively, and consequently to obtain surface modified particles more efficiently.

In the above-mentioned method, since the evaporation accelerator is contained, it is possible to evaporate the liquid more quickly, to disperse aggregate particles more positively, and consequently to obtain surface modified particles more efficiently.

In the above-mentioned method, it is preferable to disperse particles contained in the suspension within the suspension. In this method, since the particles are dispersed, it becomes possible to reduce aggregate particles, and also to reduce sizes of the aggregating particles; thus, uniform surface modified particles having comparatively small particle sizes can be produced in a stable manner.

In the above-mentioned method, it is preferable for the suspension to be preliminarily heated. In this method, since a temperature rise At required for nuclear boiling and evaporation of the suspension can be minimized, it is possible to accelerate nuclear boiling and evaporation. Consequently, the above-mentioned method makes it possible to increase the rate of change in the volume expansion upon nuclear boiling and evaporation, and to carry out dispersion of aggregate particles more efficiently; thus, uniform surface modified particles having comparatively small particle sizes can be produced in a stable manner.

In the above-mentioned method, it is preferable to transport the surface modified particles having modified surfaces by using an inert gas. In this method, since the inert gas having a low reactivity is used, it is possible to easily transport the surface modified particles in a stable manner; thus, it becomes possible to easily produce the surface modified particles continuously in a stable manner.

In the above-mentioned method, it is preferable to make the suspension in a droplet state. In this method, since the droplets are used, it is possible to easily carry out nuclear boiling and evaporation on the liquid of the suspension, to reduce, for example, supply power required for heating, and consequently to cut costs.

In the above-mentioned method, the modifier may be used for imparting hydrophilic groups to the surface of the particles. In this method, hydrophilic particles having a superior dispersing property and a wide applicability for toners, pigment particles, etc. can be obtained stably as surface modified particles.

In the above-mentioned method, the particles are preferably set so as to have an average particle size in the range of 10 nm to 20 $\mu$m. In this method, surface modified particles having comparatively small particle sizes can be obtained in a stable manner.

The following description will discuss the particle surface-modifying method and the particle surface-modifying device of the present invention in more detail.

Here, the acidic liquid (liquid) of the present invention is not particularly limited as long as it can oxidize the surface of fine particles having a hydrophobic property; for example, in the case when black pigment particles are used as the fine particles, it is preferable to use an aqueous solution containing nitric acid as the acidic acid. In accordance with the particle surface-modifying method and the particle surface-modifying device of the present invention, since carboxylic groups (hydrophilic groups) are efficiently introduced onto the surface of pigment particles through oxidization, it is possible to produce hydrophilic particles to which hydrophilic property has been imparted in a stable manner at low costs by eliminating inefficiency.

In other words, in the case when hydrophobic pigment particles are used, so-called strong acids, such as nitric acid, are preferably used as the acidic liquid. With respect to the concentration of nitric acid in the acidic liquid, although it is not particularly limited, the higher the concentration, the more preferable in the case when more amount of hydrophilic groups is desired. The above-mentioned pigment is immersed into the acidic liquid containing nitric acid, and this is heated and boiled so that the pigment surface is oxidized; thus, pigment particles having surfaces to which carboxylic groups are introduced, that is, to which hydrophilic property has been imparted, can be obtained.

In order to increase the dispersing property of the particles in the liquid at the time of evaporation and nuclear boiling also to accelerate evaporation of the liquid, for example, liquified gas such as carbon dioxide and nitrogen gas may be added to the acidic liquid, or in order to quickly dry the particles, a volatile liquid and an evaporation-accelerating agent, such as ethyl alcohol fleon gas, may be added thereto. With respect to the volatile liquid, those which have a latent heat of vaporization smaller than that of water [41 kJ/mol (373K)] and exhibit a liquid phase at room temperature, may be used, and, for example, ethyl alcohol [39 kJ/mol (352K)] is used. Moreover, with respect to the evaporation-accelerating agent, in addition to the above-mentioned volatile liquid, those which are easily dissolved in liquid and foam upon application of heat, may be used, and, for example, carbon dioxide, hydrogen peroxide and carbon tetrachloride are listed.

Moreover, as described above, the particle surface-modifying method in accordance with the present invention may include the steps of: in order to impart a hydrophilic property to hydrophobic particles, from a suspension in which the particles are immersed in an acidic liquid, forming droplets of the suspension; boiling the droplets abruptly so as to modify the surface of the particles through oxidation; collecting the liquid adhering to the particles that have been surface-modified; and capturing and washing the hydrophilic surface-modified particles obtained through the above-mentioned processes.

In the above-mentioned method, since the resulting surface modified particles are captured and washed, it is possible to remove impurities contained in the surface modified particles. Thus, it becomes possible to provide uniform hydrophilic particles having a comparatively small particle size by using simple device and operation in a short time, at low costs, in a stable manner, without charging the resulting hydrophilic particles.

The hydrophilic particles that have been washed are dried to the extent necessary to prevent aggregation among the hydrophilic particles, if necessary. Here, it is judged based upon, for example, the pH of the washing liquid whether or not impurities contained in the hydrophilic particles have been removed. The capturing method, washing method and drying method of the hydrophilic particles are not particularly limited.

The surface modified particles obtained by the above-mentioned method acquire a hydrophilic property since, for example, hydrophilic groups have been introduced onto the surface of the particles; therefore, they have an improved wettability to water. More specifically, for example, pigment particles have an improved wettability to water since carboxylic groups (hydrophilic groups) are introduced onto the surface of the pigment particles.

Another particle surface-modifying method of the present invention is provided with a mixing process for suspending particles in an acidic liquid so as to obtain a suspension, a control process for detecting the condition of the suspension and for controlling the formation of the suspension based upon the results of the detection, and an oxidizing process for applying heat to the suspension being transported so as to allow the acidic liquid to evaporate, thereby forming surface modified particles whose surfaces have hydrophilic groups due to the oxidization.

Still another particle surface-modifying method of the present invention is provided with a mixing process for suspending particles in an acidic liquid so as to obtain a suspension, a droplet forming process for forming droplets containing particles from the suspension, a control process for detecting the formation condition of the droplets and for controlling the formation of the droplets based upon the results of the detection thus obtained, and an oxidizing process for applying heat to the transported droplets while they are being carried so as to allow the acidic liquid to evaporate, thereby forming surface modified particles whose surfaces have hydrophilic groups due to the oxidization.

Still another particle surface-modifying method of the present invention is provided with a mixing process for suspending particles in an acidic liquid so as to obtain a suspension, a transporting process for transporting and supplying the suspension, an oxidizing process for applying heat to the suspension being transported so as to allow the acidic liquid to evaporate, thereby forming surface modified particles whose surfaces have hydrophilic groups due to the oxidization, and a control process for detecting the condition of the suspension during the transporting process and for controlling the formation of the surface modified particles based upon the results of the detection thus obtained.

Still another particle surface-modifying method of the present invention is provided with a mixing process for suspending particles in an acidic liquid so as to obtain a suspension, a droplet forming process for forming droplets containing particles from the suspension, an oxidizing process for applying heat to the transported droplets while they are being carried so as to allow the acidic liquid to evaporate, thereby forming surface modified particles whose surfaces have hydrophilic groups due to the oxidization, and a control process for detecting the condition of the droplets during the transporting process and for controlling the formation of the surface modified particles based upon the results of the detection thus obtained.

Still another particle surface-modifying method of the present invention is provided with a mixing process for suspending particles in an acidic liquid so as to obtain a suspension, an oxidizing process for applying heat to the suspension being transported so as to allow the acidic liquid to evaporate, thereby forming surface modified particles whose surfaces have hydrophilic groups due to the oxidization, and a control process for detecting the condition of the oxidizing process and for controlling the formation of the surface modified particles based upon the results of the detection thus obtained.

Still another particle surface-modifying method of the present invention is provided with a mixing process for suspending particles in an acidic liquid so as to obtain a suspension, a droplet forming process for forming droplets containing particles from the suspension, an oxidizing process for applying heat to the droplets being transported so as to allow the acidic liquid to evaporate, thereby forming surface modified particles whose surfaces have hydrophilic groups due to the oxidization, and a control process for detecting the condition of the oxidizing process and for controlling the formation of the surface modified particles based upon the results of the detection thus obtained.

In each of the above-mentioned particle surface-modifying methods, the suspension, formed by immersing and suspending particles in an acidic liquid, for example, nitric acid, are heated while being transported, or more preferably, heated so as to cause abrupt nuclear boiling with the particles serving as nuclei; thus, the particles, which are susceptible to aggregation, are dispersed and the surfaces of the particles are modified through oxidation by the acidic liquid, thereby forming surface modified particles (hereinafter, referred to as hydrophilic particles) to which hydrophilic groups have been imparted.

Therefore, in the above-mentioned method, an external force, exerted by an abrupt volume expansion due to nuclear boiling by application of heat, for example, by a volume expansion of 1000 times exerted by evaporated water, is utilized; therefore, even in the case of aggregate particles, since secondary particles that are aggregate particles are dispersed into primary particles, it becomes possible to obtain hydrophilic particles having relatively small particle sizes, high dispersing property and superior characteristics.

Moreover, in the above-mentioned method, since such an oxidizing process is controlled based upon the detections on the respective conditions, it is possible to optimize the oxidizing process, and consequently to produce hydrophilic particles having superior characteristics in more stable manner.

With this arrangement, different from conventional methods in which an oxidizing process is carried out while stirring particles by using a stirring device such as stirring blades, the possibility of charged particles due to friction, etc. can be avoided, thereby making it possible to obtain hydrophilic particles which can be handled more easily as compared with the conventional methods.

Moreover, in the above-mentioned manufacturing method, hydrophilic particles having modified particle surfaces can be obtained by simple device and operations in which transporting and heating are carried out simultaneously, through a shortened process by the use of evaporation and nuclear boiling due to application of heat.

The hydrophilic particles obtained by the above-mentioned method acquire a hydrophilic property since, for example, hydrophilic groups have been introduced onto the surface of the particles; therefore, they have an improved wettability to water. More specifically, for example, hydrophilic particles have an improved wettability to water since carboxylic groups (hydrophilic groups) are introduced onto the surface of the hydrophilic particles. Therefore, the hydrophilic particles can be dispersed in water that is advantageous in safety, and are consequently superior in handling property.

In the above-mentioned method, with respect to conditions to be detected, the degree of dispersion, the particle size, the number concentration, the flow rate and the transporting speed of the particles in the suspension and the droplets, the respective liquid properties (pH and temperature) of the suspension and the droplets, the particle size and the number concentration of the droplets, the remaining amount of the suspension in the mixing process, the particle size, the number concentration and the flow rate of the resulting hydrophilic particles and the heating temperature and the flow rate in the oxidizing process are respectively listed; and these factors are solely or combinedly used so as to detect the conditions.

In the above-mentioned method, it is preferable to carry out the respective detections at a plurality of different places along the transporting direction. With this method, the detected conditions can be judged more accurately by comparing the respective detections, making it possible to further ensure control of the manufacturing process of the hydrophilic particles.

In the above-mentioned method, it is preferable to carry out the detections at a plurality of placed in synchronism with each other. In this method, particles, detected on the upstream side in the transporting direction, can be detected again on the downstream side; therefore, the respective conditions of the particles, which vary depending on the oxidizing process and the transporting process, can be detected more positively. Thus, the detected conditions can be judged more accurately by comparing the respective detections, making it possible to further ensure control of the manufacturing process of the hydrophilic particles.

In the above-mentioned method, if the results of the detection are out of a specified range, vibration is preferably applied to the corresponding transport path containing the suspension, particles or surface modified particles causing the out-of-range state, and the defective products, etc. located out of the specified range are preferably collected. In this method, even the defective products, etc. adhering to the transport path can be easily moved by the application of vibration to the transport path, thereby making it possible to easily collect the defective products, etc.

In the above-mentioned method, the collection of the defective products, etc. can be preferably carried out by introducing gas in a pulsed state into the corresponding transport path containing the detective products, etc. With this method, the introduction of the pulsed gas makes it possible to easily move even the defective products, etc. adhering to the transport path, and consequently to easily collect the defective products, etc.

In the above-mentioned particle surface-modifying method, with respect to the suspension obtained by suspending particles that are material particles such as pigment particles, etc. in an acidic liquid, it is preferable to apply heat to the suspension at a temperature not less than 10 K, and more preferably, not less than 20 K, above the boiling point of the acidic liquid so as to evaporate the suspension. With this method, it is possible to heat or evaporate the acidic liquid more positively, and consequently to obtain surface modified particles more efficiently. In this method, the particles may be provided as hydrophobic particles.

Moreover, the above-mentioned suspension may preferably contain a volatile liquid. The suspension thus containing a volatile liquid makes it possible to quickly evaporate the acidic liquid, and to disperse aggregate particles more positively; therefore, it is possible to obtain hydrophilic particles having modified surfaces more efficiently.

In the above-mentioned method, the suspension is preferably used in the form of droplets. In this method, the conversion to the droplets makes it possible to easily carry out nuclear boiling and evaporation on the acidic liquid in the suspension, to reduce, for example, power supply for heat application, and consequently to cut costs.

The particles of the present invention refers to particles which are solid fine particles at room temperature under normal pressure, which are stable and hardly susceptible to changes in their basic structure, such as decomposition and polymerization, even when immersed in an acidic liquid, and which enables addition of functional groups, for example, hydrophilic groups such as carboxylic groups, that is, introduction of hydrophilic groups.

Although not particularly limited, the above-mentioned particles include, for example, particles of titanium oxide and pigments, and particularly include black pigments, for example, carbon black particles as preferably particles. In the present invention, "room temperature and normal pressure" refer to 20° C. and 1 atmospheric pressure respectively.

With respect to the particles of the present invention, those particles having an average particle size in the range of 10 nm to 20 $\mu$m, preferably, in the range of 20 nm to 10 $\mu$m, and most preferably, in the range of 40 nm to 5 $\mu$m, are preferably used.

A particle surface-modifying device of the present invention is provided with a suspension supply section for suspending particles in an acidic liquid so as to form a suspension and for sending the suspension, an oxidizing section for applying heat to the suspension thus fed while being transported so as to allow the acidic liquid to evaporate, thereby transporting surface modified particles whose surfaces have hydrophilic groups due to the oxidization, and a controller for detecting at least one of the conditions of the suspension supply section and the oxidizing section and for controlling the formation of the surface modified particles based upon the results of the detection thus obtained.

Another particle surface-modifying device of the present invention is provided with a suspension supply section for suspending particles in an acidic liquid so as to form a suspension and for sending the suspension, a droplet forming section for forming droplets from the suspension transported thereto and for transporting them by means of a pneumatic transport, an oxidizing section for applying heat to the droplets fed thereto by means of the pneumatic transport while the droplets are being transported so as to allow the acidic liquid to evaporate, thereby transporting surface modified particles whose surfaces have hydrophilic groups due to the oxidization, and a controller for detecting at least one of the conditions of the suspension supply section, the droplet forming section and the oxidizing section and for controlling the formation of the surface modified particles based upon the results of the detection thus obtained.

In the same manner as the aforementioned particle surface-modifying methods, the above-mentioned respective particle surface-modifying devices make it possible to stably manufacture surface-modified hydrophilic particles that are preferably used in various applications.

Here, in the above-mentioned embodiments and examples, a liquid containing nitric acid as a modifier was used as an acidic liquid, and carboxyl groups were introduced onto the surface of the particles; however, the present invention is not intended to be limited thereby, and the methods and devices of the present invention may be applied in the same manner to cases in which a modifier, which can introduce functional groups, such as hydroxyl groups, amino groups, nitro groups, ammonium groups and sulfone groups, to the surface of each particle having a small particle size through application of heat, is used for the surface-modifying process.

Moreover, in the above-mentioned embodiments and examples, those acidic substance that are liquid at room temperature are used as the acidic substance (modifier); however, any acidic substance may be used as long as it dissolves in water or a volatile liquid serving as a solvent, and for example, acetic acid, citric acid, tartaric acid, etc. may be used.

With respect to the hydrophilic particles obtained by the above-mentioned methods, in the case when, for example, particles to be used as the material are pigment particles having a hydrophobic property, the resulting particles exhibit superior dispersing and handling properties; therefore, they are desirably used for various applications, such as paint and varnish, printing ink (ink-jet recording ink and recording ink for ballpoint pens and marking pens) and toner (developing agent).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A particle surface-modifying method comprising the steps of:

suspending particles which are hydrophobic in a liquid containing a modifier so as to prepare a suspension; and evaporating the liquid containing the modifier while being transported so that the particles are dispersed by a force exerted by an abrupt volume expansion upon evaporation so that the surface of the particles is modified by the modifier to render the particles hydrophilic.

2. The particle surface-modifying method as defined in claim 1, wherein the liquid in the suspension is heated to a temperature not less than 10 K above the boiling point of the liquid so as to be evaporated.

3. The particle surface-modifying method as defined in claim 1, wherein the liquid includes water.

4. The particle surface-modifying method as defined in claim 1, wherein the modifier has an acidic property.

5. The particle surface-modifying method as defined in claim 1, wherein the modifier is nitric acid.

6. The particle surface-modifying method as defined in claim 1, wherein the liquid includes a volatile liquid having a latent heat of vaporization not more than the latent heat of vaporization of water.

7. The particle surface-modifying method as defined in claim 6, wherein the volatile liquid is an evaporation-accelerating agent for accelerating evaporation of the liquid.

8. The particle surface-modifying method as defined in claim 1, wherein the particles in the suspension are dispersed in the suspension.

9. The particle surface-modifying method as defined in claim 1, wherein the suspension is preheated.

10. The particle surface-modifying method as defined in claim 1, wherein the surface-modified particles having their surfaces modified are transported by an inert gas.

11. The particle surface-modifying method as defined in claim 1, wherein the suspension is formed into droplets.

12. The particle surface-modifying method as defined in claim 1, wherein the particles are pigments.

13. The particle surface-modifiying method as defined in claim 1, wherein the particles are carbon black.

14. The particle surface-modifying method as set forth in claim 1, wherein the liquid, which contains an acid, has an acid concentration in range of from 0.22 N to 1.1 N.

15. The particle surface-modifying method as set forther in claim 14, wherein the modifier is an acid, which is a liquid at a normal temperature.

16. A particle surface-modifying method comprising the steps of:
    suspending particles which are hydrophobic in a liquid containing a modifier so as to prepare a suspension; and
    evaporating the liquid containing the modifier while being transported so that the particles are dispersed by a force exerted by an abrupt volume expansion upon evaporation so that the surface of the particles is modified by the modifier to render the particles hydrophilic, wherein the particles have an average particle size in the range of from about 10 nm to about 20 μm.

17. A particle surface-modifying method comprising the steps of:
    suspending particles which are hydrophobic in a liquid containing a oxidizing modifier so as to prepare a suspension; and
    evaporating the liquid containing the oxidizing modifier while being transported so that the particles are dispersed by a force exerted by an abrupt volume expansion upon evaporation so the the surface of the particles is modified by the modifier to render the particles hydrophilic.

18. The particle surface-modifiying method as defined in claim 17, wherein the oxidizing modifier has an acidic property.

19. The particle surface-modifying method as defined in claim 1, further comprising the step of:
    detecting conditions of the suspension and controlling the formation of the suspension based upon results of the detection thus obtained.

20. The particle surface-modifying method as defined in claim 11, further comprising the step of:
    detecting conditions of the droplets and controlling the formation of the droplets based upon results of the detection thus obtained.

21. The particle surface-modifying method as defined in claim 1, further comprising the step of:
    detecting conditions of the suspension during the transportation and controlling the formation of the surface-modified particles based upon results of the detection thus obtained.

22. The particle surface-modifying method as defined in claim 11, further comprising the step of:
    detecting conditions of the droplets during the transportation and controlling the formation of the surface-modified particles based upon results of the detection thus obtained.

23. The particle surface-modifying method as defined in claim 1, further comprising the step of:
    detecting conditions of the modifying process and controlling the formation of the surface-modified particles based upon results of the detection thus obtained.

24. The particle surface-modifying method as defined in claim 11, further comprising the step of:
    detecting conditions of the modifying process and controlling the formation of the surface-modified particles based upon results of the detection thus obtained.

25. The particle surface-modifying method as defined in claim 19, wherein the detection process is carried out at a plurality of places different from each other along the transporting direction.

26. The particle surface-modifying method as defined in claim 25, wherein the detections at the plurality of places are carried out in synchronism with each other.

27. The particle surface-modifying method as defined in claim 19, wherein when the results of the detection are located out of a specified range, vibration is applied to a transport path related to a defective product of the suspension, and the particles and the surface-modified particles of the defective product are collected.

28. The particle surface-modifying method as defined in claim 27, wherein the collection of the defective product is carried out by introducing gas in a pulsed state into the transport path related to the defective product.

* * * * *